(12) United States Patent
Aldrich et al.

(10) Patent No.: US 12,552,830 B2
(45) Date of Patent: Feb. 17, 2026

(54) STEROIDAL COMPOUND DERIVATIVES AS THERAPEUTIC AGENTS

(71) Applicant: University of Florida Research Foundation, Incorporated, Gainesville, FL (US)

(72) Inventors: Jane V. Aldrich, Gainesville, FL (US); Jeremy Coleman, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 349 days.

(21) Appl. No.: 18/268,051

(22) PCT Filed: Dec. 17, 2021

(86) PCT No.: PCT/US2021/064123
§ 371 (c)(1),
(2) Date: Jun. 16, 2023

(87) PCT Pub. No.: WO2022/133265
PCT Pub. Date: Jun. 23, 2022

(65) Prior Publication Data
US 2024/0083936 A1    Mar. 14, 2024
US 2024/0376145 A9    Nov. 14, 2024

Related U.S. Application Data

(60) Provisional application No. 63/127,091, filed on Dec. 17, 2020.

(51) Int. Cl.
   *A61P 31/18*       (2006.01)
   *C07J 43/00*       (2006.01)

(52) U.S. Cl.
   CPC .......... *C07J 43/003* (2013.01); *A61P 31/18* (2018.01)

(58) Field of Classification Search
   CPC .............................. C07J 43/003; A61P 31/18
   See application file for complete search history.

(56) References Cited

U.S. PATENT DOCUMENTS

2007/0088013 A1   4/2007   Pariza et al.
2017/0226151 A1   8/2017   Lafont et al.
2018/0147216 A1*   5/2018   Njar ................ A61P 35/00

FOREIGN PATENT DOCUMENTS

WO    WO 2022/133265 A1    6/2022

OTHER PUBLICATIONS

International Search Report and Written Opinion for PCT/US2021/64123 mailed Mar. 10, 2022.
[No Author] Pubmed Compound Record for CID 10428679, '17-(3-Pyridinyl)androsta-4, 16-diene-3, 11-dione', U.S. National Library of Medicine, Oct. 25, 2006 (Oct. 25, 2006). https:l/pubchem.ncbi.nlm.nih.gov/compound/10428679. 11 pages.
Mediouni et al., Didehydro-Cortistatin A Inhibits HIV-1 by Specifically Binding to the Unstructured Basic Region of Tat. mBio. Feb. 5, 2019;10(1):e02662-18. doi: 10.1128/mBio.02662-18.
Potter et al., Novel steroidal inhibitors of human cytochrome P45017 alpha (17 alpha-hydroxylase-C17,20-lyase): potential agents for the treatment of prostatic cancer. J Med Chem. Jun. 23, 1995;38(13):2463-71. doi: 10.1021/jm00013a022.
PCT/US2021/64123, Mar. 10, 2022, International Search Report and Written Opinion.

* cited by examiner

*Primary Examiner* — Timothy R Rozof
(74) *Attorney, Agent, or Firm* — Wolf, Greenfield & Sacks, P.C.

(57) ABSTRACT

The disclosure relates to compounds of Formula (I), as well as compositions, methods, uses, and kits comprising the same. The compounds, compositions, methods, uses, and kits provided herein are useful in treating diseases or disorders including cancer, HIV, and angiogenesis-related disorders.

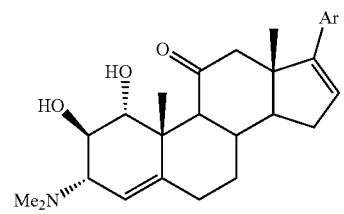

20 Claims, 5 Drawing Sheets

STEROIDAL COMPOUND DERIVATIVES AS THERAPEUTIC AGENTS

RELATED APPLICATIONS

This application is a national stage filing under 35 U.S.C. 371 of International Patent Application Serial No. PCT/US2021/064123, filed Dec. 17, 2021, entitled "STEROIDAL COMPOUND DERIVATIVES AS THERAPEUTIC AGENTS", which claims priority under 35 U.S.C. 119(e) to U.S. Provisional Application U.S. Ser. No. 63/127,091, filed Dec. 17, 2020. The entire contents of these applications are incorporated herein by reference in their entirety.

BACKGROUND

In 2006 and 2007, a set of steroidal alkaloids were isolated from the sponge species *Corticium simplex* and structurally determined by the Kobayashi group at Osaka University in Japan (Watanabe, Y. et al. *Tetrahedron* 2007, 63 (19), 4074-4079; Aoki, S. et al. *J. Am. Chem. Soc.* 2006, 128 (10), 3148-3149; Aoki, S. et al. *Tetrahedron Lett.* 2007, 48 (26), 4485-4488). These steroidal alkaloids known as cortistatins were initially found to exhibit anti-angiogenic activity without observed cytotoxicity in cancer cells as shown by selective inhibition of human umbilical endothelial cell (HUVEC) proliferation compared to other normal and cancerous human cell lines (Aoki, S. et al. *J. Am. Chem. Soc.* 2006, 128 (10), 3148-3149). Angiogenesis is defined as the proliferation of new capillary blood vessels from the pre-existing vasculature, which aids in the progression of cancerous tumor growth, rheumatoid arthritis, psoriasis, hemangiomas, and diabetic retinopathy from ocular neovascularization (Folkman, J. et al. *N. Engl. J. Med.* 1995, 333 (26), 1757-1763). Cortistatins A-D and J-L were observed to have selective anti-proliferative activity; however, cortistatins E-H were not as selective at exhibiting anti-proliferative activity of HUVECs (Watanabe, Y. et al. *Tetrahedron* 2007, 63 (19), 4074-4079; Aoki, S. et al. *Tetrahedron Lett.* 2007, 48 (26), 4485-4488). The Kobayashi group thus suggested that the C17 isoquinoline residue may be important for the selective anti-angiogenic activity of these cortistatins.

Of particular interest among these anti-angiogenic cortistatin natural products is cortistatin A. Cortistatin A exhibited selective anti-proliferative activity of HUVECs with an $IC_{50}$=1.8 nM. Cortistatin A was 3000-fold selective for HUVECs over normal human dermal fibroblast (NHDF), KB epidermoid carcinoma cells (KB3-1), human chronic myelogenous leukemia cells (K562), and murine neuroblastoma cells (Neuro2A), indicating that cortistatin A exhibits selective anti-angiogenesis activity without any notable signs of cytotoxicity (Watanabe, Y. et al. *Tetrahedron* 2007, 63 (19), 4074-4079). Other research reported that didehydro-cortistatin A (dCA) prevents viral reactivation of HIV in vitro, promoting a prolonged state of latency in CD4+T cells (Mousseau, G. et al. *mBio* 2015, 6 (4), e00465).

Unfortunately, isolating this compound is challenging due to the small quantities of cortistatin A secreted by *Corticium simplex* throughout its lifespan and the scarcity of this marine sponge, as the species has become severely endangered. To overcome these challenges in obtaining cortistatin A, several research groups within the past decade have utilized different synthetic strategies to produce this natural product. However, a key limitation with most of these syntheses were the inability to allow for scalable production of cortistatin A. Most notably in 2011, the Baran lab further optimized their synthesis of cortistatin A to yield a shorter and scalable cost-effective synthesis of the desired natural product (Shi, J. et al. *J. Am. Chem. Soc.* 2011, 133 (20), 8014-8027).

Baran's 2011 scalable synthesis of cortistatin A (see *J. Am. Chem. Soc.* 2011, 133 (20), 8014-8027) allowed for larger quantities of this valuable natural product to be obtained for further research. Baran's precursor molecule dCA:

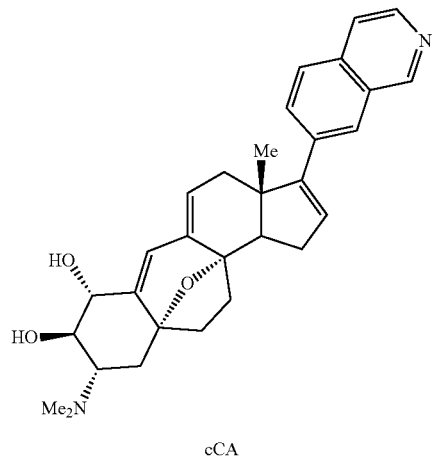 [SMILES: CN(C)[C@H]1C[C@@]23CC[C@@]4(O2)C(=CC[C@]2(C)C(c5ccc6ccncc6c5)=CCC24)C=C3[C@@H](O)[C@@H]1O]

cCA was identified by Dr. Valente and colleagues to be the most potent inhibitor of transactivator of transcription (Tat) (Mediouni, S. et al. *Curr. HIV Res.* 2015, 13 (1), 64-79). Tat is an early protein expressed by HIV after infection which promotes HIV gene expression by enhancing transcription and is critical in sustaining HIV-1 viral replication. In the absence of Tat, RNAPII elongation is blocked, resulting in a premature termination of transcription and affording fragments of abortive HIV viral transcripts. Thus, such inhibitors have potential for therapeutic use as an HIV treatment (Mousseau, G. et al. *Cell Host Microbe* 2012, 12 (1), 97-108). This compound also prevents viral reactivation in latent CD4+T cells in vitro and crosses the blood-brain barrier (BBB). Although, Baran's 15-step scalable linear synthesis of cortistatin A produces larger quantities of the Tat inhibitor dCA, the synthesis is time consuming and produces only 8% overall yield. Thus, more readily produced compounds with broad utility are desired.

SUMMARY OF THE INVENTION

In response to the challenges outlined above, provided herein are new dCA analogs, as well as composition, methods, and kits comprising the dCA. These compounds can be prepared more readily and obtained in larger quantities compared to prior dCA analogs. Further, these compounds have broad potential utility in treating HIV, cancer, and wet age-related macular degeneration (wet-AMD).

Thus, in one aspect, provided herein are compounds of Formula (I):

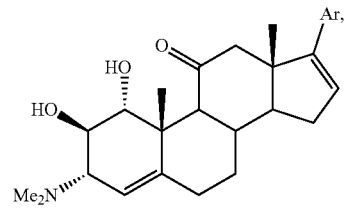
(I)

or salt, solvate, or hydrate thereof, wherein Ar is as defined herein. In some embodiments, Ar is selected from the group consisting of:

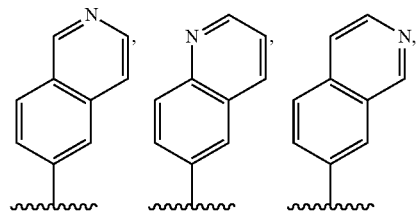

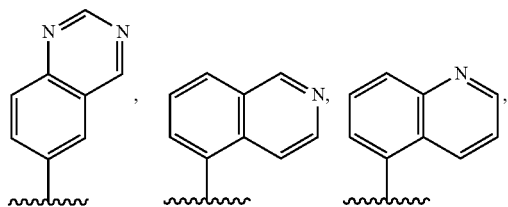

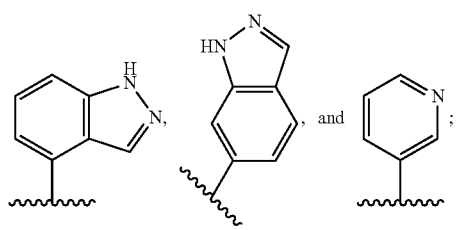

wherein Ar is optionally substituted with 1-4 substituents selected from $C_1$-$C_6$ alkyl, alkenyl, alkynyl, cycloalkyl, heterocycloalkyl, aralkyl, heteroaralkyl, aryl, heteroaryl, halogen (i.e., F, Cl, Br, I), haloalkyl, cyano, nitro, alkoxy, aryloxy, hydroxyl, hydroxylalkyl, oxo (i.e., carbonyl), carboxyl, formyl, mercapto, mercaptoalkyl, amino, aminoalkyl, dialkylamino, and amido. In some embodiments, the compound is of the formula:

or salt, solvate, or hydrate thereof.

In another aspect, provided herein are pharmaceutical compositions comprising a compound as disclosed herein, or salt, solvate, or hydrate thereof, and a pharmaceutically acceptable excipient.

In one aspect, provided herein are methods for inhibiting viral replication in a subject, comprising administering to the subject a compound as disclosed herein, or salt, solvate, or hydrate thereof, or a composition as disclosed herein.

In a further aspect, provided herein are methods for treating human immunodeficiency virus (HIV) effects in a subject, comprising administering to the subject a compound as disclosed herein, or salt, solvate, or hydrate thereof, or a composition as disclosed herein.

In another aspect, provided herein are methods for treating HIV neurological effects in a subject, comprising administering to the subject a compound as disclosed herein, or salt, solvate, or hydrate thereof, or a composition as disclosed herein.

In one aspect, provided herein are methods for inhibiting angiogenesis in a subject, comprising administering to the subject a compound as disclosed herein, or salt, solvate, or hydrate thereof, or a composition as disclosed herein.

In a further aspect, provided herein are methods for inhibiting cellular proliferation in a subject, comprising administering to the subject a compound as disclosed herein, or salt, solvate, or hydrate thereof, or a composition as disclosed herein.

In another aspect, provided herein are methods for treating cancer in a subject, comprising administering to the subject a compound as disclosed herein, or salt, solvate, or hydrate thereof, or a composition as disclosed herein.

In one aspect, provided herein are methods for inhibiting transactivator of transcription (Tat) protein in a subject, comprising administering to the subject a compound as disclosed herein, or salt, solvate, or hydrate thereof, or a composition as disclosed herein.

In another aspect, provided herein are methods for treating age-related macular degeneration (AMD) in a subject, comprising administering to the subject a compound as disclosed herein, or salt, solvate, or hydrate thereof, or a composition as disclosed herein. In some embodiments, the AMD is wet AMD.

In a further aspect, provided herein are kits comprising: a compound as disclosed herein, or salt, solvate, or hydrate thereof, or a composition as disclosed herein; and instructions for administering the compound or composition.

DEFINITIONS

Figure 1:
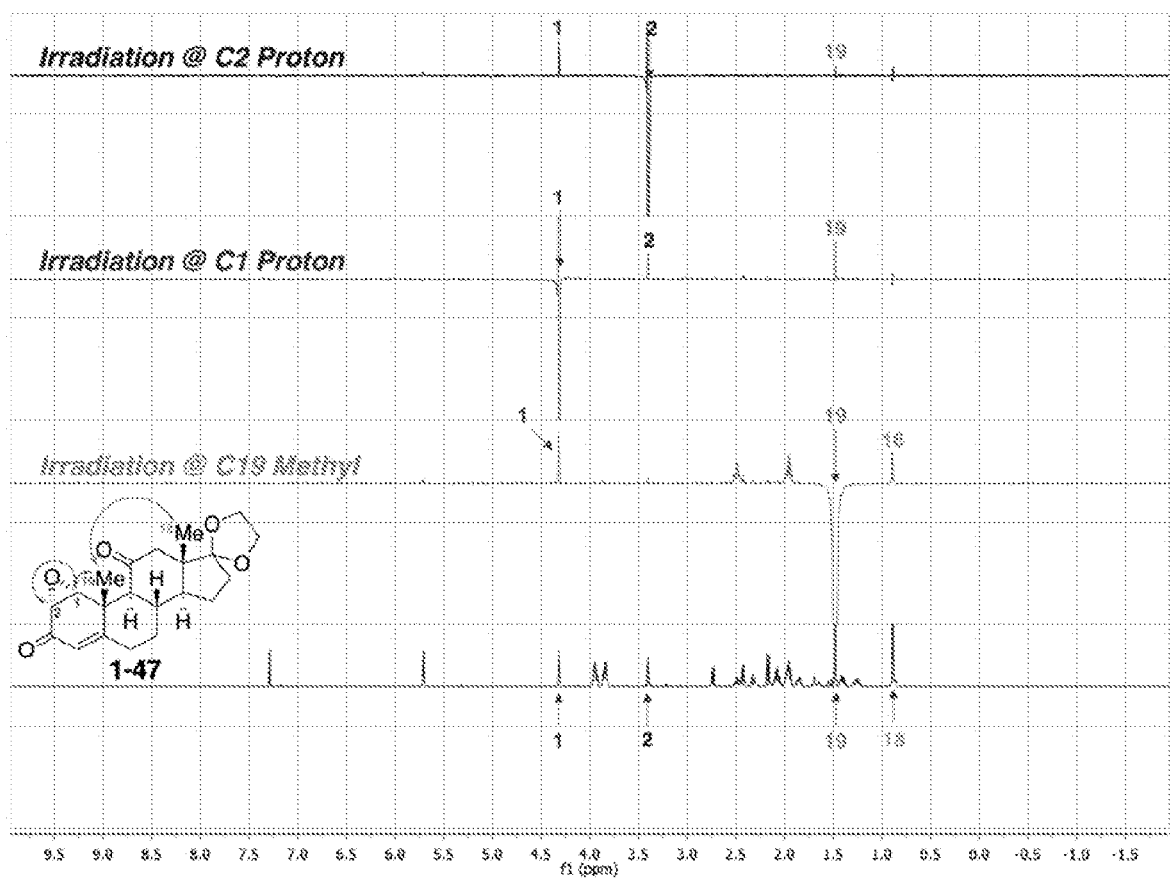
FIG. 1 depicts exemplary spectra showing a NOE analysis of the epoxide intermediate 1-47.

Definitions of specific functional groups and chemical terms are described in more detail below. The chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in Thomas Sorrell, Organic Chemistry, University Science Books, Sausalito, 1999; Michael B. Smith, *March's Advanced Organic Chemistry*, 7$^{th}$ Edition, John Wiley & Sons, Inc., New York, 2013; Richard C. Larock, *Comprehensive Organic Transformations*, John Wiley & Sons, Inc., New York, 2018; and Carruthers, Some Modern Methods of Organic Synthesis, 3$^{rd}$ Edition, Cambridge University Press, Cambridge, 1987.

Compounds described herein can comprise one or more asymmetric centers, and thus can exist in various stereoisomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., *Enantiomers, Racemates and Resolutions* (Wiley Interscience, New York, 1981); Wilen et al., *Tetrahedron* 33:2725 (1977); Eliel, E. L. *Stereochemistry of Carbon Compounds* (McGraw-Hill, NY, 1962); and Wilen, S. H., *Tables of Resolving Agents and Optical Resolutions* p. 268 (E. L. Eliel, Ed., Univ. of Notre Dame Press, Notre Dame, IN 1972). The invention additionally encompasses compounds as individual isomers substantially free of other isomers, and alternatively, as mixtures of various isomers. While compounds may be depicted as racemic or as one or more diastereoisomers, enantiomers, or other isomers, all such racemic, diastereoisomer, enantiomer, or other isomer forms of that depicted are included in the present disclosure.

In a formula, the bond ⌇ is a single bond, the dashed line - - - is a single bond or absent, and the bond ═ or ═ is a single or double bond.

Unless otherwise provided, formulae and structures depicted herein include compounds that do not include isotopically enriched atoms, and also include compounds that include isotopically enriched atoms. For example, compounds having the present structures except for the replacement of hydrogen by deuterium or tritium, replacement of $^{19}$F with $^{18}$F, or the replacement of a carbon by a $^{13}$C- or $^{14}$C-enriched carbon are within the scope of the disclosure. Such compounds are useful, for example, as analytical tools or as probes in biological assays.

The term "isotopes" refers to variants of a particular chemical element such that, while all isotopes of a given element share the same number of protons in each atom of the element, those isotopes differ in the number of neutrons.

When a range of values ("range") is listed, it encompasses each value and sub-range within the range. A range is inclusive of the values at the two ends of the range unless otherwise provided. For example "$C_{1-6}$ alkyl" encompasses, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

The term "aliphatic" refers to alkyl, alkenyl, alkynyl, and carbocyclic groups. Likewise, the term "heteroaliphatic" refers to heteroalkyl, heteroalkenyl, heteroalkynyl, and heterocyclic groups.

The term "alkyl" refers to a radical of a straight-chain or branched saturated hydrocarbon group having from 1 to 20 carbon atoms ("$C_{1-20}$ alkyl"). In some embodiments, an alkyl group has 1 to 12 carbon atoms ("$C_{1-12}$ alkyl"). In some embodiments, an alkyl group has 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), propyl ($C_3$) (e.g., n-propyl, isopropyl), butyl ($C_4$) (e.g., n-butyl, tert-butyl, sec-butyl, isobutyl), pentyl ($C_5$) (e.g., n-pentyl, 3-pentanyl, amyl, neopentyl, 3-methyl-2-butanyl, tert-amyl), and hexyl ($C_6$) (e.g., n-hexyl). Additional examples of alkyl groups include n-heptyl ($C_7$), n-octyl ($C_8$), n-dodecyl ($C_{12}$), and the like. Unless otherwise specified, each instance of an alkyl group is independently unsubstituted (an "unsubstituted alkyl") or substituted (a "substituted alkyl") with one or more substituents (e.g., halogen, such as F). In certain embodiments, the alkyl group is an unsubstituted $C_{1-12}$ alkyl (such as unsubstituted $C_{1-6}$ alkyl, e.g., —$CH_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu, e.g., unsubstituted n-butyl (n-Bu), unsubstituted tert-butyl (tert-Bu or t-Bu), unsubstituted sec-butyl (sec-Bu or s-Bu), unsubstituted isobutyl (i-Bu)). In certain embodiments, the alkyl group is a substituted $C_{1-12}$ alkyl (such as substituted $C_{1-6}$ alkyl, e.g., —$CH_2F$, —$CHF_2$, —$CF_3$, —$CH_2CH_2F$, —$CH_2CHF_2$, —$CH_2CF_3$, or benzyl (Bn)).

The term "haloalkyl" is a substituted alkyl group, wherein one or more of the hydrogen atoms are independently replaced by a halogen, e.g., fluoro, bromo, chloro, or iodo. "Perhaloalkyl" is a subset of haloalkyl and refers to an alkyl group wherein all of the hydrogen atoms are independently replaced by a halogen, e.g., fluoro, bromo, chloro, or iodo. In some embodiments, the haloalkyl moiety has 1 to 20 carbon atoms ("$C_{1-20}$ haloalkyl"). In some embodiments, the haloalkyl moiety has 1 to 10 carbon atoms ("$C_{1-10}$ haloalkyl"). In some embodiments, the haloalkyl moiety has 1 to 9 carbon atoms ("$C_{1-9}$ haloalkyl"). In some embodiments, the haloalkyl moiety has 1 to 8 carbon atoms ("$C_{1-8}$ haloalkyl"). In some embodiments, the haloalkyl moiety has 1 to 7 carbon atoms ("$C_{1-7}$ haloalkyl"). In some embodiments, the haloalkyl moiety has 1 to 6 carbon atoms ("$C_{1-6}$ haloalkyl"). In some embodiments, the haloalkyl moiety has 1 to 5 carbon atoms ("$C_{1-5}$ haloalkyl"). In some embodiments, the haloalkyl moiety has 1 to 4 carbon atoms ("$C_{1-4}$ haloalkyl"). In some embodiments, the haloalkyl moiety has 1 to 3 carbon atoms ("$C_{1-3}$ haloalkyl"). In some embodiments, the haloalkyl moiety has 1 to 2 carbon atoms ("$C_{1-2}$ haloalkyl"). In some embodiments, all of the haloalkyl hydrogen atoms are independently replaced with fluoro to provide a "perfluoroalkyl" group. In some embodiments, all of the haloalkyl hydrogen atoms are independently replaced with chloro to provide a "perchloroalkyl" group. Examples of haloalkyl groups include —$CHF_2$, —$CH_2F$, —$CF_3$, —$CH_2CF_3$, —$CF_2CF_3$, —$CF_2CF_2CF_3$, —$CCl_3$, —$CFCl_2$, —$CF_2Cl$, and the like.

The term "heteroalkyl" refers to an alkyl group, which further includes at least one heteroatom (e.g., 1, 2, 3, or 4 heteroatoms) selected from oxygen, nitrogen, or sulfur within (e.g., inserted between adjacent carbon atoms of) and/or placed at one or more terminal position(s) of the parent chain. In certain embodiments, a heteroalkyl group refers to a saturated group having from 1 to 20 carbon atoms and 1 or more heteroatoms within the parent chain ("hetero$C_{1-20}$ alkyl"). In certain embodiments, a heteroalkyl group refers to a saturated group having from 1 to 12 carbon atoms and 1 or more heteroatoms within the parent chain ("hetero$C_{1-12}$ alkyl"). In some embodiments, a heteroalkyl group is a saturated group having 1 to 11 carbon atoms and 1 or more heteroatoms within the parent chain ("hetero$C_{1-11}$ alkyl"). In some embodiments, a heteroalkyl group is a saturated group having 1 to 10 carbon atoms and 1 or more heteroatoms within the parent chain ("hetero$C_{1-10}$ alkyl"). In some embodiments, a heteroalkyl group is a saturated group having 1 to 9 carbon atoms and 1 or more heteroatoms within the parent chain ("hetero$C_{1-9}$ alkyl"). In some embodiments, a heteroalkyl group is a saturated group having 1 to 8 carbon atoms and 1 or more heteroatoms within the parent chain ("hetero$C_{1-8}$ alkyl"). In some embodiments, a heteroalkyl group is a saturated group having 1 to 7 carbon atoms and 1 or more heteroatoms within the parent chain ("hetero$C_{1-7}$ alkyl"). In some embodiments, a heteroalkyl group is a saturated group having 1 to 6 carbon atoms and 1 or more heteroatoms within the parent chain ("hetero$C_{1-6}$ alkyl"). In some embodiments, a heteroalkyl group is a saturated group having 1 to 5 carbon atoms and 1 or 2 heteroatoms within the parent chain ("hetero$C_{1-5}$ alkyl"). In some embodiments, a heteroalkyl group is a saturated group having 1 to 4 carbon atoms and 1 or 2 heteroatoms within the parent chain ("hetero$C_{1-4}$ alkyl"). In some embodiments, a heteroalkyl group is a saturated group having 1 to 3 carbon atoms and 1 heteroatom within the parent chain ("hetero$C_{1-3}$ alkyl"). In some embodiments, a heteroalkyl group is a saturated group having 1 to 2 carbon atoms and 1 heteroatom within the parent chain ("hetero$C_{1-2}$ alkyl"). In some embodiments, a heteroalkyl group is a saturated group having 1 carbon atom and 1 heteroatom ("hetero$C_1$ alkyl"). In some embodiments, a heteroalkyl group is a saturated group having 2 to 6 carbon atoms and 1 or 2 heteroatoms within the parent chain ("hetero$C_{2-6}$ alkyl"). Unless otherwise specified, each instance of a heteroalkyl group is independently unsubstituted (an "unsubstituted heteroalkyl") or substituted (a "substituted heteroalkyl") with one or more substituents. In certain embodiments, the heteroalkyl group is an unsubstituted hetero$C_{1-12}$ alkyl. In certain embodiments, the heteroalkyl group is a substituted hetero$C_{1-12}$ alkyl.

The term "alkenyl" refers to a radical of a straight-chain or branched hydrocarbon group having from 1 to 20 carbon atoms and one or more carbon-carbon double bonds (e.g., 1, 2, 3, or 4 double bonds). In some embodiments, an alkenyl group has 1 to 20 carbon atoms ("$C_{1-20}$ alkenyl"). In some embodiments, an alkenyl group has 1 to 12 carbon atoms ("$C_{1-12}$ alkenyl"). In some embodiments, an alkenyl group has 1 to 11 carbon atoms ("$C_{1-11}$ alkenyl"). In some embodiments, an alkenyl group has 1 to 10 carbon atoms ("$C_{1-10}$ alkenyl"). In some embodiments, an alkenyl group has 1 to 9 carbon atoms ("$C_{1-9}$ alkenyl"). In some embodiments, an alkenyl group has 1 to 8 carbon atoms ("$C_{1-8}$ alkenyl"). In some embodiments, an alkenyl group has 1 to 7 carbon atoms ("$C_{1-7}$ alkenyl"). In some embodiments, an alkenyl group has 1 to 6 carbon atoms ("$C_{1-6}$ alkenyl"). In some embodiments, an alkenyl group has 1 to 5 carbon atoms ("$C_{1-5}$ alkenyl"). In some embodiments, an alkenyl group has 1 to 4 carbon atoms ("$C_{1-4}$ alkenyl"). In some embodiments, an alkenyl group has 1 to 3 carbon atoms ("$C_{1-3}$ alkenyl"). In some embodiments, an alkenyl group has 1 to 2 carbon atoms ("$C_{1-2}$ alkenyl"). The one or more carbon-carbon double bonds can be internal (such as in 2-butenyl) or terminal (such as in 1-butenyl). Examples of $C_{1-4}$ alkenyl groups include ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{1-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like. Unless otherwise specified, each instance of an alkenyl group is independently unsubstituted (an "unsubstituted alkenyl") or substituted (a "substituted alkenyl") with one or more substituents. In certain embodiments, the alkenyl group is an unsubstituted $C_{1-20}$ alkenyl. In certain embodiments, the alkenyl group is a substituted $C_{1-20}$ alkenyl. In an alkenyl group, a C=C double bond for which the stereochemistry is not specified (e.g., —CH=CHCH₃ or

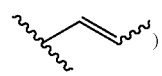

)

may be in the (E)- or (Z)-configuration.

The term "heteroalkenyl" refers to an alkenyl group, which further includes at least one heteroatom (e.g., 1, 2, 3, or 4 heteroatoms) selected from oxygen, nitrogen, or sulfur within (e.g., inserted between adjacent carbon atoms of) and/or placed at one or more terminal position(s) of the parent chain. In certain embodiments, a heteroalkenyl group refers to a group having from 1 to 20 carbon atoms, at least one double bond, and 1 or more heteroatoms within the parent chain ("heteroC$_{1-20}$ alkenyl"). In certain embodiments, a heteroalkenyl group refers to a group having from 1 to 12 carbon atoms, at least one double bond, and 1 or more heteroatoms within the parent chain ("heteroC$_{1-12}$ alkenyl"). In certain embodiments, a heteroalkenyl group refers to a group having from 1 to 11 carbon atoms, at least one double bond, and 1 or more heteroatoms within the parent chain ("heteroC$_{1-11}$ alkenyl"). In certain embodiments, a heteroalkenyl group refers to a group having from 1 to 10 carbon atoms, at least one double bond, and 1 or more heteroatoms within the parent chain ("heteroC$_{1-10}$ alkenyl"). In some embodiments, a heteroalkenyl group has 1 to 9 carbon atoms at least one double bond, and 1 or more heteroatoms within the parent chain ("heteroC$_{1-9}$ alkenyl"). In some embodiments, a heteroalkenyl group has 1 to 8 carbon atoms, at least one double bond, and 1 or more heteroatoms within the parent chain ("heteroC$_{1-8}$ alkenyl"). In some embodiments, a heteroalkenyl group has 1 to 7 carbon atoms, at least one double bond, and 1 or more heteroatoms within the parent chain ("heteroC$_{1-7}$ alkenyl"). In some embodiments, a heteroalkenyl group has 1 to 6 carbon atoms, at least one double bond, and 1 or more heteroatoms within the parent chain ("heteroC$_{1-6}$ alkenyl"). In some embodiments, a heteroalkenyl group has 1 to 5 carbon atoms, at least one double bond, and 1 or 2 heteroatoms within the parent chain ("heteroC$_{1-5}$ alkenyl"). In some embodiments, a heteroalkenyl group has 1 to 4 carbon atoms, at least one double bond, and 1 or 2 heteroatoms within the parent chain ("heteroC$_{1-4}$ alkenyl"). In some embodiments, a heteroalkenyl group has 1 to 3 carbon atoms, at least one double bond, and 1 heteroatom within the parent chain ("heteroC$_{1-3}$ alkenyl"). In some embodiments, a heteroalkenyl group has 1 to 2 carbon atoms, at least one double bond, and 1 heteroatom within the parent chain ("heteroC$_{1-2}$ alkenyl"). In some embodiments, a heteroalkenyl group has 1 to 6 carbon atoms, at least one double bond, and 1 or 2 heteroatoms within the parent chain ("heteroC$_{1-6}$ alkenyl"). Unless otherwise specified, each instance of a heteroalkenyl group is independently unsubstituted (an "unsubstituted heteroalkenyl") or substituted (a "substituted heteroalkenyl") with one or more substituents. In certain embodiments, the heteroalkenyl group is an unsubstituted heteroC$_{1-20}$ alkenyl. In certain embodiments, the heteroalkenyl group is a substituted heteroC$_{1-20}$ alkenyl.

The term "alkynyl" refers to a radical of a straight-chain or branched hydrocarbon group having from 1 to 20 carbon atoms and one or more carbon-carbon triple bonds (e.g., 1, 2, 3, or 4 triple bonds) ("C$_{1-20}$ alkynyl"). In some embodiments, an alkynyl group has 1 to 10 carbon atoms ("C$_{1-10}$ alkynyl"). In some embodiments, an alkynyl group has 1 to 9 carbon atoms ("C$_{1-9}$ alkynyl"). In some embodiments, an alkynyl group has 1 to 8 carbon atoms ("C$_{1-8}$ alkynyl"). In some embodiments, an alkynyl group has 1 to 7 carbon atoms ("C$_{1-7}$ alkynyl"). In some embodiments, an alkynyl group has 1 to 6 carbon atoms ("C$_{1-6}$ alkynyl"). In some embodiments, an alkynyl group has 1 to 5 carbon atoms ("C$_{1-5}$ alkynyl"). In some embodiments, an alkynyl group has 1 to 4 carbon atoms ("C$_{1-4}$ alkynyl"). In some embodiments, an alkynyl group has 1 to 3 carbon atoms ("C$_{1-3}$ alkynyl"). In some embodiments, an alkynyl group has 1 to 2 carbon atoms ("C$_{1-2}$ alkynyl"). The one or more carbon-carbon triple bonds can be internal (such as in 2-butynyl) or terminal (such as in 1-butynyl). Examples of C$_{1-4}$ alkynyl groups include, without limitation, ethynyl (C$_2$), 1-propynyl (C$_3$), 2-propynyl (C$_3$), 1-butynyl (C$_4$), 2-butynyl (C$_4$), and the like. Examples of C$_{1-6}$ alkenyl groups include the aforementioned C$_{2-4}$ alkynyl groups as well as pentynyl (C$_5$), hexynyl (C$_6$), and the like. Additional examples of alkynyl include heptynyl (C$_7$), octynyl (C$_8$), and the like. Unless otherwise specified, each instance of an alkynyl group is independently unsubstituted (an "unsubstituted alkynyl") or substituted (a "substituted alkynyl") with one or more substituents. In certain embodiments, the alkynyl group is an unsubstituted C$_{1-20}$ alkynyl. In certain embodiments, the alkynyl group is a substituted C$_{1-20}$ alkynyl.

The term "heteroalkynyl" refers to an alkynyl group, which further includes at least one heteroatom (e.g., 1, 2, 3, or 4 heteroatoms) selected from oxygen, nitrogen, or sulfur within (e.g., inserted between adjacent carbon atoms of) and/or placed at one or more terminal position(s) of the parent chain. In certain embodiments, a heteroalkynyl group refers to a group having from 1 to 20 carbon atoms, at least one triple bond, and 1 or more heteroatoms within the parent chain ("heteroC$_{1-20}$ alkynyl"). In certain embodiments, a heteroalkynyl group refers to a group having from 1 to 10 carbon atoms, at least one triple bond, and 1 or more heteroatoms within the parent chain ("heteroC$_{1-10}$ alkynyl"). In some embodiments, a heteroalkynyl group has 1 to 9 carbon atoms, at least one triple bond, and 1 or more heteroatoms within the parent chain ("heteroC$_{1-9}$ alkynyl"). In some embodiments, a heteroalkynyl group has 1 to 8 carbon atoms, at least one triple bond, and 1 or more heteroatoms within the parent chain ("heteroC$_{1-8}$ alkynyl"). In some embodiments, a heteroalkynyl group has 1 to 7 carbon atoms, at least one triple bond, and 1 or more heteroatoms within the parent chain ("heteroC$_{1-7}$ alkynyl"). In some embodiments, a heteroalkynyl group has 1 to 6 carbon atoms, at least one triple bond, and 1 or more heteroatoms within the parent chain ("heteroC$_{1-6}$ alkynyl"). In some embodiments, a heteroalkynyl group has 1 to 5 carbon atoms, at least one triple bond, and 1 or 2 heteroatoms within the parent chain ("heteroC$_{1-5}$ alkynyl"). In some embodiments, a heteroalkynyl group has 1 to 4 carbon atoms, at least one triple bond, and 1or 2 heteroatoms within the parent chain ("heteroC$_{1-4}$ alkynyl"). In some embodiments, a heteroalkynyl group has 1 to 3 carbon atoms, at least one triple bond, and 1 heteroatom within the parent chain ("heteroC$_{1-3}$alkynyl"). In some embodiments, a heteroalkynyl group has 1 to 2 carbon atoms, at least one triple bond, and 1 heteroatom within the parent chain ("heteroC$_{1-2}$ alkynyl"). In some embodiments, a heteroalkynyl group has 1 to 6 carbon atoms, at least one triple bond, and 1 or 2 heteroatoms within the parent chain ("heteroC$_{1-6}$ alkynyl"). Unless otherwise specified, each instance of a heteroalkynyl group is independently unsubstituted (an "unsubstituted heteroalkynyl") or substituted (a "substituted heteroalkynyl") with one or more substituents. In certain embodiments, the heteroalkynyl group is an unsubstituted heteroC$_{1-20}$ alkynyl. In certain embodiments, the heteroalkynyl group is a substituted heteroC$_{1-20}$ alkynyl.

The term "carbocyclyl" or "carbocyclic" or "carbocyclyl" or "cycloalkyl" refers to a radical of a non-aromatic cyclic hydrocarbon group having from 3 to 14 ring carbon atoms ("C$_{3-14}$ carbocyclyl") and zero heteroatoms in the non-aromatic ring system. In some embodiments, a carbocyclyl group has 3 to 14 ring carbon atoms ("$C_{3-14}$ carbocyclyl"). In some embodiments, a carbocyclyl group has 3 to 13 ring carbon atoms ("$C_{3-13}$ carbocyclyl"). In some embodiments, a carbocyclyl group has 3 to 12 ring carbon atoms ("$C_{3-12}$ carbocyclyl"). In some embodiments, a carbocyclyl group has 3 to 11 ring carbon atoms ("$C_3$-11 carbocyclyl"). In some embodiments, a carbocyclyl group has 3 to 10 ring carbon atoms ("$C_{3-10}$ carbocyclyl"). In some embodiments, a carbocyclyl group has 3 to 8 ring carbon atoms ("$C_{3-8}$ carbocyclyl"). In some embodiments, a carbocyclyl group has 3 to 7 ring carbon atoms ("$C_{3-7}$ carbocyclyl"). In some embodiments, a carbocyclyl group has 3 to 6 ring carbon atoms ("$C_{3-6}$ carbocyclyl"). In some embodiments, a carbocyclyl group has 4 to 6 ring carbon atoms ("$C_{4-6}$ carbocyclyl"). In some embodiments, a carbocyclyl group has 5 to 6 ring carbon atoms ("$C_{5-6}$ carbocyclyl"). In some embodiments, a carbocyclyl group has 5 to 10 ring carbon atoms ("$C_{5-10}$ carbocyclyl"). Exemplary $C_{3-6}$ carbocyclyl groups include cyclopropyl ($C_3$), cyclopropenyl ($C_3$), cyclobutyl ($C_4$), cyclobutenyl ($C_4$), cyclopentyl ($C_8$), cyclopentenyl ($C_7$), cyclohexyl ($C_6$), cyclohexenyl ($C_6$), cyclohexadienyl ($C_6$), and the like. Exemplary $C_{3-8}$ carbocyclyl groups include the aforementioned $C_{3-6}$ carbocyclyl groups as well as cycloheptyl ($C_7$), cycloheptenyl ($C_7$), cycloheptadienyl ($C_7$), cycloheptatrienyl ($C_7$), cyclooctyl ($C_8$), cyclooctenyl ($C_8$), bicyclo[2.2.1]heptanyl ($C_7$), bicyclo[2.2.2]octanyl ($C_8$), and the like. Exemplary $C_{3-10}$ carbocyclyl groups include the aforementioned $C_{3-8}$ carbocyclyl groups as well as cyclononyl ($C_9$), cyclononenyl ($C_9$), cyclodecyl ($C_{10}$), cyclodecenyl ($C_{10}$), octahydro-1H-indenyl ($C_9$), decahydronaphthalenyl ($C_{10}$), spiro[4.5]decanyl ($C_{10}$), and the like. Exemplary $C_{3-14}$ carbocyclyl groups include the aforementioned $C_{3-10}$ carbocyclyl groups as well as cycloundecyl ($C_{11}$), spiro[5.5]undecanyl ($C_{11}$), cyclododecyl ($C_{12}$), cyclododecenyl ($C_{12}$), cyclotridecane ($C_{13}$), cyclotetradecane ($C_{14}$), and the like. As the foregoing examples illustrate, in certain embodiments, the carbocyclyl group is either monocyclic ("monocyclic carbocyclyl") or polycyclic (e.g., containing a fused, bridged or spiro ring system such as a bicyclic system ("bicyclic carbocyclyl") or tricyclic system ("tricyclic carbocyclyl")) and can be saturated or can contain one or more carbon-carbon double or triple bonds. "Carbocyclyl" also includes ring systems wherein the carbocyclyl ring, as defined above, is fused with one or more aryl or heteroaryl groups wherein the point of attachment is on the carbocyclyl ring, and in such instances, the number of carbons continue to designate the number of carbons in the carbocyclic ring system. Unless otherwise specified, each instance of a carbocyclyl group is independently unsubstituted (an "unsubstituted carbocyclyl") or substituted (a "substituted carbocyclyl") with one or more substituents. In certain embodiments, the carbocyclyl group is an unsubstituted $C_{3-14}$ carbocyclyl. In certain embodiments, the carbocyclyl group is a substituted $C_{3-14}$ carbocyclyl.

In some embodiments, "carbocyclyl" is a monocyclic, saturated carbocyclyl group having from 3 to 14 ring carbon atoms ("$C_{3-14}$ cycloalkyl"). In some embodiments, a cycloalkyl group has 3 to 10 ring carbon atoms ("$C_{3-10}$ cycloalkyl"). In some embodiments, a cycloalkyl group has 3 to 8 ring carbon atoms ("$C_{3-8}$ cycloalkyl"). In some embodiments, a cycloalkyl group has 3 to 6 ring carbon atoms ("$C_{3-6}$ cycloalkyl"). In some embodiments, a cycloalkyl group has 4 to 6 ring carbon atoms ("$C_{4-6}$ cycloalkyl"). In some embodiments, a cycloalkyl group has 5 to 6 ring carbon atoms ("$C_{5-6}$ cycloalkyl"). In some embodiments, a cycloalkyl group has 5 to 10 ring carbon atoms ("$C_{5-10}$ cycloalkyl"). Examples of $C_{5-6}$ cycloalkyl groups include cyclopentyl ($C_5$) and cyclohexyl ($C_6$). Examples of $C_{3-6}$ cycloalkyl groups include the aforementioned $C_{5-6}$ cycloalkyl groups as well as cyclopropyl ($C_3$) and cyclobutyl ($C_4$). Examples of $C_{3-8}$ cycloalkyl groups include the aforementioned $C_{3-6}$ cycloalkyl groups as well as cycloheptyl ($C_7$) and cyclooctyl ($C_8$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is an unsubstituted $C_{3-14}$ cycloalkyl. In certain embodiments, the cycloalkyl group is a substituted $C_{3-14}$ cycloalkyl. In certain embodiments, the carbocyclyl includes 0, 1, or 2 C=C double bonds in the carbocyclic ring system, as valency permits.

The term "heterocyclyl" or "heterocyclic" or "heterocyclyl" or "heterocycloalkyl" refers to a radical of a 3- to 14-membered non-aromatic ring system having ring carbon atoms and 1 to 4 ring heteroatoms, wherein each heteroatom is independently selected from nitrogen, oxygen, and sulfur ("3-14 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or polycyclic (e.g., a fused, bridged or spiro ring system such as a bicyclic system ("bicyclic heterocyclyl") or tricyclic system ("tricyclic heterocyclyl")), and can be saturated or can contain one or more carbon-carbon double or triple bonds. Heterocyclyl polycyclic ring systems can include one or more heteroatoms in one or both rings. "Heterocyclyl" also includes ring systems wherein the heterocyclyl ring, as defined above, is fused with one or more carbocycle groups wherein the point of attachment is either on the carbocycle or heterocycle ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently unsubstituted (an "unsubstituted heterocyclyl") or substituted (a "substituted heterocyclyl") with one or more substituents. In certain embodiments, the heterocyclyl group is an unsubstituted 3-14 membered heterocyclyl. In certain embodiments, the heterocyclyl group is a substituted 3-14 membered heterocyclyl. In certain embodiments, the heterocyclyl is substituted or unsubstituted, 3- to 7-membered, monocyclic heterocyclyl, wherein 1, 2, or 3 atoms in the heterocyclic ring system are independently oxygen, nitrogen, or sulfur, as valency permits.

In some embodiments, a heterocyclyl group is a 5-10 membered non-aromatic ring system having ring carbon atoms and 1-4 ring heteroatoms, wherein each heteroatom is independently selected from nitrogen, oxygen, and sulfur ("5-10 membered heterocyclyl"). In some embodiments, a heterocyclyl group is a 5-8 membered non-aromatic ring system having ring carbon atoms and 1-4 ring heteroatoms, wherein each heteroatom is independently selected from nitrogen, oxygen, and sulfur ("5-8 membered heterocyclyl"). In some embodiments, a heterocyclyl group is a 5-6 membered non-aromatic ring system having ring carbon atoms and 1-4 ring heteroatoms, wherein each heteroatom is independently selected from nitrogen, oxygen, and sulfur ("5-6 membered heterocyclyl"). In some embodiments, the 5-6 membered heterocyclyl has 1-3 ring heteroatoms selected from nitrogen, oxygen, and sulfur. In some embodiments, the 5-6 membered heterocyclyl has 1-2 ring heteroatoms selected from nitrogen, oxygen, and sulfur. In some embodiments, the 5-6 membered heterocyclyl has 1 ring heteroatom selected from nitrogen, oxygen, and sulfur.

Exemplary 3-membered heterocyclyl groups containing 1 heteroatom include azirdinyl, oxiranyl, and thiiranyl. Exemplary 4-membered heterocyclyl groups containing 1 heteroatom include azetidinyl, oxetanyl, and thietanyl. Exemplary 5-membered heterocyclyl groups containing 1 heteroatom include tetrahydrofuranyl, dihydrofuranyl, tetrahydrothiophenyl, dihydrothiophenyl, pyrrolidinyl, dihydropyrrolyl, and pyrrolyl-2,5-dione. Exemplary 5-membered heterocyclyl groups containing 2 heteroatoms include dioxolanyl, oxathiolanyl and dithiolanyl. Exemplary 5-membered heterocyclyl groups containing 3 heteroatoms include triazolinyl, oxadiazolinyl, and thiadiazolinyl. Exemplary 6-membered heterocyclyl groups containing 1 heteroatom include piperidinyl, tetrahydropyranyl, dihydropyridinyl, and thianyl. Exemplary 6-membered heterocyclyl groups containing 2 heteroatoms include piperazinyl, morpholinyl, dithianyl, and dioxanyl. Exemplary 6-membered heterocyclyl groups containing 3 heteroatoms include triazinyl. Exemplary 7-membered heterocyclyl groups containing 1 heteroatom include azepanyl, oxepanyl and thiepanyl. Exemplary 8-membered heterocyclyl groups containing 1 heteroatom include azocanyl, oxecanyl and thiocanyl. Exemplary bicyclic heterocyclyl groups include indolinyl, isoindolinyl, dihydrobenzofuranyl, dihydrobenzothienyl, tetra-hydrobenzothienyl, tetrahydrobenzofuranyl, tetrahydroindolyl, tetrahydroquinolinyl, tetrahydroisoquinolinyl, decahydroquinolinyl, decahydroisoquinolinyl, octahydrochromenyl, octahydroisochromenyl, decahydronaphthyridinyl, decahydro-1,8-naphthyridinyl, octahydropyrrolo[3,2-b]pyrrole, indolinyl, phthalimidyl, naphthalimidyl, chromanyl, chromenyl, 1H-benzo[e][1,4]diazepinyl, 1,4,5,7-tetrahydropyrano[3,4-b]pyrrolyl, 5,6-dihydro-4H-furo[3,2-b]pyrrolyl, 6,7-dihydro-5H-furo[3,2-b]pyranyl, 5,7-dihydro-4H-thieno[2,3-c]pyranyl, 2,3-dihydro-1H-pyrrolo[2,3-b]pyridinyl, 2,3-dihydrofuro[2,3-b]pyridinyl, 4,5,6,7-tetrahydro-1H-pyrrolo[2,3-b]pyridinyl, 4,5,6,7-tetrahydrofuro[3,2-c]pyridinyl, 4,5,6,7-tetrahydrothieno[3,2-b]pyridinyl, 1,2,3,4-tetrahydro-1,6-naphthyridinyl, and the like.

The term "aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl"). In some embodiments, an aryl group has 6 ring carbon atoms ("$C_6$ aryl"; e.g., phenyl). In some embodiments, an aryl group has 10 ring carbon atoms ("$C_{10}$ aryl"; e.g., naphthyl such as 1-naphthyl and 2-naphthyl). In some embodiments, an aryl group has 14 ring carbon atoms ("$C_{14}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Unless otherwise specified, each instance of an aryl group is independently unsubstituted (an "unsubstituted aryl") or substituted (a "substituted aryl") with one or more substituents. In certain embodiments, the aryl group is an unsubstituted $C_{6-14}$ aryl. In certain embodiments, the aryl group is a substituted $C_{6-14}$ aryl.

"Aralkyl" is a subset of "alkyl" and refers to an alkyl group substituted with an aryl group, wherein the point of attachment is on the alkyl moiety.

The term "heteroaryl" refers to a radical of a 5-14 membered monocyclic or polycyclic (e.g., bicyclic, tricyclic) 4n+2 aromatic ring system (e.g., having 6, 10, or 14 π electrons shared in a cyclic array) having ring carbon atoms and 1-4 ring heteroatoms provided in the aromatic ring system, wherein each heteroatom is independently selected from nitrogen, oxygen, and sulfur ("5-14 membered heteroaryl"). In heteroaryl groups that contain one or more nitrogen atoms, the point of attachment can be a carbon or nitrogen atom, as valency permits. Heteroaryl polycyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused polycyclic (aryl/heteroaryl) ring system. In polycyclic heteroaryl groups wherein one ring does not contain a heteroatom (e.g., indolyl, quinolinyl, carbazolyl, and the like) the point of attachment can be on either ring, e.g., either the ring bearing a heteroatom (e.g., 2-indolyl) or the ring that does not contain a heteroatom (e.g., 5-indolyl). In certain embodiments, the heteroaryl is substituted or unsubstituted, 5- or 6-membered, monocyclic heteroaryl, wherein 1, 2, 3, or 4 atoms in the heteroaryl ring system are independently oxygen, nitrogen, or sulfur. In certain embodiments, the heteroaryl is substituted or unsubstituted, 9- or 10-membered, bicyclic heteroaryl, wherein 1, 2, 3, or 4 atoms in the heteroaryl ring system are independently oxygen, nitrogen, or sulfur.

In some embodiments, a heteroaryl group is a 5-10 membered aromatic ring system having ring carbon atoms and 1-4 ring heteroatoms provided in the aromatic ring system, wherein each heteroatom is independently selected from nitrogen, oxygen, and sulfur ("5-10 membered heteroaryl"). In some embodiments, a heteroaryl group is a 5-8 membered aromatic ring system having ring carbon atoms and 1-4 ring heteroatoms provided in the aromatic ring system, wherein each heteroatom is independently selected from nitrogen, oxygen, and sulfur ("5-8 membered heteroaryl"). In some embodiments, a heteroaryl group is a 5-6 membered aromatic ring system having ring carbon atoms and 1-4 ring heteroatoms provided in the aromatic ring system, wherein each heteroatom is independently selected from nitrogen, oxygen, and sulfur ("5-6 membered heteroaryl"). In some embodiments, the 5-6 membered heteroaryl has 1-3 ring heteroatoms selected from nitrogen, oxygen, and sulfur. In some embodiments, the 5-6 membered heteroaryl has 1-2 ring heteroatoms selected from nitrogen, oxygen, and sulfur. In some embodiments, the 5-6 membered heteroaryl has 1 ring heteroatom selected from nitrogen, oxygen, and sulfur. Unless otherwise specified, each instance of a heteroaryl group is independently unsubstituted (an "unsubstituted heteroaryl") or substituted (a "substituted heteroaryl") with one or more substituents. In certain embodiments, the heteroaryl group is an unsubstituted 5-14 membered heteroaryl. In certain embodiments, the heteroaryl group is a substituted 5-14 membered heteroaryl.

Exemplary 5-membered heteroaryl groups containing 1 heteroatom include pyrrolyl, furanyl, and thiophenyl. Exemplary 5-membered heteroaryl groups containing 2 heteroatoms include imidazolyl, pyrazolyl, oxazolyl, isoxazolyl, thiazolyl, and isothiazolyl. Exemplary 5-membered heteroaryl groups containing 3 heteroatoms include triazolyl, oxadiazolyl, and thiadiazolyl. Exemplary 5-membered heteroaryl groups containing 4 heteroatoms include tetrazolyl. Exemplary 6-membered heteroaryl groups containing 1 heteroatom include pyridinyl. Exemplary 6-membered heteroaryl groups containing 2 heteroatoms include pyridazinyl, pyrimidinyl, and pyrazinyl. Exemplary 6-membered heteroaryl groups containing 3 or 4 heteroatoms include triazinyl and tetrazinyl, respectively. Exemplary 7-membered heteroaryl groups containing 1 heteroatom include azepinyl, oxepinyl, and thiepinyl. Exemplary 5,6-bicyclic heteroaryl groups include indolyl, isoindolyl, indazolyl, benzotriazolyl, benzothiophenyl, isobenzothiophenyl, benzofuranyl, benzoisofuranyl, benzimidazolyl, benzoxazolyl, benzisoxazolyl, benzoxadiazolyl, benzthiazolyl, benzisothiazolyl, benzthiadiazolyl, indolizinyl, and purinyl. Exemplary 6,6-bicyclic heteroaryl groups include naphthyridinyl, pteridinyl, quinolinyl, isoquinolinyl, cinnolinyl, quinoxalinyl, phthalazinyl, and quinazolinyl. Exemplary tricyclic heteroaryl groups include phenanthridinyl, dibenzofuranyl, carbazolyl, acridinyl, phenothiazinyl, phenoxazinyl, and phenazinyl.

"Heteroaralkyl" is a subset of "alkyl" and refers to an alkyl group substituted with a heteroaryl group, wherein the point of attachment is on the alkyl moiety.

The term "unsaturated bond" refers to a double or triple bond.

The term "unsaturated" or "partially unsaturated" refers to a moiety that includes at least one double or triple bond.

The term "saturated" or "fully saturated" refers to a moiety that does not contain a double or triple bond, e.g., the moiety only contains single bonds.

Affixing the suffix "-ene" to a group indicates the group is a divalent moiety, e.g., alkylene is the divalent moiety of alkyl, alkenylene is the divalent moiety of alkenyl, alkynylene is the divalent moiety of alkynyl, heteroalkylene is the divalent moiety of heteroalkyl, heteroalkenylene is the divalent moiety of heteroalkenyl, heteroalkynylene is the divalent moiety of heteroalkynyl, carbocyclylene is the divalent moiety of carbocyclyl, heterocyclylene is the divalent moiety of heterocyclyl, arylene is the divalent moiety of aryl, and heteroarylene is the divalent moiety of heteroaryl.

A group is optionally substituted unless expressly provided otherwise. The term "optionally substituted" refers to being substituted or unsubstituted. In certain embodiments, alkyl, alkenyl, alkynyl, heteroalkyl, heteroalkenyl, heteroalkynyl, carbocyclyl, heterocyclyl, aryl, and heteroaryl groups are optionally substituted. "Optionally substituted" refers to a group which is substituted or unsubstituted (e.g., "substituted" or "unsubstituted" alkyl, "substituted" or "unsubstituted" alkenyl, "substituted" or "unsubstituted" alkynyl, "substituted" or "unsubstituted" heteroalkyl, "substituted" or "unsubstituted" heteroalkenyl, "substituted" or "unsubstituted" heteroalkynyl, "substituted" or "unsubstituted" carbocyclyl, "substituted" or "unsubstituted" heterocyclyl, "substituted" or "unsubstituted" aryl or "substituted" or "unsubstituted" heteroaryl group). In general, the term "substituted" means that at least one hydrogen present on a group is replaced with a permissible substituent, e.g., a substituent which upon substitution results in a stable compound, e.g., a compound which does not spontaneously undergo transformation such as by rearrangement, cyclization, elimination, or other reaction. Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, and includes any of the substituents described herein that results in the formation of a stable compound. The present invention contemplates any and all such combinations in order to arrive at a stable compound. For purposes of this invention, heteroatoms such as nitrogen may have hydrogen substituents and/or any suitable substituent as described herein which satisfy the valencies of the heteroatoms and results in the formation of a stable moiety. The invention is not limited in any manner by the exemplary substituents described herein.

Exemplary carbon atom substituents include halogen, —CN, —NO$_2$, —N$_3$, —SO$_2$H, —SO$_3$H, —OH, —OR$^{aa}$, —ON(R$^{bb}$)$_2$, —N(R$^{bb}$)$_2$, —N(R$^{bb}$)$_3$$^+$X$^-$, —N(OR$^{cc}$)R$^{bb}$, —SH, —SR$^{aa}$, —SSR$^{cc}$, —C(=O)R$^{aa}$, —CO$_2$H, —CHO, —C(OR$^{cc}$)$_2$, —CO$_2$R$^{aa}$, —OC(=O)R$^{aa}$, —OCO$_2$R$^{aa}$, —C(=O)N(R$^{bb}$)$_2$, —OC(=O)N(R$^{bb}$)$_2$, —NR$^{bb}$C(=O) R$^{aa}$, —NR$^{bb}$CO$_2$R$^{aa}$, —NR$^{bb}$C(=O)N(R$^{bb}$)$_2$, —C(=NR$^{bb}$)R$^{aa}$, —C(=NR$^{bb}$)OR$^{aa}$, —OC(=NR$^{bb}$)R$^{aa}$, —OC(=NR$^{bb}$)OR$^{aa}$, —C(=NR$^{bb}$)N(R$^{bb}$)$_2$, —OC(=NR$^{bb}$)N(R$^{bb}$)$_2$, —NR$^{bb}$C(=NR$^{bb}$)N(R$^{bb}$)$_2$, —C(=O) NR$^{bb}$SO$_2$R$^{aa}$, —NR$^{bb}$SO$_2$R$^{aa}$, —SO$_2$N(R$^{bb}$)$_2$, —SO$_2$R$^{aa}$, —SO$_2$OR$^{aa}$, —OSO$_2$R$^{aa}$, —S(=O)R$^{aa}$, —OS(=O)R$^{aa}$, —Si(R$^{aa}$)$_3$, —OSi(R$^{aa}$)$_3$—C(=S)N(R$^{bb}$)$_2$, —C(=O)SR$^{aa}$, —C(=S)SR$^{aa}$, —SC(=S)SR$^{aa}$, —SC(=O)SR$^{aa}$, —OC(=O)SR$^{aa}$, —SC(=O)OR$^{aa}$, —SC(=O)R$^{aa}$, —P(=O) (R$^{aa}$)$_2$, —P(=O)(OR$^{cc}$)$_2$, —OP(=O)(R$^{aa}$)$_2$—OP(=O) (OR$^{cc}$)$_2$, —P(=O)(N(R$^{bb}$)$_2$)$_2$, —OP(=O)(N(R$^{bb}$)$_2$)$_2$, —NR$^{bb}$P(=O)(R$^{aa}$)$_2$, —NR$^{bb}$P(=O)(OR$^{cc}$)$_2$, —NR$^{bb}$P (=O)(N(R$^{bb}$)$_2$)$_2$, —P(R$^{cc}$)$_2$, —P(OR$^{cc}$)$_2$, —P(R$^{cc}$)$_3$$^+$X$^-$, —P(OR$^{cc}$)$_3$$^+$X$^-$, —P(R$^{cc}$)$_4$, —P(OR$^{cc}$)$_4$, —OP(R$^{cc}$)$_2$, —OP (R$^{cc}$)$_3$$^+$X$^-$, —OP(OR$^{cc}$)$_2$, —OP(OR$^{cc}$)$_3$$^+$X$^-$, —OP(R$^{cc}$)$_4$, —OP(OR$^{cc}$)$_4$, —B(R$^{aa}$)$_2$, —B(OR$^{cc}$)$_2$, —BR$^{aa}$(OR$^{cc}$), C$_{1-20}$ alkyl, C$_{1-20}$ perhaloalkyl, C$_{1-20}$ alkenyl, C$_{1-20}$ alkynyl, heteroC$_{1-20}$ alkyl, heteroC$_{1-20}$ alkenyl, heteroC$_{1-20}$ alkynyl, C$_{3-10}$ carbocyclyl, 3-14 membered heterocyclyl, C$_{6-14}$ aryl, and 5-14 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups; wherein X$^-$ is a counterion;

or two geminal hydrogens on a carbon atom are replaced with the group =O, =S, =NN(R$^{bb}$)$_2$, =NNR$^{bb}$C (=O)R$^{aa}$, =NNR$^{bb}$C(=O)OR$^{aa}$, =NNR$^{bb}$S(=O) $_2$R$^{aa}$, =NR$^{bb}$, or =NOR$^{cc}$; wherein:

each instance of R$^{aa}$ is, independently, selected from C$_{1-20}$ alkyl, C$_{1-20}$ perhaloalkyl, C$_{1-20}$ alkenyl, C$_{1-20}$ alkynyl, heteroC$_{1-20}$ alkyl, heteroC$_{1-20}$alkenyl, heteroC$_{1-20}$alkynyl, C$_{3-10}$ carbocyclyl, 3-14 membered heterocyclyl, C$_{6-14}$ aryl, and 5-14 membered heteroaryl, or two R$^{aa}$ groups are joined to form a 3-14 membered heterocyclyl or 5-14 membered heteroaryl ring, wherein each of the alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{bb}$ is, independently, selected from hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)(R$^{aa}$)$_2$, —P(=O)(OR$^{cc}$)$_2$, —P(=O)(N (R$^{cc}$)$_2$)$_2$, C$_{1-20}$ alkyl, C$_{1-20}$ perhaloalkyl, C$_{1-20}$ alkenyl, C$_{1-20}$ alkynyl, heteroC$_{1-20}$alkyl, heteroC$_{1-20}$alkenyl, heteroC$_{1-20}$alkynyl, C$_{3-10}$ carbocyclyl, 3-14 membered heterocyclyl, C$_{6-14}$ aryl, and 5-14 membered heteroaryl, or two R$^{bb}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{cc}$ is, independently, selected from hydrogen, C$_{1-20}$ alkyl, C$_{1-20}$ perhaloalkyl, C$_{1-20}$ alkenyl, C$_{1-20}$ alkynyl, heteroC$_{1-20}$ alkyl, heteroC$_{1-20}$ alkenyl, heteroC$_{1-20}$ alkynyl, C$_{3-10}$ carbocyclyl, 3-14 membered heterocyclyl, C$_{6-14}$ aryl, and 5-14 membered heteroaryl, or two R$^{cc}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{dd}$ is, independently, selected from halogen, —CN, —NO$_2$, —N$_3$, —SO$_2$H, —SO$_3$H, —OH, —OR$^{ee}$, —ON(R$^{ff}$)$_2$, —N(R$^{ff}$)$_2$, —N(R$^{ff}$)$_3^+$X$^-$, —N(OR$^{ee}$)R$^{ff}$, —SH, —SR$^{ee}$, —SSR$^{ee}$, —C(=O)R$^{ee}$, —CO$_2$H, —CO$_2$R$^{ee}$, —OC(=O)R$^{ee}$, —OCO$_2$R$^{ee}$, —C(=O)N(R$^{ff}$)$_2$, —OC(=O)N(R$^{ff}$)$_2$, —NR$^{ff}$C(=O)R$^{ee}$, —NR$^{ff}$CO$_2$R$^{ee}$, —NR$^{ff}$C(=O)N(R$^{ff}$)$_2$, —C(=NR$^{ff}$)OR$^{ee}$, —OC(=NR$^{ff}$)R$^{ee}$, —OC(=NR$^{ff}$)OR$^{ee}$, —C(=NR$^{ff}$)N(R$^{ff}$)$_2$, —OC(=NR$^{ff}$)N(R$^{ff}$)$_2$, —NR$^{ff}$C(=NR$^{ff}$)N(R$^{ff}$)$_2$, —NR$^{ff}$SO$_2$R$^{ee}$, —SO$_2$N(R$^{ff}$)$_2$, —SO$_2$R$^{ee}$, —SO$_2$OR$^{ee}$, —OSO$_2$R$^{ee}$, —S(=O)R$^{ee}$, —Si(R$^{ee}$)$_3$, —OSi(R$^{ee}$)$_3$, —C(=S)N(R$^{ff}$)$_2$, —C(=O)SR$^{ee}$, —C(=S)SR$^{ee}$, —SC(=S)SR$^{ee}$, —P(=O)(OR$^{ee}$)$_2$, —P(=O)(R$^{ee}$)$_2$, —OP(=O)(R$^{ee}$)$_2$, —OP(=O)(OR$^{ee}$)$_2$, C$_{1-10}$ alkyl, C$_{1-10}$ perhaloalkyl, C$_{1-10}$ alkenyl, C$_{1-10}$ alkynyl, heteroC$_{1-10}$alkyl, heteroC$_{1-10}$alkenyl, heteroC$_{1-10}$alkynyl, C$_{3-10}$ carbocyclyl, 3-10 membered heterocyclyl, C$_{6-10}$ aryl, and 5-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups, or two geminal R$^{dd}$ substituents are joined to form =O or =S; wherein X$^-$ is a counterion;

each instance of R$^{ee}$ is, independently, selected from C$_{1-10}$ alkyl, C$_{1-10}$ perhaloalkyl, C$_{1-10}$ alkenyl, C$_{1-10}$ alkynyl, heteroC$_{1-10}$ alkyl, heteroC$_{1-10}$ alkenyl, heteroC$_{1-10}$ alkynyl, C$_{3-10}$ carbocyclyl, C$_{6-10}$ aryl, 3-10 membered heterocyclyl, and 3-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups;

each instance of R$^{ff}$ is, independently, selected from hydrogen, C$_{1-10}$ alkyl, C$_{1-10}$ perhaloalkyl, C$_{1-10}$ alkenyl, C$_{1-10}$ alkynyl, heteroC$_{1-10}$ alkyl, heteroC$_{1-10}$ alkenyl, heteroC$_{1-10}$ alkynyl, C$_{3-10}$ carbocyclyl, 3-10 membered heterocyclyl, C$_{6-10}$ aryl, and 5-10 membered heteroaryl, or two R$^{f}$ groups are joined to form a 3-10 membered heterocyclyl or 5-10 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups;

each instance of R$^{gg}$ is, independently, halogen, —CN, —NO$_2$, —N$_3$, —SO$_2$H, —SO$_3$H, —OH, —OC$_{1-6}$ alkyl, —ON(C$_{1-6}$ alkyl)$_2$, —N(C$_{1-6}$ alkyl)$_2$, —N(C$_{1-6}$ alkyl)$_3^+$X$^-$, —NH(C$_{1-6}$ alkyl)$_2^+$X$^-$, —NH$_2$(C$_1$ alkyl)$^+$X$^-$, —NH$_3^+$X$^-$, —N(OC$_{1-6}$ alkyl)(C$_{1-6}$ alkyl), —N(OH)(C$_{1-6}$ alkyl), —NH(OH), —SH, —SC$_{1-6}$ alkyl, —SS(C$_{1-6}$ alkyl), —C(=O)(C$_{1-6}$ alkyl), —CO$_2$H, —CO$_2$(C$_{1-6}$ alkyl), —OC(=O)(C$_{1-6}$ alkyl), —OCO$_2$(C$_{1-6}$ alkyl), —C(=O)NH$_2$, —C(=O)N(C$_{1-6}$ alkyl)$_2$, —OC(=O)NH(C$_{1-6}$ alkyl), —NHC(=O)(C$_{1-6}$ alkyl), —N(C$_{1-6}$ alkyl)C(=O)(C$_{1-6}$ alkyl), —NHCO$_2$(C$_{1-6}$ alkyl), —NHC(=O)N(C$_{1-6}$ alkyl)$_2$, —NHC(=O)NH(C$_{1-6}$ alkyl), —NHC(=O)NH$_2$, —C(=NH)O(C$_{1-6}$ alkyl), —OC(=NH)(C$_{1-6}$ alkyl), —OC(=NH)OC$_{1-6}$ alkyl, —C(=NH)N(C$_{1-6}$ alkyl)$_2$, —C(=NH)NH(C$_{1-6}$ alkyl), —C(=NH)NH$_2$, —OC(=NH)N(C$_{1-6}$ alkyl)$_2$, —OC(NH)NH(C$_{1-6}$ alkyl), —OC(NH)NH$_2$, —NHC(NH)N(C$_{1-6}$ alkyl)$_2$, —NHC(=NH)NH$_2$, —NHSO$_2$(C$_{1-6}$ alkyl), —SO$_2$N(C$_{1-6}$ alkyl)$_2$, —SO$_2$NH(C$_{1-6}$ alkyl), —SO$_2$NH$_2$, —SO$_2$C$_{1-6}$alkyl, —SO$_2$OC$_{1-6}$ alkyl, —OSO$_2$C$_{1-6}$ alkyl, —SOC$_{1-6}$ alkyl, —Si(C$_{1-6}$ alkyl)$_3$, —OSi(C$_{1-6}$ alkyl)$_3$ —C(=S)N(C$_{1-6}$ alkyl)$_2$, C(=S)NH(C$_{1-6}$ alkyl), C(=S)NH$_2$, —C(=O)S(C$_{1-6}$ alkyl), —C(=S)SC$_{1-6}$ alkyl, —SC(=S)SC$_{1-6}$ alkyl, —P(=O)(OC$_{1-6}$ alkyl)$_2$, —P(=O)(C$_{1-6}$ alkyl)$_2$, —OP(=O)(C$_{1-6}$ alkyl)$_2$, —OP(=O)(OC$_{1-6}$ alkyl)$_2$, C$_{1-10}$ alkyl, C$_{1-10}$ perhaloalkyl, C$_{1-10}$ alkenyl, C$_{1-10}$ alkynyl, heteroC$_{1-10}$ alkyl, heteroC$_{1-10}$ alkenyl, heteroC$_{1-10}$ alkynyl, C$_{3-10}$ carbocyclyl, C$_{6-10}$ aryl, 3-10 membered heterocyclyl, or 5-10 membered heteroaryl; or two geminal R$^{gg}$ substituents can be joined to form =O or =S; and each X$^-$ is a counterion.

In certain embodiments, each carbon atom substituent is independently halogen, substituted (e.g., substituted with one or more halogen) or unsubstituted C$_{1-6}$ alkyl, —OR$^{aa}$, —SR$^{aa}$, —N(R$^{bb}$)$_2$, —CN, —SCN, —NO$_2$, —C(=O)R$^{aa}$, —CO$_2$R$^{aa}$, —C(=O)N(R$^{bb}$)$_2$, —OC(=O)R$^{aa}$, —OCO$_2$R$^{aa}$, —OC(=O)N(R$^{bb}$)$_2$, —NR$^{bb}$C(=O)R$^{aa}$, —NR$^{bb}$CO$_2$R$^{aa}$, or —NR$^{bb}$C(=O)N(R$^{bb}$)$_2$. In certain embodiments, each carbon atom substituent is independently halogen, substituted (e.g., substituted with one or more halogen) or unsubstituted C$_{1-10}$ alkyl, —OR$^{aa}$, —SR$^{aa}$, —N(R$^{bb}$)$_2$, —CN, —SCN, —NO$_2$, —C(=O)R$^{aa}$, —CO$_2$R$^{aa}$, —C(=O)N(R$^{bb}$)$_2$, —OC(=O)R$^{aa}$, —OCO$_2$R$^{aa}$, —OC(=O)N(R$^{bb}$)$_2$, —NR$^{bb}$C(=O)R$^{aa}$, —NR$^{bb}$CO$_2$R$^{aa}$, or —NR$^{bb}$C(=O)N(R$^{bb}$)$_2$, wherein R$^{aa}$ is hydrogen, substituted (e.g., substituted with one or more halogen) or unsubstituted C$_{1-10}$ alkyl, an oxygen protecting group (e.g., silyl, TBDPS, TBDMS, TIPS, TES, TMS, MOM, THP, t-Bu, Bn, allyl, acetyl, pivaloyl, or benzoyl) when attached to an oxygen atom, or a sulfur protecting group (e.g., acetamidomethyl, t-Bu, 3-nitro-2-pyridine sulfenyl, 2-pyridine-sulfenyl, or triphenylmethyl) when attached to a sulfur atom; and each R$^{bb}$ is independently hydrogen, substituted (e.g., substituted with one or more halogen) or unsubstituted C$_{1-10}$ alkyl, or a nitrogen protecting group (e.g., Bn, Boc, Cbz, Fmoc, trifluoroacetyl, triphenylmethyl, acetyl, or Ts). In certain embodiments, each carbon atom substituent is independently halogen, substituted (e.g., substituted with one or more halogen) or unsubstituted C$_{1-6}$ alkyl, —OR$^{aa}$, —SR$^{aa}$, —N(R$^{bb}$)$_2$, —CN, —SCN, or —NO$_2$. In certain embodiments, each carbon atom substituent is independently halogen, substituted (e.g., substituted with one or more halogen moieties) or unsubstituted C$_{1-10}$ alkyl, —OR$^{aa}$, —SR$^{aa}$, —N(R$^{bb}$)$_2$, —CN, —SCN, or —NO$_2$, wherein R$^{aa}$ is hydrogen, substituted (e.g., substituted with one or more halogen) or unsubstituted C$_{1-10}$ alkyl, an oxygen protecting group (e.g., silyl, TBDPS, TBDMS, TIPS, TES, TMS, MOM, THP, t-Bu, Bn, allyl, acetyl, pivaloyl, or benzoyl) when attached to an oxygen atom, or a sulfur protecting group (e.g., acetamidomethyl, t-Bu, 3-nitro-2-pyridine sulfenyl, 2-pyridine-sulfenyl, or triphenylmethyl) when attached to a sulfur atom; and each $R^{bb}$ is independently hydrogen, substituted (e.g., substituted with one or more halogen) or unsubstituted $C_{1-10}$ alkyl, or a nitrogen protecting group (e.g., Bn, Boc, Cbz, Fmoc, trifluoroacetyl, triphenylmethyl, acetyl, or Ts).

In certain embodiments, the molecular weight of a carbon atom substituent is lower than 250, lower than 200, lower than 150, lower than 100, or lower than 50 g/mol. In certain embodiments, a carbon atom substituent consists of carbon, hydrogen, fluorine, chlorine, bromine, iodine, oxygen, sulfur, nitrogen, and/or silicon atoms. In certain embodiments, a carbon atom substituent consists of carbon, hydrogen, fluorine, chlorine, bromine, iodine, oxygen, sulfur, and/or nitrogen atoms. In certain embodiments, a carbon atom substituent consists of carbon, hydrogen, fluorine, chlorine, bromine, and/or iodine atoms. In certain embodiments, a carbon atom substituent consists of carbon, hydrogen, fluorine, and/or chlorine atoms.

The term "halo" or "halogen" refers to fluorine (fluoro, —F), chlorine (chloro, —Cl), bromine (bromo, —Br), or iodine (iodo, —I).

The term "cyano" refers to the group —CN.

The term "nitro" refers to the group —$NO_2$.

The term "hydroxyl" or "hydroxy" refers to the group —OH. The term "substituted hydroxyl" or "substituted hydroxyl," by extension, refers to a hydroxyl group wherein the oxygen atom directly attached to the parent molecule is substituted with a group other than hydrogen, and includes groups selected from —$OR^{aa}$, —$ON(R^{bb})_2$, —$OC(=O)SR^{aa}$, —$OC(=O)R^{aa}$, —$OCO_2R^{aa}$, —$OC(=O)N(R^{bb})_2$, —$OC(=NR^{bb})R^{aa}$, —$OC(=NR^{bb})OR^{aa}$, —$OC(=NR^{bb})N(R^{bb})_2$, —$OS(=O)R^{aa}$, —$OSO_2R^{aa}$, —$OSi(R^{aa})_3$, —$OP(R^{cc})_2$, —$OP(RC)_3^+X^-$, —$OP(OR^{cc})_2$, —$OP(OR^{cc})_3^+X^-$, —$OP(=O)(R^{aa})_2$, —$OP(=O)(OR^{cc})_2$, and —$OP(=O)(N(R^{bb}))_2$, wherein $X^-$, $R^{aa}$, $R^{bb}$, and $R^{cc}$ are as defined herein.

The term "alkoxy" refers to the group —O-(alkyl).

The term "hydroxylalkyl" refers to a group wherein an alkyl group is substituted with —OH, wherein the alkyl group is the point of attachment.

The term "thiol" or "thio" or "mercapto" refers to the group —SH. The term "substituted thiol" or "substituted thio," by extension, refers to a thiol group wherein the sulfur atom directly attached to the parent molecule is substituted with a group other than hydrogen, and includes groups selected from —$SR^{aa}$, —$S=SR^{cc}$, —$SC(=S)SR^{aa}$, —$SC(=S)OR^{aa}$, —$SC(=S)N(R^{bb})_2$, —$SC(=O)SR^{aa}$, —$SC(=O)OR^{aa}$, —$SC(=O)N(R^{bb})_2$, and —$SC(=O)R^{aa}$, wherein $R^{aa}$ and $R^{cc}$ are as defined herein.

The term "mercaptoalkyl" refers to a group wherein an alkyl is substituted with mercapto, wherein the alkyl group is the point of attachment.

The term "amino" refers to the group —$NH_2$. The term "substituted amino," by extension, refers to a monosubstituted amino, a disubstituted amino, or a trisubstituted amino. In certain embodiments, the "substituted amino" is a monosubstituted amino or a disubstituted amino group.

The term "monosubstituted amino" refers to an amino group wherein the nitrogen atom directly attached to the parent molecule is substituted with one hydrogen and one group other than hydrogen, and includes groups selected from —$NH(R^{bb})$, —$NHC(=O)R^{aa}$, —$NHCO_2R^{aa}$, —$NHC(=O)N(R^{bb})_2$, —$NHC(=NR^{bb})N(R^{bb})_2$, —$NHSO_2R^{aa}$, —$NH^{bb}P(=O)(OR^{cc})_2$, and —$NH^{bb}P(=O)(N(R^{bb})_2)_2$, wherein $R^{aa}$, $R^{bb}$ and $R^{cc}$ are as defined herein, and wherein $R^{bb}$ of the group —$NH(R^{bb})$ is not hydrogen.

The term "disubstituted amino" refers to an amino group wherein the nitrogen atom directly attached to the parent molecule is substituted with two groups other than hydrogen, and includes groups selected from —$N(R^{bb})_2$, —$NR^{bb}C(=O)R^{aa}$, —$NR^{bb}CO_2R^{aa}$, —$NR^{bb}C(=O)N(R^{bb})_2$, —$NR^{bb}C(=NR^{bb})N(R^{bb})_2$, —$NR^{bb}SO_2R^{aa}$, —$NR^{bb}P(=O)(OR^{cc})_2$, and —$NR^{bb}P(=O)(N(R^{bb})_2)_2$, wherein $R^{aa}$, $R^{bb}$, and $R^{cc}$ are as defined herein, with the proviso that the nitrogen atom directly attached to the parent molecule is not substituted with hydrogen.

The term "dialkylamino" refers to an amino group wherein the N atom directly attached to the parent molecule is substituted with two alkyl groups.

The term "trisubstituted amino" refers to an amino group wherein the nitrogen atom directly attached to the parent molecule is substituted with three groups, and includes groups selected from —$N(R^{bb})_3$ and —$N(R^{bb})_3^+X^-$, wherein $R^{bb}$ and $X^-$ are as defined herein.

The term "aminoalkyl" refers to an alkyl substituted with amino, wherein the alkyl group is directly attached to the parent molecule.

The term "amido" refers to the group —$N(C=O)(R^{X1})_2$, wherein $R^{X1}$ is hydrogen; halogen; substituted or unsubstituted hydroxyl; substituted or unsubstituted thiol; substituted or unsubstituted amino; substituted or unsubstituted acyl, cyclic or acyclic, substituted or unsubstituted, branched or unbranched aliphatic; cyclic or acyclic, substituted or unsubstituted, branched or unbranched heteroaliphatic; cyclic or acyclic, substituted or unsubstituted, branched or unbranched alkyl; cyclic or acyclic, substituted or unsubstituted, branched or unbranched alkenyl; substituted or unsubstituted alkynyl; substituted or unsubstituted aryl, substituted or unsubstituted heteroaryl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, mono- or di-aliphaticamino, mono- or di-heteroaliphaticamino, mono- or di-alkylamino, mono- or di-heteroalkylamino, mono- or di-arylamino, or mono- or di-heteroarylamino; or two $R^{X1}$ groups taken together form a 5- to 6-membered heterocyclic ring.

The term "formyl" refers to the group —C(=O)H.

The term "sulfonyl" refers to a group selected from —$SO_2N(R^{bb})_2$, —$SO_2R^{aa}$, and —$SO_2OR^{aa}$, wherein $R^{aa}$ and $R^bb$ are as defined herein.

The term "sulfinyl" refers to the group —$S(=O)R^{aa}$, wherein $R^{aa}$ is as defined herein.

The term "acyl" refers to a group having the general formula —$C(=O)R^{X1}$, —$C(=O)OR^{X1}$, —$C(=O)—O—C(=O)R^{X1}$, —$C(=O)SR^{X1}$, —$C(=O)N(R^{X1})_2$, —$C(=S)R^{X1}$, —$C(=S)N(R^{X1})_2$, and —$C(=S)S(R^{X1})$, —$C(=NR^{X1})R^{X1}$, —$C(=NR^{X1})OR^{X1}$, —$C(=NR^{X1})SR^{X1}$, and —$C(=NR^{X1})N(R^{X1})_2$, wherein $R^{X1}$ is hydrogen; halogen; substituted or unsubstituted hydroxyl; substituted or unsubstituted thiol; substituted or unsubstituted amino; substituted or unsubstituted acyl, cyclic or acyclic, substituted or unsubstituted, branched or unbranched aliphatic; cyclic or acyclic, substituted or unsubstituted, branched or unbranched heteroaliphatic; cyclic or acyclic, substituted or unsubstituted, branched or unbranched alkyl; cyclic or acyclic, substituted or unsubstituted, branched or unbranched alkenyl; substituted or unsubstituted alkynyl; substituted or unsubstituted aryl, substituted or unsubstituted heteroaryl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, mono- or di-aliphaticamino, mono- or di-heteroaliphaticamino, mono- or di-alkylamino, mono- or di-heteroalkylamino, mono- or di-arylamino, or mono- or di-heteroarylamino; or two $R^{X1}$ groups taken together form a 5- to 6-membered heterocyclic ring. Exemplary acyl groups include aldehydes (—CHO), carboxylic acids (—CO$_2$H), ketones, acyl halides, esters, amides, imines, carbonates, carbamates, and ureas. Acyl substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "carbonyl" refers to a group —C(=O)—. The carbonyl may be substituted, e.g., a group selected from ketones (—C(=O)R$^{aa}$), carboxylic acids (—CO$_2$H), aldehydes (—CHO), esters (—CO$_2$R$^{aa}$), and amides (—C(=O)N(R$^{bb}$)$_2$, —C(=O)NR$^{bb}$SO$_2$R$^{aa}$), wherein R$^{aa}$ and R$^{bb}$ are as defined herein.

The term "oxo" refers to the group =O, and the term "thiooxo" refers to the group =S.

Nitrogen atoms can be substituted or unsubstituted as valency permits, and include primary, secondary, tertiary, and quaternary nitrogen atoms. Exemplary nitrogen atom substituents include hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{bb}$)R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR, —C(=S)SR$^{cc}$, —P(=O)(OR)$_2$, —P(=O)(R$^{aa}$)$_2$, —P(=O)(N(R$^{cc}$)$_2$)$_2$, C$_{1-20}$ alkyl, C$_{1-20}$ perhaloalkyl, C$_{1-20}$ alkenyl, C$_{1-20}$ alkynyl, hetero C$_{1-20}$ alkyl, hetero C$_{1-20}$ alkenyl, hetero C$_{1-20}$ alkynyl, C$_{3-10}$ carbocyclyl, 3-14 membered heterocyclyl, C$_{6-14}$ aryl, and 5-14 membered heteroaryl, or two R$^{cc}$ groups attached to an N atom are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups, and wherein R$^{aa}$, R$^{bb}$, R$^{cc}$ and R$^{dd}$ are as defined above.

In certain embodiments, each nitrogen atom substituent is independently substituted (e.g., substituted with one or more halogen) or unsubstituted C$_{1-6}$ alkyl, —C(=O)R$^{aa}$, —CO$_2$R$^{aa}$, —C(=O)N(R$^{bb}$)$_2$, or a nitrogen protecting group. In certain embodiments, each nitrogen atom substituent is independently substituted (e.g., substituted with one or more halogen) or unsubstituted C$_{1-10}$ alkyl, —C(=O)R$^{aa}$, —CO$_2$R$^{aa}$, —C(=O)N(R$^{bb}$)$_2$, or a nitrogen protecting group, wherein R$^{aa}$ is hydrogen, substituted (e.g., substituted with one or more halogen) or unsubstituted C$_{1-10}$ alkyl, or an oxygen protecting group when attached to an oxygen atom; and each R$^{bb}$ is independently hydrogen, substituted (e.g., substituted with one or more halogen) or unsubstituted C$_{1-10}$ alkyl, or a nitrogen protecting group. In certain embodiments, each nitrogen atom substituent is independently substituted (e.g., substituted with one or more halogen) or unsubstituted C$_{1-6}$ alkyl or a nitrogen protecting group.

In certain embodiments, the substituent present on the nitrogen atom is a nitrogen protecting group (also referred to herein as an "amino protecting group"). Nitrogen protecting groups include —OH, —OR$^{aa}$, —N(R$^{cc}$)$_2$, —C(=O)R$^{aa}$, —C(=O)N(R$^{cc}$)$_2$, —CO$_2$R$^{aa}$, —SO$_2$R$^{aa}$, —C(=NR$^{cc}$)R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, C$_{1-10}$ alkyl (e.g., aralkyl, heteroaralkyl), C$_{1-20}$ alkenyl, C$_{1-20}$ alkynyl, hetero C$_{1-20}$ alkyl, hetero C$_{1-20}$ alkenyl, hetero C$_{1-20}$ alkynyl, C$_{3-10}$ carbocyclyl, 3-14 membered heterocyclyl, C$_{6-14}$ aryl, and 5-14 membered heteroaryl groups, wherein each alkyl, alkenyl, alkynyl, heteroalkyl, heteroalkenyl, heteroalkynyl, carbocyclyl, heterocyclyl, aralkyl, aryl, and heteroaryl is independently substituted with 0, 1, 2, 3, 4, or 5 R$^{dd}$ groups, and wherein R$^{aa}$, R$^{bb}$, R$^{cc}$ and R$^{dd}$ are as defined herein. Nitrogen protecting groups are well known in the art and include those described in detail in *Protecting Groups in Organic Synthesis*, T. W. Greene and P. G. M. Wuts, 3$^{rd}$ edition, John Wiley & Sons, 1999, incorporated herein by reference.

For example, in certain embodiments, at least one nitrogen protecting group is an amide group (e.g., a moiety that include the nitrogen atom to which the nitrogen protecting groups (e.g., —C(=O)R$^{aa}$) is directly attached). In certain such embodiments, each nitrogen protecting group, together with the nitrogen atom to which the nitrogen protecting group is attached, is independently selected from the group consisting of formamide, acetamide, chloroacetamide, trichloroacetamide, trifluoroacetamide, phenylacetamide, 3-phenylpropanamide, picolinamide, 3-pyridylcarboxamide, N-benzoylphenylalanyl derivatives, benzamide, p-phenylbenzamide, o-nitophenylacetamide, o-nitrophenoxyacetamide, acetoacetamide, (N'-dithiobenzyloxyacylamino) acetamide, 3-(p-hydroxyphenyl)propanamide, 3-(o-nitrophenyl)propanamide, 2-methyl-2-(o-nitrophenoxy) propanamide, 2-methyl-2-(o-phenylazophenoxy) propanamide, 4-chlorobutanamide, 3-methyl-3-nitrobutanamide, o-nitrocinnamide, N-acetylmethionine derivatives, o-nitrobenzamide, and o-(benzoyloxymethyl) benzamide.

In certain embodiments, at least one nitrogen protecting group is a carbamate group (e.g., a moiety that include the nitrogen atom to which the nitrogen protecting groups (e.g., —C(=O)OR$^{aa}$) is directly attached). In certain such embodiments, each nitrogen protecting group, together with the nitrogen atom to which the nitrogen protecting group is attached, is independently selected from the group consisting of methyl carbamate, ethyl carbamate, 9-fluorenylmethyl carbamate (Fmoc), 9-(2-sulfo)fluorenylmethyl carbamate, 9-(2,7-dibromo)fluoroenylmethyl carbamate, 2,7-di-t-butyl-[9-(10,10-dioxo-10,10,10,10-tetrahydrothioxanthyl)]methyl carbamate (DBD-Tmoc), 4-methoxyphenacyl carbamate (Phenoc), 2,2,2-trichloroethyl carbamate (Troc), 2-trimethylsilylethyl carbamate (Teoc), 2-phenylethyl carbamate (hZ), 1-(1-adamantyl)-1-methylethyl carbamate (Adpoc), 1,1-dimethyl-2-haloethyl carbamate, 1,1-dimethyl-2,2-dibromoethyl carbamate (DB-t-BOC), 1,1-dimethyl-2,2,2-trichloroethyl carbamate (TCBOC), 1-methyl-1-(4-biphenylyl)ethyl carbamate (Bpoc), 1-(3,5-di-t-butylphenyl)-1-methylethyl carbamate (t-Bumeoc), 2-(2'- and 4'-pyridyl)ethyl carbamate (Pyoc), 2-(N,N-dicyclohexylcarboxamido)ethyl carbamate, t-butyl carbamate (BOC or Boc), 1-adamantyl carbamate (Adoc), vinyl carbamate (Voc), allyl carbamate (Alloc), 1-isopropylallyl carbamate (Ipaoc), cinnamyl carbamate (Coc), 4-nitrocinnamyl carbamate (Noc), 8-quinolyl carbamate, N-hydroxypiperidinyl carbamate, alkyldithio carbamate, benzyl carbamate (Cbz), p-methoxybenzyl carbamate (Moz), p-nitobenzyl carbamate, p-bromobenzyl carbamate, p-chlorobenzyl carbamate, 2,4-dichlorobenzyl carbamate, 4-methylsulfinylbenzyl carbamate (Msz), 9-anthrylmethyl carbamate, diphenylmethyl carbamate, 2-methylthioethyl carbamate, 2-methylsulfonylethyl carbamate, 2-(p-toluenesulfonyl)ethyl carbamate, [2-(1,3-dithianyl)]methyl carbamate (Dmoc), 4-methylthiophenyl carbamate (Mtpc), 2,4-dimethylthiophenyl carbamate (Bmpc), 2-phosphonioethyl carbamate (Peoc), 2-triphenylphosphonioisopropyl carbamate (Ppoc), 1,1-dimethyl-2-cyanoethyl carbamate, m-chloro-p-acyloxybenzyl carbamate, p-(dihydroxyboryl)benzyl carbamate, 5-benzisoxazolylmethyl carbamate, 2-(trifluoromethyl)-6-chromonylmethyl carbamate (Tcroc), m-nitrophenyl carbamate, 3,5-dimethoxybenzyl carbamate, o-nitrobenzyl carbamate, 3,4-dimethoxy-6-nitrobenzyl carbamate, phenyl(o-nitrophenyl)methyl carbamate, t-amyl carbamate, S-benzyl thiocarbamate, p-cyanobenzyl carbamate, cyclobutyl carbamate, cyclohexyl carbamate, cyclopentyl carbamate, cyclopropylmethyl carbamate, p-decyloxybenzyl carbamate, 2,2-dimethoxyacylvinyl carbamate, o-(N,N-dimethylcarboxamido)benzyl carbamate, 1,1-dimethyl-3-(N,N-dimethylcarboxamido)propyl carbamate, 1,1-dimethylpropynyl carbamate, di(2-pyridyl)methyl carbamate, 2-furanylmethyl carbamate, 2-iodoethyl carbamate, isoborynl carbamate, isobutyl carbamate, isonicotinyl carbamate, p-(p'-methoxyphenylazo)benzyl carbamate, 1-methylcyclobutyl carbamate, 1-methylcyclohexyl carbamate, 1-methyl-1-cyclopropylmethyl carbamate, 1-methyl-1-(3,5-dimethoxyphenyl)ethyl carbamate, 1-methyl-1-(p-phenylazophenyl)ethyl carbamate, 1-methyl-1-phenylethyl carbamate, 1-methyl-1-(4-pyridyl)ethyl carbamate, phenyl carbamate, p-(phenylazo)benzyl carbamate, 2,4,6-tri-t-butylphenyl carbamate, 4-(trimethylammonium)benzyl carbamate, and 2,4,6-trimethylbenzyl carbamate.

In certain embodiments, at least one nitrogen protecting group is a sulfonamide group (e.g., a moiety that include the nitrogen atom to which the nitrogen protecting groups (e.g., $-S(=O)_2R^{aa}$) is directly attached). In certain such embodiments, each nitrogen protecting group, together with the nitrogen atom to which the nitrogen protecting group is attached, is independently selected from the group consisting of p-toluenesulfonamide (Ts), benzenesulfonamide, 2,3,6-trimethyl-4-methoxybenzenesulfonamide (Mtr), 2,4,6-trimethoxybenzenesulfonamide (Mtb), 2,6-dimethyl-4-methoxybenzenesulfonamide (Pme), 2,3,5,6-tetramethyl-4-methoxybenzenesulfonamide (Mte), 4-methoxybenzenesulfonamide (Mbs), 2,4,6-trimethylbenzenesulfonamide (Mts), 2,6-dimethoxy-4-methylbenzenesulfonamide (iMds), 2,2,5,7,8-pentamethylchroman-6-sulfonamide (Pmc), methanesulfonamide (Ms), β-trimethylsilylethanesulfonamide (SES), 9-anthracenesulfonamide, 4-(4',8'-dimethoxynaphthylmethyl)benzenesulfonamide (DNMBS), benzylsulfonamide, trifluoromethylsulfonamide, and phenacylsulfonamide.

In certain embodiments, each nitrogen protecting group, together with the nitrogen atom to which the nitrogen protecting group is attached, is independently selected from the group consisting of phenothiazinyl-(10)-acyl derivatives, N'-p-toluenesulfonylaminoacyl derivatives, N'-phenylaminothioacyl derivatives, N-benzoylphenylalanyl derivatives, N-acetylmethionine derivatives, 4,5-diphenyl-3-oxazolin-2-one, N-phthalimide, N-dithiasuccinimide (Dts), N-2,3-diphenylmaleimide, N-2,5-dimethylpyrrole, N-1,1,4,4-tetramethyldisilylazacyclopentane adduct (STABASE), 5-substituted 1,3-dimethyl-1,3,5-triazacyclohexan-2-one, 5-substituted 1,3-dibenzyl-1,3,5-triazacyclohexan-2-one, 1-substituted 3,5-dinitro-4-pyridone, N-methylamine, N-allylamine, N-[2-(trimethylsilyl)ethoxy]methylamine (SEM), N-3-acetoxypropylamine, N-(1-isopropyl-4-nitro-2-oxo-3-pyroolin-3-yl)amine, quaternary ammonium salts, N-benzylamine, N-di(4-methoxyphenyl)methylamine, N-5-dibenzosuberylamine, N-triphenylmethylamine (Tr), N-[(4-methoxyphenyl)diphenylmethyl]amine (MMTr), N-9-phenylfluorenylamine (PhF), N-2,7-dichloro-9-fluorenylmethyleneamine, N-ferrocenylmethylamino (Fcm), N-2-picolylamino N'-oxide, N-1,1-dimethylthiomethyleneamine, N-benzylideneamine, N-p-methoxybenzylideneamine, N-diphenylmethyleneamine, N-[(2-pyridyl)mesityl]methyleneamine, N—(N',N'-dimethylaminomethylene) amine, N-p-nitrobenzylideneamine, N-salicylideneamine, N-5-chlorosalicylideneamine, N-(5-chloro-2-hydroxyphenyl)phenylmethyleneamine, N-cyclohexylideneamine, N-(5,5-dimethyl-3-oxo-1-cyclohexenyl)amine, N-borane derivatives, N-diphenylborinic acid derivatives, N-[phenyl(pentaacylchromium- or tungsten)acyl]amine, N-copper chelate, N-zinc chelate, N-nitroamine, N-nitrosoamine, amine N-oxide, diphenylphosphinamide (Dpp), dimethylthiophosphinamide (Mpt), diphenylthiophosphinamide (Ppt), dialkyl phosphoramidates, dibenzyl phosphoramidate, diphenyl phosphoramidate, benzenesulfenamide, o-nitrobenzenesulfenamide (Nps), 2,4-dinitrobenzenesulfenamide, pentachlorobenzenesulfenamide, 2-nitro-4-methoxybenzenesulfenamide, triphenylmethylsulfenamide, and 3-nitropyridinesulfenamide (Npys). In some embodiments, two instances of a nitrogen protecting group together with the nitrogen atoms to which the nitrogen protecting groups are attached are N,N'-isopropylidenediamine.

In certain embodiments, at least one nitrogen protecting group is Bn, Boc, Cbz, Fmoc, trifluoroacetyl, triphenylmethyl, acetyl, or Ts.

In certain embodiments, each oxygen atom substituent is independently substituted (e.g., substituted with one or more halogen) or unsubstituted $C_{1-10}$ alkyl, $-C(=O)R^{aa}$, $-CO_2R^{aa}$, $-C(=O)N(R^{bb})_2$, or an oxygen protecting group. In certain embodiments, each oxygen atom substituents is independently substituted (e.g., substituted with one or more halogen) or unsubstituted $C_{1-6}$ alkyl, $-C(=O)R^{aa}$, $-CO_2R^{aa}$, $-C(=O)N(R^{bb})_2$, or an oxygen protecting group, wherein $R^{aa}$ is hydrogen, substituted (e.g., substituted with one or more halogen) or unsubstituted $C_{1-10}$ alkyl, or an oxygen protecting group when attached to an oxygen atom; and each $R^{bb}$ is independently hydrogen, substituted (e.g., substituted with one or more halogen) or unsubstituted $C_{1-10}$ alkyl, or a nitrogen protecting group. In certain embodiments, each oxygen atom substituent is independently substituted (e.g., substituted with one or more halogen) or unsubstituted $C_{1-6}$ alkyl or an oxygen protecting group.

In certain embodiments, the substituent present on an oxygen atom is an oxygen protecting group (also referred to herein as an "hydroxyl protecting group"). Oxygen protecting groups include $-R^{aa}$, $-N(R^{bb})_2$, $-C(=O)SR^{aa}$, $-C(=O)R^{aa}$, $-CO_2R^{aa}$, $-C(=O)N(R^{bb})_2$, $-C(=NR^{bb})R^{aa}$, $-C(=NR^{bb})OR^{aa}$, $-C(=NR^{bb})N(R^{bb})_2$, $-S(=O)R^{aa}$, $-SO_2R^{aa}$, $-Si(R^{aa})_3$, $-P(R^{cc})_2$, $-P(R^{cc})_3^+X^-$, $-P(OR^{cc})_2$, $-P(OR^{cc})_3^+X^-$, $-P(=O)(R^{aa})_2$, $-P(=O)(OR^{cc})_2$, and $-P(=O)(N(R^{bb})_2)_2$, wherein $X^-$, $R^{aa}$, $R^{bb}$, and $R^{cc}$ are as defined herein. Oxygen protecting groups are well known in the art and include those described in detail in *Protecting Groups in Organic Synthesis*, T. W. Greene and P. G. M. Wuts, 3$^{rd}$ edition, John Wiley & Sons, 1999, incorporated herein by reference.

In certain embodiments, each oxygen protecting group, together with the oxygen atom to which the oxygen protecting group is attached, is selected from the group consisting of methyl, methoxymethyl (MOM), methylthiomethyl (MTM), t-butylthiomethyl, (phenyldimethylsilyl)methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethylsilyl) ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a,4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, allyl, p-chlorophenyl, p-methoxyphenyl, 2,4-dinitrophenyl, benzyl (Bn), p-methoxybenzyl (PMB), 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2-picolyl N-oxido, diphenylmethyl, p,p'-dinitrobenzhydryl, 5-dibenzosuberyl, triphenylmethyl, α-naphthyldiphenylmethyl, p-methoxyphenyldiphenylmethyl, di(p-methoxyphenyl)phenylmethyl, tri(p-methoxyphenyl)methyl, 4-(4'-bromophenacyloxyphenyl)diphenylmethyl, 4,4',4"-tris(4,5-dichlorophthalimidophenyl)methyl, 4,4',4"-tris(levulinoyloxyphenyl)methyl, 4,4',4"-tris(benzoyloxyphenyl)methyl, 4,4'-Dimethoxy-3'''-[N-(imidazolylmethyl)]trityl Ether (IDTr-OR), 4,4'-Dimethoxy-3'''-[N-(imidazolylethyl)carbamoyl]trityl Ether (IETr-OR), 1,1-bis(4-methoxyphenyl)-1'-pyrenylmethyl, 9-anthryl, 9-(9-phenyl)xanthenyl, 9-(9-phenyl-10-oxo)anthryl, 1,3-benzodithiolan-2-yl, benzisothiazolyl S,S-dioxide, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBDMS), t-butyldiphenylsilyl (TBDPS), tribenzylsilyl, tri-p-xylylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), methyl carbonate, 9-fluorenylmethyl carbonate (Fmoc), ethyl carbonate, 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), isobutyl carbonate, vinyl carbonate, allyl carbonate, t-butyl carbonate (BOC or Boc), p-nitrophenyl carbonate, benzyl carbonate, p-methoxybenzyl carbonate, 3,4-dimethoxybenzyl carbonate, o-nitrobenzyl carbonate, p-nitrobenzyl carbonate, S-benzyl thiocarbonate, 4-ethoxy-1-napththyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl carbonate (MTMEC-OR), 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxyacyl)benzoate, α-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts).

In certain embodiments, at least one oxygen protecting group is silyl, TBDPS, TBDMS, TIPS, TES, TMS, MOM, THP, t-Bu, Bn, allyl, acetyl, pivaloyl, or benzoyl.

In certain embodiments, each sulfur atom substituent is independently substituted (e.g., substituted with one or more halogen) or unsubstituted $C_{1-10}$ alkyl, $-C(=O)R^{aa}$, $-CO_2R^{aa}$, $-C(=O)N(R^{bb})_2$, or a sulfur protecting group. In certain embodiments, each sulfur atom substituent is independently substituted (e.g., substituted with one or more halogen) or unsubstituted $C_{1-10}$ alkyl, $-C(=O)R^{aa}$, $-CO_2R^{aa}$, $-C(=O)N(R^{bb})_2$, or a sulfur protecting group, wherein $R^{aa}$ is hydrogen, substituted (e.g., substituted with one or more halogen) or unsubstituted $C_{1-10}$ alkyl, or an oxygen protecting group when attached to an oxygen atom; and each $R^{bb}$ is independently hydrogen, substituted (e.g., substituted with one or more halogen) or unsubstituted $C_{1-10}$ alkyl, or a nitrogen protecting group. In certain embodiments, each sulfur atom substituent is independently substituted (e.g., substituted with one or more halogen) or unsubstituted $C_{1-6}$ alkyl or a sulfur protecting group.

In certain embodiments, the substituent present on a sulfur atom is a sulfur protecting group (also referred to as a "thiol protecting group"). In some embodiments, each sulfur protecting group is selected from the group consisting of $-R^{aa}$, $-N(R^{bb})_2$, $-C(=O)SR^{aa}$, $-C(=O)R^{aa}$, $-CO_2R^{aa}$, $-C(=O)N(R^{bb})_2$, $-C(=NR^{bb})R^{aa}$, $-C(=NR^{bb})OR^{aa}$, $-C(=NR^{bb})N(R^{bb})_2$, $-S(=O)R^{aa}$, $-SO_2R^{aa}$, $-Si(R^{aa})_3$, $-P(R^{cc})_2$, $-P(R^{cc})_3^+X^-$, $-P(OR^{cc})_2$, $-P(OR^{cc})_3^+X^-$, $-P(=O)(R^{aa})_2$, $-P(=O)(OR^{cc})_2$, and $-P(=O)(N(R^{bb})_2)_2$, wherein $R^{aa}$, $R^{bb}$, and $R^{cc}$ are as defined herein. Sulfur protecting groups are well known in the art and include those described in detail in *Protecting Groups in Organic Synthesis*, T. W. Greene and P. G. M. Wuts, 3rd edition, John Wiley & Sons, 1999, incorporated herein by reference.

In certain embodiments, the molecular weight of a substituent is lower than 250, lower than 200, lower than 150, lower than 100, or lower than 50 g/mol. In certain embodiments, a substituent consists of carbon, hydrogen, fluorine, chlorine, bromine, iodine, oxygen, sulfur, nitrogen, and/or silicon atoms. In certain embodiments, a substituent consists of carbon, hydrogen, fluorine, chlorine, bromine, iodine, oxygen, sulfur, and/or nitrogen atoms. In certain embodiments, a substituent consists of carbon, hydrogen, fluorine, chlorine, bromine, and/or iodine atoms. In certain embodiments, a substituent consists of carbon, hydrogen, fluorine, and/or chlorine atoms. In certain embodiments, a substituent comprises 0, 1, 2, or 3 hydrogen bond donors. In certain embodiments, a substituent comprises 0, 1, 2, or 3 hydrogen bond acceptors.

A "counterion" or "anionic counterion" is a negatively charged group associated with a positively charged group in order to maintain electronic neutrality. An anionic counterion may be monovalent (e.g., including one formal negative charge). An anionic counterion may also be multivalent (e.g., including more than one formal negative charge), such as divalent or trivalent. Exemplary counterions include halide ions (e.g., $F^-$, $Cl^-$, $Br^-$, $I^-$), $NO_3^-$, $ClO_4^-$, $OH^-$, $H_2PO_4^-$, $HCO_3^-$, $HSO_4^-$, sulfonate ions (e.g., methansulfonate, trifluoromethanesulfonate, p-toluenesulfonate, benzenesulfonate, 10-camphor sulfonate, naphthalene-2-sulfonate, naphthalene-1-sulfonic acid-5-sulfonate, ethan-1-sulfonic acid-2-sulfonate, and the like), carboxylate ions (e.g., acetate, propanoate, benzoate, glycerate, lactate, tartrate, glycolate, gluconate, and the like), $BF_4^-$, $PF_4^-$, $PF_6^-$, $AsF_6^-$, $SbF_6^-$, $B[3,5-(CF_3)_2C_6H_3]_4^-$, $B(C_6F_5)_4^-$, $BPh_4^-$, $Al(OC(CF_3)_3)_4^-$, and carborane anions (e.g., $CB_{11}H_{12}^-$ or $(HCB_{11}Me_5Br_6)^-$). Exemplary counterions which may be multivalent include $CO_3^{2-}$, $HPO_4^{2-}$, $PO_4^{3-}$, $B_4O_7^{2-}$, $SO_4^{2-}$, $S_2O_3^{2-}$, carboxylate anions (e.g., tartrate, citrate, fumarate, maleate, malate, malonate, gluconate, succinate, glutarate, adipate, pimelate, suberate, azelate, sebacate, salicylate, phthalates, aspartate, glutamate, and the like), and carboranes.

Use of the phrase "at least one instance" refers to 1, 2, 3, 4, or more instances, but also encompasses a range, e.g., for example, from 1 to 4, from 1 to 3, from 1 to 2, from 2 to 4, from 2 to 3, or from 3 to 4 instances, inclusive.

These and other exemplary substituents are described in more detail in the Detailed Description, Examples, and Claims. The invention is not limited in any manner by the above exemplary listing of substituents.

The following definitions are more general terms used throughout the present application.

As used herein, the term "salt" refers to any and all salts, and encompasses pharmaceutically acceptable salts. Salts include ionic compounds that result from the neutralization reaction of an acid and a base. A salt is composed of one or more cations (positively charged ions) and one or more anions (negative ions) so that the salt is electrically neutral (without a net charge). Salts of the compounds of this invention include those derived from inorganic and organic acids and bases. Examples of acid addition salts are salts of an amino group formed with inorganic acids, such as hydrochloric acid, hydrobromic acid, phosphoric acid, sulfuric acid, and perchloric acid, or with organic acids, such as acetic acid, oxalic acid, maleic acid, tartaric acid, citric acid, succinic acid, or malonic acid or by using other methods known in the art such as ion exchange. Other salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate, hippurate, and the like. Salts derived from appropriate bases include alkali metal, alkaline earth metal, ammonium and $N+(C_{1-4}\text{ alkyl})_4$ salts. Representative alkali or alkaline earth metal salts include sodium, lithium, potassium, calcium, magnesium, and the like. Further salts include ammonium, quaternary ammonium, and amine cations formed using counterions such as halide, hydroxide, carboxylate, sulfate, phosphate, nitrate, lower alkyl sulfonate, and aryl sulfonate.

The term "pharmaceutically acceptable salt" refers to those salts which are, within the scope of sound medical judgment, suitable for use in contact with the tissues of humans and lower animals without undue toxicity, irritation, allergic response, and the like, and are commensurate with a reasonable benefit/risk ratio. Pharmaceutically acceptable salts are well known in the art. For example, Berge et al. describe pharmaceutically acceptable salts in detail in J. Pharmaceutical Sciences, 1977, 66, 1-19, incorporated herein by reference. Pharmaceutically acceptable salts of the compounds of this invention include those derived from suitable inorganic and organic acids and bases. Examples of pharmaceutically acceptable, nontoxic acid addition salts are salts of an amino group formed with inorganic acids, such as hydrochloric acid, hydrobromic acid, phosphoric acid, sulfuric acid, and perchloric acid or with organic acids, such as acetic acid, oxalic acid, maleic acid, tartaric acid, citric acid, succinic acid, or malonic acid or by using other methods known in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, ammonium, and $N^+(C_{1-4}\text{ alkyl})_4$ salts. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate, and aryl sulfonate.

The term "solvate" refers to forms of the compound, or a salt thereof, that are associated with a solvent, usually by a solvolysis reaction. This physical association may include hydrogen bonding. Conventional solvents include water, methanol, ethanol, acetic acid, DMSO, THF, diethyl ether, and the like. The compounds described herein may be prepared, e.g., in crystalline form, and may be solvated. Suitable solvates include pharmaceutically acceptable solvates and further include both stoichiometric solvates and non-stoichiometric solvates. In certain instances, the solvate will be capable of isolation, for example, when one or more solvent molecules are incorporated in the crystal lattice of a crystalline solid. "Solvate" encompasses both solution-phase and isolatable solvates. Representative solvates include hydrates, ethanolates, and methanolates.

The term "hydrate" refers to a compound that is associated with water. Typically, the number of the water molecules contained in a hydrate of a compound is in a definite ratio to the number of the compound molecules in the hydrate. Therefore, a hydrate of a compound may be represented, for example, by the general formula $R \cdot x\, H_2O$, wherein R is the compound, and x is a number greater than 0. A given compound may form more than one type of hydrate, including, e.g., monohydrates (x is 1), lower hydrates (x is a number greater than 0 and smaller than 1, e.g., hemihydrates ($R \cdot 0.5\, H_2O$)), and polyhydrates (x is a number greater than 1, e.g., dihydrates ($R \cdot 2H_2O$) and hexahydrates ($R \cdot 6H_2O$)).

The terms "composition" and "formulation" are used interchangeably.

A "subject" to which administration is contemplated refers to a human (i.e., male or female of any age group, e.g., pediatric subject (e.g., infant, child, or adolescent) or adult subject (e.g., young adult, middle-aged adult, or senior adult)) or non-human animal. In certain embodiments, the non-human animal is a mammal (e.g., primate (e.g., cynomolgus monkey or rhesus monkey), commercially relevant mammal (e.g., cattle, pig, horse, sheep, goat, cat, or dog), or bird (e.g., commercially relevant bird, such as chicken, duck, goose, or turkey)). In certain embodiments, the non-human animal is a fish, reptile, or amphibian. The non-human animal may be a male or female at any stage of development. The non-human animal may be a transgenic animal or genetically engineered animal. The term "patient" refers to a human subject in need of treatment of a disease.

The term "biological sample" refers to any sample including tissue samples (such as tissue sections and needle biopsies of a tissue); cell samples (e.g., cytological smears (such as Pap or blood smears) or samples of cells obtained by microdissection); samples of whole organisms (such as samples of yeasts or bacteria); or cell fractions, fragments or organelles (such as obtained by lysing cells and separating the components thereof by centrifugation or otherwise). Other examples of biological samples include blood, serum, urine, semen, fecal matter, cerebrospinal fluid, interstitial fluid, mucous, tears, sweat, pus, biopsied tissue (e.g., obtained by a surgical biopsy or needle biopsy), nipple aspirates, milk, vaginal fluid, saliva, swabs (such as buccal swabs), or any material containing biomolecules that is derived from a first biological sample.

The term "target tissue" refers to any biological tissue of a subject (including a group of cells, a body part, or an organ) or a part thereof, including blood and/or lymph vessels, which is the object to which a compound, particle, and/or composition of the invention is delivered. A target tissue may be an abnormal or unhealthy tissue, which may need to be treated. A target tissue may also be a normal or healthy tissue that is under a higher than normal risk of becoming abnormal or unhealthy, which may need to be prevented. In certain embodiments, the target tissue is the liver. In certain embodiments, the target tissue is the lung. A "non-target tissue" is any biological tissue of a subject (including a group of cells, a body part, or an organ) or a part thereof, including blood and/or lymph vessels, which is not a target tissue.

The term "administer," "administering," or "administration" refers to implanting, absorbing, ingesting, injecting, inhaling, or otherwise introducing a compound described herein, or a composition thereof, in or on a subject.

The terms "treatment," "treat," and "treating" refer to reversing, alleviating, delaying the onset of, or inhibiting the progress of a disease described herein. In some embodiments, treatment may be administered after one or more signs or symptoms of the disease have developed or have been observed. In other embodiments, treatment may be administered in the absence of signs or symptoms of the disease. For example, treatment may be administered to a susceptible subject prior to the onset of symptoms (e.g., in light of a history of symptoms and/or in light of exposure to a pathogen). Treatment may also be continued after symptoms have resolved, for example, to delay or prevent recurrence.

The terms "condition," "disease," and "disorder" are used interchangeably.

An "effective amount" of a compound described herein refers to an amount sufficient to elicit the desired biological response. An effective amount of a compound described herein may vary depending on such factors as the desired biological endpoint, severity of side effects, disease, or disorder, the identity, pharmacokinetics, and pharmacodynamics of the particular compound, the condition being treated, the mode, route, and desired or required frequency of administration, the species, age and health or general condition of the subject. In certain embodiments, an effective amount is a therapeutically effective amount. In certain embodiments, an effective amount is a prophylactic treatment. In certain embodiments, an effective amount is the amount of a compound described herein in a single dose. In certain embodiments, an effective amount is the combined amounts of a compound described herein in multiple doses. In certain embodiments, the desired dosage is delivered three times a day, two times a day, once a day, every other day, every third day, every week, every two weeks, every three weeks, or every four weeks. In certain embodiments, the desired dosage is delivered using multiple administrations (e.g., two, three, four, five, six, seven, eight, nine, ten, eleven, twelve, thirteen, fourteen, or more administrations).

In certain embodiments, an effective amount of a compound for administration one or more times a day to a 70 kg adult human comprises about 0.0001 mg to about 3000 mg, about 0.0001 mg to about 2000 mg, about 0.0001 mg to about 1000 mg, about 0.001 mg to about 1000 mg, about 0.01 mg to about 1000 mg, about 0.1 mg to about 1000 mg, about 1 mg to about 1000 mg, about 1 mg to about 100 mg, about 10 mg to about 1000 mg, or about 100 mg to about 1000 mg, of a compound per unit dosage form.

In certain embodiments, the compounds of the invention may be administered orally or parenterally at dosage levels sufficient to deliver from about 0.001 mg/kg to about 100 mg/kg, from about 0.01 mg/kg to about 50 mg/kg, from about 0.1 mg/kg to about 40 mg/kg, from about 0.5 mg/kg to about 30 mg/kg, from about 0.01 mg/kg to about 10 mg/kg, from about 0.1 mg/kg to about 10 mg/kg, from about 1 mg/kg to about 25 mg/kg, or from about 0.1-1 mg/kg, of subject body weight per day, one or more times a day, to obtain the desired therapeutic effect.

It will be appreciated that dose ranges as described herein provide guidance for the administration of provided pharmaceutical compositions to an adult. The amount to be administered to, for example, a child or an adolescent can be determined by a medical practitioner or person skilled in the art and can be lower or the same as that administered to an adult.

A "therapeutically effective amount" of a compound described herein is an amount sufficient to provide a therapeutic benefit in the treatment of a condition or to delay or minimize one or more symptoms associated with the condition. A therapeutically effective amount of a compound means an amount of therapeutic agent, alone or in combination with other therapies, which provides a therapeutic benefit in the treatment of the condition. The term "therapeutically effective amount" can encompass an amount that improves overall therapy, reduces or avoids symptoms, signs, or causes of the condition, and/or enhances the therapeutic efficacy of another therapeutic agent.

A "prophylactically effective amount" of a compound described herein is an amount sufficient to prevent a condition, or one or more symptoms associated with the condition or prevent its recurrence. A prophylactically effective amount of a compound means an amount of a therapeutic agent, alone or in combination with other agents, which provides a prophylactic benefit in the prevention of the condition. The term "prophylactically effective amount" can encompass an amount that improves overall prophylaxis or enhances the prophylactic efficacy of another prophylactic agent.

The term "prevent," "preventing," or "prevention" refers to a prophylactic treatment of a subject who is not and was not with a disease but is at risk of developing the disease or who was with a disease, is not with the disease, but is at risk of regression of the disease. In certain embodiments, the subject is at a higher risk of developing the disease or at a higher risk of regression of the disease than an average healthy member of a population.

A "proliferative disease" refers to a disease that occurs due to abnormal growth or extension by the multiplication of cells (Walker, Cambridge Dictionary of Biology; Cambridge University Press: Cambridge, UK, 1990). A proliferative disease may be associated with: 1) the pathological proliferation of normally quiescent cells; 2) the pathological migration of cells from their normal location (e.g., metastasis of neoplastic cells); 3) the pathological expression of proteolytic enzymes such as the matrix metalloproteinases (e.g., collagenases, gelatinases, and elastases); or 4) the pathological angiogenesis as in proliferative retinopathy and tumor metastasis. Exemplary proliferative diseases include cancers (i.e., "malignant neoplasms"), benign neoplasms, angiogenesis, inflammatory diseases, and autoimmune diseases.

The terms "inflammatory disease" and "inflammatory condition" are used interchangeably herein, and refer to a disease or condition caused by, resulting from, or resulting in inflammation. Inflammatory diseases and conditions include those diseases, disorders or conditions that are characterized by signs of pain (dolor, from the generation of noxious substances and the stimulation of nerves), heat (calor, from vasodilatation), redness (rubor, from vasodilatation and increased blood flow), swelling (tumor, from excessive inflow or restricted outflow of fluid), and/or loss of function (functio laesa, which can be partial or complete, temporary or permanent. Inflammation takes on many forms and includes, but is not limited to, acute, adhesive, atrophic, catarrhal, chronic, cirrhotic, diffuse, disseminated, exudative, fibrinous, fibrosing, focal, granulomatous, hyperplastic, hypertrophic, interstitial, metastatic, necrotic, obliterative, parenchymatous, plastic, productive, proliferous, pseudomembranous, purulent, sclerosing, seroplastic, serous, simple, specific, subacute, suppurative, toxic, traumatic, and/or ulcerative inflammation. The term "inflammatory disease" may also refer to a dysregulated inflammatory reaction that causes an exaggerated response by macrophages, granulocytes, and/or T-lymphocytes leading to abnormal tissue damage and/or cell death. An inflammatory disease can be either an acute or chronic inflammatory condition and can result from infections or non-infectious causes. Inflammatory diseases include, without limitation, atherosclerosis, arteriosclerosis, autoimmune disorders, multiple sclerosis, systemic lupus erythematosus, polymyalgia rheumatica (PMR), gouty arthritis, degenerative arthritis, tendonitis, bursitis, psoriasis, cystic fibrosis, arthrosteitis, rheumatoid arthritis, inflammatory arthritis, Sjogren's syndrome, giant cell arteritis, progressive systemic sclerosis (scleroderma), ankylosing spondylitis, polymyositis, dermatomyositis, pemphigus, pemphigoid, diabetes (e.g., Type I), myasthenia gravis, Hashimoto's thyroiditis, Graves' disease, Goodpasture's disease, mixed connective tissue disease, sclerosing cholangitis, inflammatory bowel disease, Crohn's disease, ulcerative colitis, pernicious anemia, inflammatory dermatoses, usual interstitial pneumonitis (UIP), asbestosis, silicosis, bronchiectasis, berylliosis, talcosis, pneumoconiosis, sarcoidosis, desquamative interstitial pneumonia, lymphoid interstitial pneumonia, giant cell interstitial pneumonia, cellular interstitial pneumonia, extrinsic allergic alveolitis, Wegener's granulomatosis and related forms of angiitis (temporal arteritis and polyarteritis nodosa), inflammatory dermatoses, hepatitis, delayed-type hypersensitivity reactions (e.g., poison ivy dermatitis), pneumonia, respiratory tract inflammation, Adult Respiratory Distress Syndrome (ARDS), encephalitis, immediate hypersensitivity reactions, asthma, hayfever, allergies, acute anaphylaxis, rheumatic fever, glomerulonephritis, pyelonephritis, cellulitis, cystitis, chronic cholecystitis, ischemia (ischemic injury), reperfusion injury, allograft rejection, host-versus-graft rejection, appendicitis, arteritis, blepharitis, bronchiolitis, bronchitis, cervicitis, cholangitis, chorioamnionitis, conjunctivitis, dacryoadenitis, dermatomyositis, endocarditis, endometritis, enteritis, enterocolitis, epicondylitis, epididymitis, fasciitis, fibrositis, gastritis, gastroenteritis, gingivitis, ileitis, iritis, laryngitis, myelitis, myocarditis, nephritis, omphalitis, oophoritis, orchitis, osteitis, otitis, pancreatitis, parotitis, pericarditis, pharyngitis, pleuritis, phlebitis, pneumonitis, proctitis, prostatitis, rhinitis, salpingitis, sinusitis, stomatitis, synovitis, testitis, tonsillitis, urethritis, urocystitis, uveitis, vaginitis, vasculitis, vulvitis, vulvovaginitis, angitis, chronic bronchitis, osteomyelitis, optic neuritis, temporal arteritis, transverse myelitis, necrotizing fasciitis, and necrotizing enterocolitis. An ocular inflammatory disease includes, but is not limited to, post-surgical inflammation. Additional exemplary inflammatory conditions include, but are not limited to, inflammation associated with acne, anemia (e.g., aplastic anemia, hemolytic autoimmune anemia), asthma, arteritis (e.g., polyarteritis, temporal arteritis, periarteritis nodosa, Takayasu's arteritis), arthritis (e.g., crystalline arthritis, osteoarthritis, psoriatic arthritis, gouty arthritis, reactive arthritis, rheumatoid arthritis and Reiter's arthritis), ankylosing spondylitis, amylosis, amyotrophic lateral sclerosis, autoimmune diseases, allergies or allergic reactions, atherosclerosis, bronchitis, bursitis, chronic prostatitis, conjunctivitis, Chagas disease, chronic obstructive pulmonary disease, cermatomyositis, diverticulitis, diabetes (e.g., type I diabetes mellitus, Type II diabetes mellitus), a skin condition (e.g., psoriasis, eczema, burns, dermatitis, pruritus (itch)), endometriosis, Guillain-Barre syndrome, infection, ischemic heart disease, Kawasaki disease, glomerulonephritis, gingivitis, hypersensitivity, headaches (e.g., migraine headaches, tension headaches), ileus (e.g., postoperative ileus and ileus during sepsis), idiopathic thrombocytopenic purpura, interstitial cystitis (painful bladder syndrome), gastrointestinal disorder (e.g., selected from peptic ulcers, regional enteritis, diverticulitis, gastrointestinal bleeding, eosinophilic gastrointestinal disorders (e.g., eosinophilic esophagitis, eosinophilic gastritis, eosinophilic gastroenteritis, eosinophilic colitis), gastritis, diarrhea, gastroesophageal reflux disease (GORD, or its synonym GERD), inflammatory bowel disease (IBD) (e.g., Crohn's disease, ulcerative colitis, collagenous colitis, lymphocytic colitis, ischemic colitis, diversion colitis, Behcet's syndrome, indeterminate colitis) and inflammatory bowel syndrome (IBS)), lupus, multiple sclerosis, morphea, myasthenia gravis, myocardial ischemia, nephrotic syndrome, pemphigus vulgaris, pernicious anemia, peptic ulcers, polymyositis, primary biliary cirrhosis, neuroinflammation associated with brain disorders (e.g., Parkinson's disease, Huntington's disease, and Alzheimer's disease), prostatitis, chronic inflammation associated with cranial radiation injury, pelvic inflammatory disease, reperfusion injury, regional enteritis, rheumatic fever, systemic lupus erythematosus, scleroderma, sarcoidosis, spondyloarthopathies, Sjogren's syndrome, thyroiditis, transplantation rejection, tendonitis, trauma or injury (e.g., frostbite, chemical irritants, toxins, scarring, burns, physical injury), vasculitis, vitiligo and Wegener's granulomatosis. In certain embodiments, the inflammatory disorder is selected from arthritis (e.g., rheumatoid arthritis), inflammatory bowel disease, inflammatory bowel syndrome, asthma, psoriasis, endometriosis, interstitial cystitis and prostatitis. In certain embodiments, the inflammatory condition is an acute inflammatory condition (e.g., for example, inflammation resulting from infection). In certain embodiments, the pre-inflammatory condition is a chronic inflammatory condition (e.g., conditions resulting from asthma, arthritis and inflammatory bowel disease). The compounds may also be useful in treating inflammation associated with trauma and non-inflammatory myalgia. The compounds disclosed herein may also be useful in treating inflammation associated with cancer An "autoimmune disease" refers to a disease arising from an inappropriate immune response of the body of a subject against substances and tissues normally present in the body. In other words, the immune system mistakes some part of the body as a pathogen and attacks its own cells. This may be restricted to certain organs (e.g., in autoimmune thyroiditis) or involve a particular tissue in different places (e.g., Goodpasture's disease which may affect the basement membrane in both the lung and kidney). The treatment of autoimmune diseases is typically with immunosuppression, e.g., medications which decrease the immune response. Exemplary autoimmune diseases include, but are not limited to, glomerulonephritis, Goodpasture's syndrome, necrotizing vasculitis, lymphadenitis, peri-arteritis nodosa, systemic lupus erythematosis, rheumatoid arthritis, psoriatic arthritis, psoriasis, ulcerative colitis, systemic sclerosis, dermatomyositis/polymyositis, anti-phospholipid antibody syndrome, scleroderma, pemphigus vulgaris, ANCA-associated vasculitis (e.g., Wegener's granulomatosis, microscopic polyangiitis), uveitis, Sjogren's syndrome, Crohn's disease, Reiter's syndrome, ankylosing spondylitis, Lyme disease, Guillain-Barré syndrome, Hashimoto's thyroiditis, and cardiomyopathy.

The term "angiogenesis" refers to the physiological process through which new blood vessels form from pre-existing vessels. Angiogenesis is distinct from vasculogenesis, which is the de novo formation of endothelial cells from mesoderm cell precursors. The first vessels in a developing embryo form through vasculogenesis, after which angiogenesis is responsible for most blood vessel growth during normal or abnormal development. Angiogenesis is a vital process in growth and development, as well as in wound healing and in the formation of granulation tissue. However, angiogenesis is also a fundamental step in the transition of tumors from a benign state to a malignant one, leading to the use of angiogenesis inhibitors in the treatment of cancer. Angiogenesis may be chemically stimulated by angiogenic proteins, such as growth factors (e.g., VEGF). "Pathological angiogenesis" refers to abnormal (e.g., excessive or insufficient) angiogenesis that amounts to and/or is associated with a disease.

The terms "neoplasm" and "tumor" are used herein interchangeably and refer to an abnormal mass of tissue wherein the growth of the mass surpasses and is not coordinated with the growth of a normal tissue. A neoplasm or tumor may be "benign" or "malignant," depending on the following characteristics: degree of cellular differentiation (including morphology and functionality), rate of growth, local invasion, and metastasis. A "benign neoplasm" is generally well differentiated, has characteristically slower growth than a malignant neoplasm, and remains localized to the site of origin. In addition, a benign neoplasm does not have the capacity to infiltrate, invade, or metastasize to distant sites. Exemplary benign neoplasms include, but are not limited to, lipoma, chondroma, adenomas, acrochordon, senile angiomas, seborrheic keratoses, lentigos, and sebaceous hyperplasias. In some cases, certain "benign" tumors may later give rise to malignant neoplasms, which may result from additional genetic changes in a subpopulation of the tumor's neoplastic cells, and these tumors are referred to as "pre-malignant neoplasms." An exemplary pre-malignant neoplasm is a teratoma. In contrast, a "malignant neoplasm" is generally poorly differentiated (anaplasia) and has characteristically rapid growth accompanied by progressive infiltration, invasion, and destruction of the surrounding tissue. Furthermore, a malignant neoplasm generally has the capacity to metastasize to distant sites. The term "metastasis," "metastatic," or "metastasize" refers to the spread or migration of cancerous cells from a primary or original tumor to another organ or tissue and is typically identifiable by the presence of a "secondary tumor" or "secondary cell mass" of the tissue type of the primary or original tumor and not of that of the organ or tissue in which the secondary (metastatic) tumor is located. For example, a prostate cancer that has migrated to bone is said to be metastasized prostate cancer and includes cancerous prostate cancer cells growing in bone tissue.

The term "cancer" refers to a class of diseases characterized by the development of abnormal cells that proliferate uncontrollably and have the ability to infiltrate and destroy normal body tissues. See e.g., *Stedman's Medical Dictionary*, 25th ed.; Hensyl ed.; Williams & Wilkins: Philadelphia, 1990. Exemplary cancers include, but are not limited to, acoustic neuroma; adenocarcinoma; adrenal gland cancer; anal cancer; angiosarcoma (e.g., lymphangiosarcoma, lymphangioendotheliosarcoma, hemangiosarcoma); appendix cancer; benign monoclonal gammopathy; biliary cancer (e.g., cholangiocarcinoma); bladder cancer; breast cancer (e.g., adenocarcinoma of the breast, papillary carcinoma of the breast, mammary cancer, medullary carcinoma of the breast); brain cancer (e.g., meningioma, glioblastomas, glioma (e.g., astrocytoma, oligodendroglioma), medulloblastoma); bronchus cancer; carcinoid tumor; cervical cancer (e.g., cervical adenocarcinoma); choriocarcinoma; chordoma; craniopharyngioma; colorectal cancer (e.g., colon cancer, rectal cancer, colorectal adenocarcinoma); connective tissue cancer; epithelial carcinoma; ependymoma; endotheliosarcoma (e.g., Kaposi's sarcoma, multiple idiopathic hemorrhagic sarcoma); endometrial cancer (e.g., uterine cancer, uterine sarcoma); esophageal cancer (e.g., adenocarcinoma of the esophagus, Barrett's adenocarcinoma); Ewing's sarcoma; ocular cancer (e.g., intraocular melanoma, retinoblastoma); familiar hypereosinophilia; gall bladder cancer; gastric cancer (e.g., stomach adenocarcinoma); gastrointestinal stromal tumor (GIST); germ cell cancer; head and neck cancer (e.g., head and neck squamous cell carcinoma, oral cancer (e.g., oral squamous cell carcinoma), throat cancer (e.g., laryngeal cancer, pharyngeal cancer, nasopharyngeal cancer, oropharyngeal cancer)); hematopoietic cancers (e.g., leukemia such as acute lymphocytic leukemia (ALL) (e.g., B-cell ALL, T-cell ALL), acute myelocytic leukemia (AML) (e.g., B-cell AML, T-cell AML), chronic myelocytic leukemia (CML) (e.g., B-cell CML, T-cell CML), and chronic lymphocytic leukemia (CLL) (e.g., B-cell CLL, T-cell CLL)); lymphoma such as Hodgkin lymphoma (HL) (e.g., B-cell HL, T-cell HL) and non-Hodgkin lymphoma (NHL) (e.g., B-cell NHL such as diffuse large cell lymphoma (DLCL) (e.g., diffuse large B-cell lymphoma), follicular lymphoma, chronic lymphocytic leukemia/small lymphocytic lymphoma (CLL/SLL), mantle cell lymphoma (MCL), marginal zone B-cell lymphomas (e.g., mucosa-associated lymphoid tissue (MALT)

lymphomas, nodal marginal zone B-cell lymphoma, splenic marginal zone B-cell lymphoma), primary mediastinal B-cell lymphoma, Burkitt lymphoma, lymphoplasmacytic lymphoma (i.e., Waldenström's macroglubulinemia), hairy cell leukemia (HCL), immunoblastic large cell lymphoma, precursor B-lymphoblastic lymphoma and primary central nervous system (CNS) lymphoma; and T-cell NHL such as precursor T-lymphoblastic lymphoma/leukemia, peripheral T-cell lymphoma (PTCL) (e.g., cutaneous T-cell lymphoma (CTCL) (e.g., mycosis fungoides, Sezary syndrome), angio-immunoblastic T-cell lymphoma, extranodal natural killer T-cell lymphoma, enteropathy type T-cell lymphoma, sub-cutaneous panniculitis-like T-cell lymphoma, and anaplastic large cell lymphoma); a mixture of one or more leukemia/lymphoma as described above; and multiple myeloma (MM)), heavy chain disease (e.g., alpha chain disease, gamma chain disease, mu chain disease); hemangioblastoma; hypopharynx cancer; inflammatory myofibroblastic tumors; immunocytic amyloidosis; kidney cancer (e.g., nephroblastoma a.k.a. Wilms' tumor, renal cell carcinoma); liver cancer (e.g., hepatocellular cancer (HCC), malignant hepatoma); lung cancer (e.g., bronchogenic carcinoma, small cell lung cancer (SCLC), non-small cell lung cancer (NSCLC), adenocarcinoma of the lung); leiomyosarcoma (LMS); mastocytosis (e.g., systemic mastocytosis); muscle cancer; myelodysplastic syndrome (MDS); mesothelioma; myeloproliferative disorder (MPD) (e.g., polycythemia vera (PV), essential thrombocytosis (ET), agnogenic myeloid metaplasia (AMM) a.k.a. myelofibrosis (MF), chronic idiopathic myelofibrosis, chronic myelocytic leukemia (CML), chronic neutrophilic leukemia (CNL), hypereosinophilic syndrome (HES)); neuroblastoma; neurofibroma (e.g., neurofibromatosis (NF) type 1 or type 2, schwannomatosis); neuroendocrine cancer (e.g., gastroenteropancreatic neuroendoctrine tumor (GEP-NET), carcinoid tumor); osteosarcoma (e.g., bone cancer); ovarian cancer (e.g., cystadenocarcinoma, ovarian embryonal carcinoma, ovarian adenocarcinoma); papillary adenocarcinoma; pancreatic cancer (e.g., pancreatic andenocarcinoma, intraductal papillary mucinous neoplasm (IPMN), Islet cell tumors); penile cancer (e.g., Paget's disease of the penis and scrotum); pinealoma; primitive neuroectodermal tumor (PNT); plasma cell neoplasia; paraneoplastic syndromes; intraepithelial neoplasms; prostate cancer (e.g., prostate adenocarcinoma); rectal cancer; rhabdomyosarcoma; salivary gland cancer; skin cancer (e.g., squamous cell carcinoma (SCC), keratoacanthoma (KA), melanoma, basal cell carcinoma (BCC)); small bowel cancer (e.g., appendix cancer); soft tissue sarcoma (e.g., malignant fibrous histiocytoma (MFH), liposarcoma, malignant peripheral nerve sheath tumor (MPNST), chondrosarcoma, fibrosarcoma, myxosarcoma); sebaceous gland carcinoma; small intestine cancer; sweat gland carcinoma; synovioma; testicular cancer (e.g., seminoma, testicular embryonal carcinoma); thyroid cancer (e.g., papillary carcinoma of the thyroid, papillary thyroid carcinoma (PTC), medullary thyroid cancer); urethral cancer; vaginal cancer; and vulvar cancer (e.g., Paget's disease of the vulva).

As used herein, "Tat" is used to describe transactivator of transcription protein. Tat is an early protein expressed by HIV after infection. Tat consists of 101 amino acids that make up 6 distinct domains: the acidic/proline rich, cysteine-rich, core, basic, glutamine-rich, and exon 2 domains. Tat promotes HIV gene expression by enhancing transcription of the integrated viral genome by RNA polymerase II (RNAPII) and is a critical molecule in sustaining HIV-1 viral replication. In the absence of Tat, RNAPII elongation is blocked, resulting in a premature termination of transcription and affording fragments of abortive HIV viral transcripts. Tat overcomes this elongation blockade through the recruitment of the positive transcription elongation factor b (p-TEFb) consisting of cyclin-dependent kinase 9 (CDK9) and cyclin T1 (Cyc T1). Acetylation of Lys28 on Tat by P300/CBP associated factors (PCAF) strengthens this association with p-TEFb. Together, this Tat/p-TEFb complex migrates to the transactivator response element (TAR) on a stem-loop located at the 5' end of nascent transcripts of viral RNA. Upon binding to TAR by the basic domain of Tat, this complex enhances the synthesis of full-length viral RNA, increasing both expression and fidelity of viral mRNA. Recruitment of the p-TEFb complex by Tat to TAR is critical for Tat-mediated HIV viral transcription with CDK9 causing a phosphorylation cascade resulting in phosphorylation of the Ser2 residue on the C-terminal domain (CTD) on RNA-PII. This RNAPII CTD phosphorylation induces the production of full-length viral HIV transcripts. Reactivation of HIV viral transcription by Tat is caused by modifications of histones in the chromatin environment. Modifications such as acetylation result in compacted chomatin having a transcriptionally active open state, while deacetylation or methylation of the N-terminal tails on histones results in a transcriptionally inactive closed state. This process is controlled by histone acetyltransferases (HATs) recruited by Tat in the chromatin environment; these HATs include CREB binding protein (CBP), transcriptional coactivator P300, and human GCN5 (hGCN5). P300 and hGCN5 acetylate amino acids Lys50 and Lys51 on Tat, respectively, resulting in Tat dissociating from TAR and terminating Tat-mediated HIV viral transcription in a time-dependent manner to produce mature full-length viral transcripts. Upon dissociation from TAR, Tat recruits the nucleosome SWI/SNF, a chromatin-remodeling complex, to further facilitate HIV transcription at the viral promotor in synergy with the coactivator p300. Additionally, Tat also migrates transcellularly into infected and non-infected cells to modulate cellular signaling cascades and cellular gene expression. The pairing of this signaling with manipulation of gene expression may significantly contribute to the pathogenesis of HIV-1. Transgenic mice expressing Tat protein exhibit apoptosis, astrocytosis, neurodegeneration, deficits of learning and memory, and increased drug-seeking behavior, effects similar to those observed in humans. Tat expression remains detectable in blood or cerebrospinal fluid in approximately 40% of anti-retroviral therapy (ART) patients and is detected at least once in nearly 90% of cases. Thus, Tat expression persists despite ART, potentially exerting continuous deleterious effects even though the virus may be undetected. The ability of Tat to dramatically increase HIV-1 replication, the lack of Tat having cellular homologs, along with its transcellular migration and signaling capabilities, make Tat an attractive target for therapeutic intervention. Through the inhibition of Tat, there lies the potential to prevent viral reactivation in latently infected cells, resulting in extensive silencing of the virus. The use of a Tat inhibitor in combination antiretroviral therapy (cART) could potentially allow HIV+ patients to effectively discontinue ART treatment and help prevent neurological diseases and mortality associated with prolonged HIV infection. Unfortunately, there are no current Tat inhibitors in clinical use for the treatment of HIV; however, an analog of a cortistatin natural product has been identified as the most potent inhibitor of Tat known to date.

DETAILED DESCRIPTION

Provided herein are novel compounds, and compositions, methods, uses, and kits comprising the same. The compounds are didehydro-cortistatin A analogs and the present disclosure details their use as therapeutics for treatment of diseases and symptoms thereof, including cancer, viral infection (e.g., HIV), and angiogenesis proliferation disorders. Methods of synthesis are also described.

Compounds

Thus, in one aspect, provided herein are compounds of Formula (I):

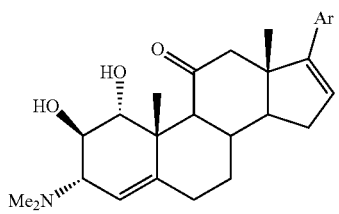

or salt, solvate, or hydrate thereof, wherein Ar is as defined herein. In some embodiments, Ar is selected from the group consisting of pyridinyl, quinolinyl, isoquinolinyl, quinazolinyl, quinoxalinyl, phthalazinyl, cinnolinyl, indazolyl, pyridinyl, pyridazinyl, pyrimidinyl, and pyrazinyl; wherein Ar is optionally substituted with 1-4 substituents selected from $C_1$-$C_6$ alkyl, alkenyl, alkynyl, cycloalkyl, heterocycloalkyl, aralkyl, heteroaralkyl, aryl, heteroaryl, halogen (i.e., F, Cl, Br, I), haloalkyl, cyano, nitro, alkoxy, aryloxy, hydroxyl, hydroxylalkyl, oxo (i.e., carbonyl), carboxyl, formyl, mercapto, mercaptoalkyl, amino, aminoalkyl, dialkylamino, and amido.

In one aspect, provided herein are compounds of Formula (I):

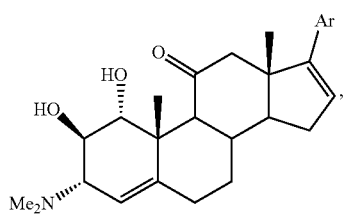

or salt, solvate, or hydrate thereof, wherein Ar is as defined herein. In some embodiments, Ar is selected from the group consisting of:

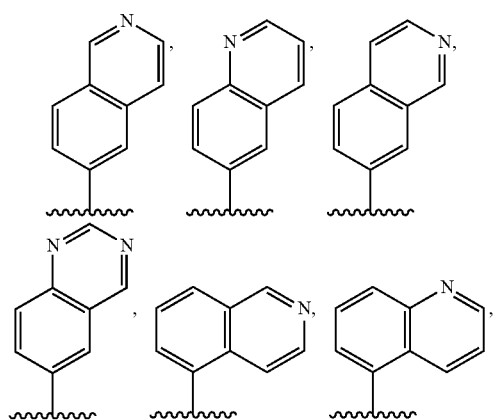

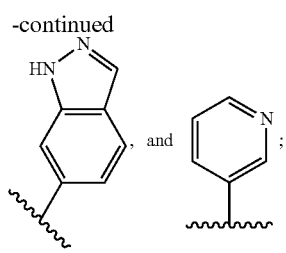

wherein Ar is optionally substituted with 1-4 substituents selected from $C_1$-$C_6$ alkyl, alkenyl, alkynyl, cycloalkyl, heterocycloalkyl, aralkyl, heteroaralkyl, aryl, heteroaryl, halogen (i.e., F, Cl, Br, I), haloalkyl, cyano, nitro, alkoxy, aryloxy, hydroxyl, hydroxylalkyl, oxo (i.e., carbonyl), carboxyl, formyl, mercapto, mercaptoalkyl, amino, aminoalkyl, dialkylamino, and amido.

In one aspect, provided herein are compounds of Formula (I):

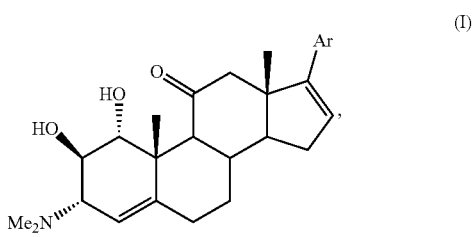

or salt, solvate, or hydrate thereof, wherein Ar is as defined herein. In some embodiments, Ar is selected from the group consisting of:

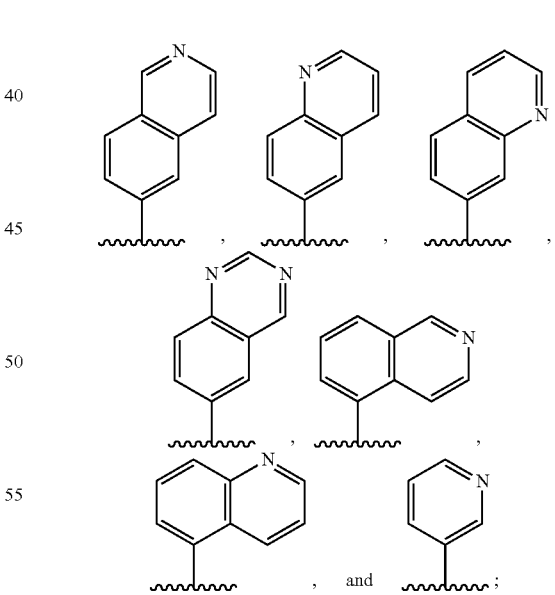

wherein Ar is optionally substituted with 1-4 substituents selected from $C_1$-$C_6$ alkyl, alkenyl, alkynyl, cycloalkyl, heterocycloalkyl, aralkyl, heteroaralkyl, aryl, heteroaryl, halogen (i.e., F, Cl, Br, I), haloalkyl, cyano, nitro, alkoxy, aryloxy, hydroxyl, hydroxylalkyl, oxo (i.e., carbonyl), carboxyl, formyl, mercapto, mercaptoalkyl, amino, aminoalkyl, dialkylamino, and amido.

In some embodiments, the compound of Formula (1), or salt, solvate, or hydrate thereof, is of the formula:

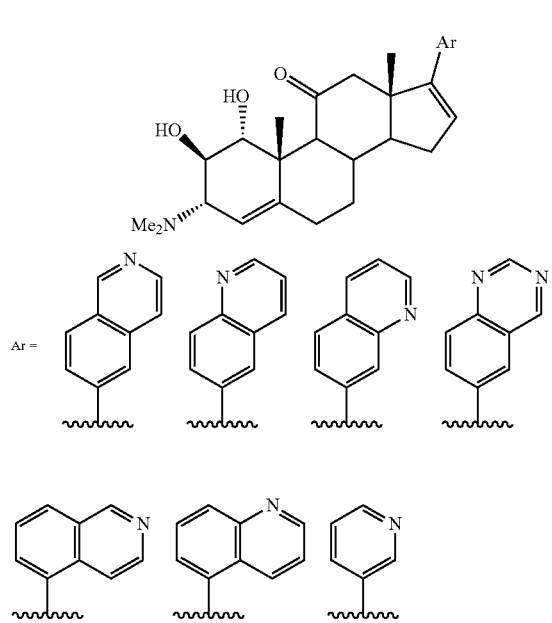

wherein each Ar is independently optionally substituted with 1-4 substituents selected from $C_1$-$C_6$ alkyl, alkenyl, alkynyl, cycloalkyl, heterocycloalkyl, aralkyl, heteroaralkyl, aryl, heteroaryl, halogen (i.e., F, Cl, Br, I), haloalkyl, cyano, nitro, alkoxy, aryloxy, hydroxyl, hydroxylalkyl, oxo (i.e., carbonyl), carboxyl, formyl, mercapto, mercaptoalkyl, amino, aminoalkyl, dialkylamino, and amido.

In some embodiments, the compound of Formula (I) is of Formula (I-A):

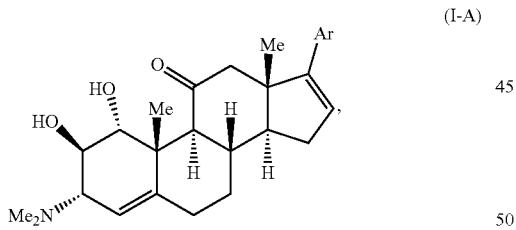

(I-A)

or salt, solvate, or hydrate thereof.

As provided herein, Ar is selected from the group consisting of pyridinyl, quinolinyl, isoquinolinyl, quinazolinyl, quinazolinyl, phthalazinyl, indazolyl, cinnolinyl, pyridinyl, pyridazinyl, pyrimidinyl, and pyrazinyl.

In some embodiments, Ar is pyridinyl. In some embodiments, Ar is quinolinyl. In some embodiments, Ar is isoquinolinyl. In some embodiments, Ar is quinazolinyl. In some embodiments, Ar is quinazolinyl. In some embodiments, Ar is phthalazinyl. In some embodiments, Ar is cinnolinyl. In some embodiments, Ar is indazolyl. In some embodiments, Ar is pyridinyl. In some embodiments, Ar is pyridazinyl. In some embodiments, Ar is pyrimidinyl. In some embodiments, Ar is pyrazinyl.

In some embodiments Ar is selected from the group consisting of

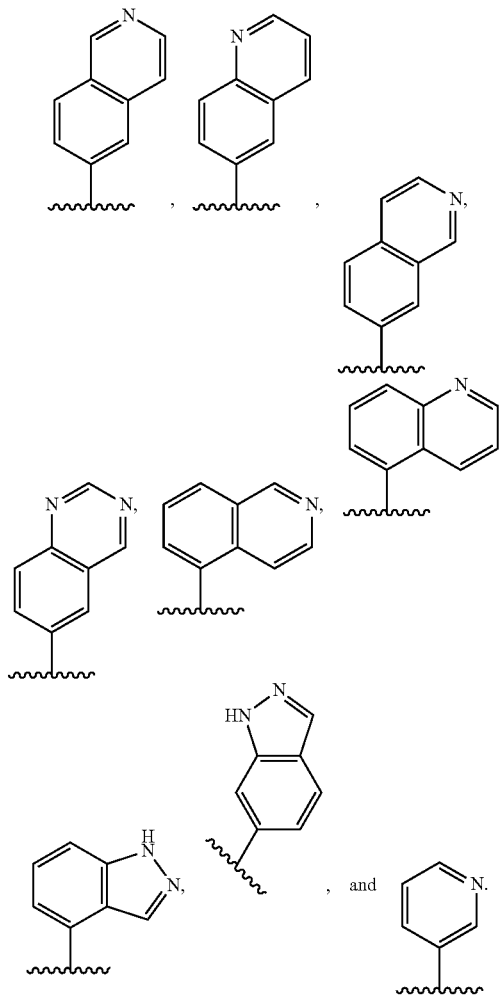

In some embodiments, Ar is

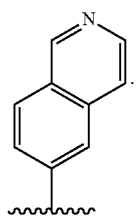 [SMILES: *c1ccc2cnccc2c1]

In some embodiments, Ar is

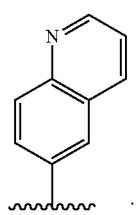 [SMILES: *c1ccc2ncccc2c1]

In some embodiments, Ar is

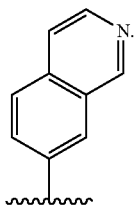 [SMILES: *c1ccc2ccncc2c1]

In some embodiments, Ar is

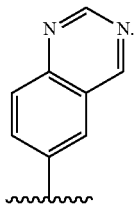 [SMILES: *c1ccc2ncncc2c1]

In some embodiments, Ar is

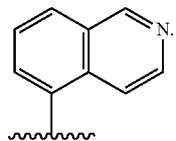 [SMILES: *c1cccc2cnccc12]

In some embodiments, Ar is

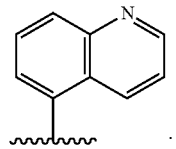 [SMILES: *c1cccc2ncccc12]

In some embodiments, Ar is

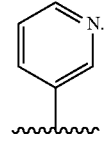 [SMILES: *c1cccnc1]

In some embodiments, Ar is

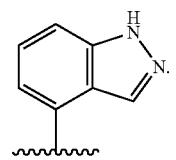

In some embodiments, Ar is

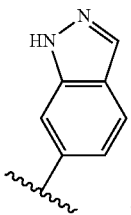

In embodiments, each of the aforementioned structures may be substituted or unsubstituted.

In some embodiments, Ar is selected from the group consisting of pyridinyl, quinolinyl, isoquinolinyl, and quinazolinyl. In some embodiments, Ar is pyridinyl. In certain embodiments, Ar is quinolinyl. In some embodiments, Ar is isoquinolinyl. In certain embodiments, Ar is quinazolinyl.

In some embodiments, Ar is optionally substituted with 1-4 substituents selected from $C_1$-$C_6$ alkyl, alkenyl, alkynyl, cycloalkyl, heterocycloalkyl, aralkyl, heteroaralkyl, aryl, heteroaryl, halogen (i.e., F, Cl, Br, I), haloalkyl, cyano, nitro, alkoxy, aryloxy, hydroxyl, hydroxylalkyl, oxo (i.e., carbonyl), carboxyl, formyl, mercapto, mercaptoalkyl, amino, aminoalkyl, dialkylamino, and amido. In some embodiments, Ar is optionally substituted with 1-4 substituents selected from $C_1$-$C_6$ alkyl, alkenyl, alkynyl, cycloalkyl, heterocycloalkyl, aralkyl, heteroaralkyl, aryl, heteroaryl, halogen, haloalkyl, cyano, nitro, alkoxy, aryloxy, hydroxyl, hydroxylalkyl, oxo, carboxyl, formyl, mercapto, mercaptoalkyl, amino, aminoalkyl, dialkylamino, and amido. In some embodiments, Ar is unsubstituted. In certain embodiments, Ar is substituted. In some embodiments, Ar is substituted with $C_1$-$C_6$ alkyl. In some embodiments, Ar is substituted with alkenyl. In some embodiments, Ar is substituted with alkynyl. In some embodiments, Ar is substituted with cycloalkyl. In some embodiments, Ar is substituted with heterocycloalkyl. In some embodiments, Ar is substituted with aralkyl. In some embodiments, Ar is substituted with heteroaralkyl. In some embodiments, Ar is substituted with aryl. In some embodiments, Ar is substituted with heteroaryl. In some embodiments, Ar is substituted with halogen. In some embodiments, Ar is substituted with F. In some embodiments, Ar is substituted with $C_1$. In some embodiments, Ar is substituted with Br. In some embodiments, Ar is substituted with I. In some embodiments, Ar is substituted with haloalkyl. In some embodiments, Ar is substituted with cyano. In some embodiments, Ar is substituted with nitro. In some embodiments, Ar is substituted with alkoxy. In some embodiments, Ar is substituted with aryloxy. In some embodiments, Ar is substituted with hydroxyl. In some embodiments, Ar is substituted with hydroxylalkyl. In some embodiments, Ar is substituted with oxo. In some embodiments, Ar is substituted with carbonyl. In some embodiments, Ar is substituted with carboxyl. In some embodiments, Ar is substituted with formyl. In some embodiments, Ar is substituted with mercapto. In some embodiments, Ar is substituted with mercaptoalkyl. In some embodiments, Ar is substituted with amino. In some embodiments, Ar is substituted with aminoalkyl. In some embodiments, Ar is substituted with dialkylamino. In some embodiments, Ar is substituted with amido. In some embodiments, Ar is substituted with substituted with one or more groups independently selected from $C_1$-$C_6$ alkyl, halogen, haloalkyl, alkoxy, and amino. In certain embodiments, Ar is substituted with substituted with one or more groups independently selected from $C_1$-$C_6$ alkyl and halogen.

In some embodiments, the compound is of the formula:

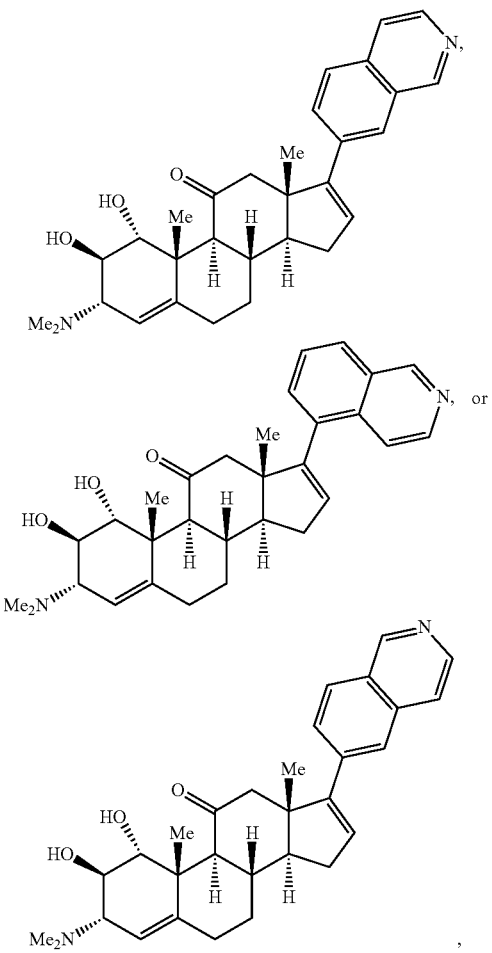

or salt, solvate, or hydrate thereof.

Compositions

The present disclosure provides pharmaceutical compositions comprising a compound of Formula (I), or a pharmaceutically acceptable salt thereof, and optionally a pharmaceutically acceptable excipient. In certain embodiments, the pharmaceutical composition described herein comprises a compound of Formula (I), or a pharmaceutically acceptable salt thereof, and a pharmaceutically acceptable excipient.

In certain embodiments, the compound described herein is provided in an effective amount in the pharmaceutical composition. In certain embodiments, the effective amount is a therapeutically effective amount. In certain embodiments, the effective amount is a prophylactically effective amount. In certain embodiments, the effective amount is an amount effective for treating a proliferative disease in a subject in need thereof. In certain embodiments, the effective amount is an amount effective for preventing a proliferative disease in a subject in need thereof. In certain embodiments, the effective amount is an amount effective for treating a hematological disease in a subject in need thereof. In certain embodiments, the effective amount is an amount effective for preventing a hematological disease in a subject in need thereof. In certain embodiments, the effective amount is an amount effective for treating a neurological disease in a subject in need thereof. In certain embodiments, the effective amount is an amount effective for preventing a neurological disease in a subject in need thereof. In certain embodiments, the effective amount is an amount effective for treating a in a painful condition subject in need thereof. In certain embodiments, the effective amount is an amount effective for preventing a painful condition in a subject in need thereof. In certain embodiments, the effective amount is an amount effective for treating a psychiatric disorder in a subject in need thereof. In certain embodiments, the effective amount is an amount effective for preventing a psychiatric disorder in a subject in need thereof. In certain embodiments, the effective amount is an amount effective for treating a metabolic disorder in a subject in need thereof. In certain embodiments, the effective amount is an amount effective for preventing a metabolic disorder in a subject in need thereof. In certain embodiments, the effective amount is an amount effective for reducing the risk of developing a disease (e.g., proliferative disease, hematological disease, neurological disease, painful condition, psychiatric disorder, or metabolic disorder) in a subject in need thereof. In certain embodiments, the effective amount is an amount effective for inhibiting the activity (e.g., aberrant activity, such as increased activity) of a protein (e.g., transactivator of transcription (Tat)) in a subject or cell.

In certain embodiments, the subject is an animal. The animal may be of either sex and may be at any stage of development. In certain embodiments, the subject described herein is a human. In certain embodiments, the subject is a non-human animal. In certain embodiments, the subject is a mammal. In certain embodiments, the subject is a non-human mammal. In certain embodiments, the subject is a domesticated animal, such as a dog, cat, cow, pig, horse, sheep, or goat. In certain embodiments, the subject is a companion animal, such as a dog or cat. In certain embodiments, the subject is a livestock animal, such as a cow, pig, horse, sheep, or goat. In certain embodiments, the subject is a zoo animal. In another embodiment, the subject is a research animal, such as a rodent (e.g., mouse, rat), dog, pig, or non-human primate. In certain embodiments, the animal is a genetically engineered animal. In certain embodiments, the animal is a transgenic animal (e.g., transgenic mice and transgenic pigs). In certain embodiments, the subject is a fish or reptile.

In certain embodiments, the cell is present in vitro. In certain embodiments, the cell is present in vivo.

In certain embodiments, the effective amount is an amount effective for inhibiting the activity of a protein (e.g., transactivator of transcription (Tat)) by at least about 10%, at least about 20%, at least about 30%, at least about 40%, at least about 50%, at least about 60%, at least about 70%, at least about 80%, at least about 90%, at least about 95%, or at least about 98%. In certain embodiments, the effective amount is an amount effective for inhibiting the activity of transactivator of transcription (Tat) protein by not more than 10%, not more than 20%, not more than 30%, not more than 40%, not more than 50%, not more than 60%, not more than 70%, not more than 80%, not more than 90%, not more than 95%, or not more than 98%. In certain embodiments, the effective amount is an amount effective for inhibiting the activity of transactivator of transcription (Tat) protein by a range between a percentage described in this paragraph and another percentage described in this paragraph, inclusive.

Pharmaceutical compositions described herein can be prepared by any method known in the art of pharmaceutics. In general, such preparatory methods include bringing the compound described herein (i.e., the "active ingredient") into association with a carrier or excipient, and/or one or more other accessory ingredients, and then, if necessary and/or desirable, shaping, and/or packaging the product into a desired single- or multi-dose unit.

Pharmaceutical compositions can be prepared, packaged, and/or sold in bulk, as a single unit dose, and/or as a plurality of single unit doses. A "unit dose" is a discrete amount of the pharmaceutical composition comprising a predetermined amount of the active ingredient. The amount of the active ingredient is generally equal to the dosage of the active ingredient which would be administered to a subject and/or a convenient fraction of such a dosage, such as one-half or one-third of such a dosage.

Relative amounts of the active ingredient, the pharmaceutically acceptable excipient, and/or any additional ingredients in a pharmaceutical composition described herein will vary, depending upon the identity, size, and/or condition of the subject treated and further depending upon the route by which the composition is to be administered. The composition may comprise between 0.1% and 100% (w/w) active ingredient.

Pharmaceutically acceptable excipients used in the manufacture of provided pharmaceutical compositions include inert diluents, dispersing and/or granulating agents, surface active agents and/or emulsifiers, disintegrating agents, binding agents, preservatives, buffering agents, lubricating agents, and/or oils. Excipients such as cocoa butter and suppository waxes, coloring agents, coating agents, sweetening, flavoring, and perfuming agents may also be present in the composition.

Exemplary diluents include calcium carbonate, sodium carbonate, calcium phosphate, dicalcium phosphate, calcium sulfate, calcium hydrogen phosphate, sodium phosphate lactose, sucrose, cellulose, microcrystalline cellulose, kaolin, mannitol, sorbitol, inositol, sodium chloride, dry starch, cornstarch, powdered sugar, and mixtures thereof.

Exemplary granulating and/or dispersing agents include potato starch, corn starch, tapioca starch, sodium starch glycolate, clays, alginic acid, guar gum, citrus pulp, agar, bentonite, cellulose, and wood products, natural sponge, cation-exchange resins, calcium carbonate, silicates, sodium carbonate, cross-linked poly(vinyl-pyrrolidone) (crospovidone), sodium carboxymethyl starch (sodium starch glycolate), carboxymethyl cellulose, cross-linked sodium carboxymethyl cellulose (croscarmellose), methylcellulose, pregelatinized starch (starch 1500), microcrystalline starch, water insoluble starch, calcium carboxymethyl cellulose, magnesium aluminum silicate (Veegum), sodium lauryl sulfate, quaternary ammonium compounds, and mixtures thereof.

Exemplary surface active agents and/or emulsifiers include natural emulsifiers (e.g., acacia, agar, alginic acid, sodium alginate, tragacanth, chondrux, cholesterol, xanthan, pectin, gelatin, egg yolk, casein, wool fat, cholesterol, wax, and lecithin), colloidal clays (e.g., bentonite (aluminum silicate) and Veegum (magnesium aluminum silicate)), long chain amino acid derivatives, high molecular weight alcohols (e.g., stearyl alcohol, cetyl alcohol, oleyl alcohol, triacetin monostearate, ethylene glycol distearate, glyceryl monostearate, and propylene glycol monostearate, polyvinyl alcohol), carbomers (e.g., carboxy polymethylene, polyacrylic acid, acrylic acid polymer, and carboxyvinyl polymer), carrageenan, cellulosic derivatives (e.g., carboxymethylcellulose sodium, powdered cellulose, hydroxymethyl cellulose, hydroxypropyl cellulose, hydroxypropyl methylcellulose, methylcellulose), sorbitan fatty acid esters (e.g., polyoxyethylene sorbitan monolaurate (Tween® 20), polyoxyethylene sorbitan (Tween® 60), polyoxyethylene sorbitan monooleate (Tween® 80), sorbitan monopalmitate (Span® 40), sorbitan monostearate (Span® 60), sorbitan tristearate (Span® 65), glyceryl monooleate, sorbitan monooleate (Span® 80), polyoxyethylene esters (e.g., polyoxyethylene monostearate (Myrj® 45), polyoxyethylene hydrogenated castor oil, polyethoxylated castor oil, polyoxymethylene stearate, and Solutol®), sucrose fatty acid esters, polyethylene glycol fatty acid esters (e.g., Cremophor®), polyoxyethylene ethers, (e.g., polyoxyethylene lauryl ether (Brij© 30)), poly(vinyl-pyrrolidone), diethylene glycol monolaurate, triethanolamine oleate, sodium oleate, potassium oleate, ethyl oleate, oleic acid, ethyl laurate, sodium lauryl sulfate, Pluronic® F-68, poloxamer P-188, cetrimonium bromide, cetylpyridinium chloride, benzalkonium chloride, docusate sodium, and/or mixtures thereof.

Exemplary binding agents include starch (e.g., cornstarch and starch paste), gelatin, sugars (e.g., sucrose, glucose, dextrose, dextrin, molasses, lactose, lactitol, mannitol, etc.), natural and synthetic gums (e.g., acacia, sodium alginate, extract of Irish moss, panwar gum, ghatti gum, mucilage of isapol husks, carboxymethylcellulose, methylcellulose, ethylcellulose, hydroxyethylcellulose, hydroxypropyl cellulose, hydroxypropyl methylcellulose, microcrystalline cellulose, cellulose acetate, poly(vinyl-pyrrolidone), magnesium aluminum silicate (Veegum®), and larch arabogalactan), alginates, polyethylene oxide, polyethylene glycol, inorganic calcium salts, silicic acid, polymethacrylates, waxes, water, alcohol, and/or mixtures thereof.

Exemplary preservatives include antioxidants, chelating agents, antimicrobial preservatives, antifungal preservatives, antiprotozoan preservatives, alcohol preservatives, acidic preservatives, and other preservatives. In certain embodiments, the preservative is an antioxidant. In other embodiments, the preservative is a chelating agent.

Exemplary antioxidants include alpha tocopherol, ascorbic acid, ascorbyl palmitate, butylated hydroxyanisole, butylated hydroxytoluene, monothioglycerol, potassium metabisulfite, propionic acid, propyl gallate, sodium ascorbate, sodium bisulfite, sodium metabisulfite, and sodium sulfite.

Exemplary chelating agents include ethylenediaminetetraacetic acid (EDTA) and salts and hydrates thereof (e.g., sodium edetate, disodium edetate, trisodium edetate, calcium disodium edetate, dipotassium edetate, and the like), citric acid and salts and hydrates thereof (e.g., citric acid monohydrate), fumaric acid and salts and hydrates thereof, malic acid and salts and hydrates thereof, phosphoric acid and salts and hydrates thereof, and tartaric acid and salts and hydrates thereof. Exemplary antimicrobial preservatives include benzalkonium chloride, benzethonium chloride, benzyl alcohol, bronopol, cetrimide, cetylpyridinium chloride, chlorhexidine, chlorobutanol, chlorocresol, chloroxylenol, cresol, ethyl alcohol, glycerin, hexetidine, imidurea, phenol, phenoxyethanol, phenylethyl alcohol, phenylmercuric nitrate, propylene glycol, and thimerosal.

Exemplary antifungal preservatives include butyl paraben, methyl paraben, ethyl paraben, propyl paraben, benzoic acid, hydroxybenzoic acid, potassium benzoate, potassium sorbate, sodium benzoate, sodium propionate, and sorbic acid.

Exemplary alcohol preservatives include ethanol, polyethylene glycol, phenol, phenolic compounds, bisphenol, chlorobutanol, hydroxybenzoate, and phenylethyl alcohol.

Exemplary acidic preservatives include vitamin A, vitamin C, vitamin E, beta-carotene, citric acid, acetic acid, dehydroacetic acid, ascorbic acid, sorbic acid, and phytic acid.

Other preservatives include tocopherol, tocopherol acetate, deteroxime mesylate, cetrimide, butylated hydroxyanisol (BHA), butylated hydroxytoluened (BHT), ethylenediamine, sodium lauryl sulfate (SLS), sodium lauryl ether sulfate (SLES), sodium bisulfite, sodium metabisulfite, potassium sulfite, potassium metabisulfite, Glydant® Plus, Phenonip©, methylparaben, Germall® 115, Germaben® II, Neolone®, Kathon*, and Euxyl®.

Exemplary buffering agents include citrate buffer solutions, acetate buffer solutions, phosphate buffer solutions, ammonium chloride, calcium carbonate, calcium chloride, calcium citrate, calcium glubionate, calcium gluceptate, calcium gluconate, D-gluconic acid, calcium glycerophosphate, calcium lactate, propanoic acid, calcium levulinate, pentanoic acid, dibasic calcium phosphate, phosphoric acid, tribasic calcium phosphate, calcium hydroxide phosphate, potassium acetate, potassium chloride, potassium gluconate, potassium mixtures, dibasic potassium phosphate, monobasic potassium phosphate, potassium phosphate mixtures, sodium acetate, sodium bicarbonate, sodium chloride, sodium citrate, sodium lactate, dibasic sodium phosphate, monobasic sodium phosphate, sodium phosphate mixtures, tromethamine, magnesium hydroxide, aluminum hydroxide, alginic acid, pyrogen-free water, isotonic saline, Ringer's solution, ethyl alcohol, and mixtures thereof.

Exemplary lubricating agents include magnesium stearate, calcium stearate, stearic acid, silica, talc, malt, glyceryl behanate, hydrogenated vegetable oils, polyethylene glycol, sodium benzoate, sodium acetate, sodium chloride, leucine, magnesium lauryl sulfate, sodium lauryl sulfate, and mixtures thereof.

Exemplary natural oils include almond, apricot kernel, avocado, babassu, bergamot, black current seed, borage, cade, camomile, canola, caraway, carnauba, castor, cinnamon, cocoa butter, coconut, cod liver, coffee, corn, cotton seed, emu, *eucalyptus*, evening primrose, fish, flaxseed, geraniol, gourd, grape seed, hazel nut, hyssop, isopropyl myristate, jojoba, kukui nut, lavandin, lavender, lemon, *Litsea cubeba*, macadamia nut, mallow, mango seed, meadowfoam seed, mink, nutmeg, olive, orange, orange roughy, palm, palm kernel, peach kernel, peanut, poppy seed, pumpkin seed, rapeseed, rice bran, rosemary, safflower, sandalwood, sasquana, savoury, sea buckthorn, sesame, shea butter, silicone, soybean, sunflower, tea tree, thistle, tsubaki, vetiver, walnut, and wheat germ oils. Exemplary synthetic oils include, but are not limited to, butyl stearate, caprylic triglyceride, capric triglyceride, cyclomethicone, diethyl sebacate, dimethicone 360, isopropyl myristate, mineral oil, octyldodecanol, oleyl alcohol, silicone oil, and mixtures thereof.

Liquid dosage forms for oral and parenteral administration include pharmaceutically acceptable emulsions, microemulsions, solutions, suspensions, syrups and elixirs. In addition to the active ingredients, the liquid dosage forms may comprise inert diluents commonly used in the art such as, for example, water or other solvents, solubilizing agents and emulsifiers such as ethyl alcohol, isopropyl alcohol, ethyl carbonate, ethyl acetate, benzyl alcohol, benzyl benzoate, propylene glycol, 1,3-butylene glycol, dimethylformamide, oils (e.g., cottonseed, groundnut, corn, germ, olive, castor, and sesame oils), glycerol, tetrahydrofurfuryl alcohol, polyethylene glycols and fatty acid esters of sorbitan, and mixtures thereof. Besides inert diluents, the oral compositions can include adjuvants such as wetting agents, emulsifying and suspending agents, sweetening, flavoring, and perfuming agents. In certain embodiments for parenteral administration, the conjugates described herein are mixed with solubilizing agents such as Cremophor®, alcohols, oils, modified oils, glycols, polysorbates, cyclodextrins, polymers, and mixtures thereof.

Injectable preparations, for example, sterile injectable aqueous or oleaginous suspensions can be formulated according to the known art using suitable dispersing or wetting agents and suspending agents. The sterile injectable preparation can be a sterile injectable solution, suspension, or emulsion in a nontoxic parenterally acceptable diluent or solvent, for example, as a solution in 1,3-butanediol. Among the acceptable vehicles and solvents that can be employed are water, Ringer's solution, U.S.P., and isotonic sodium chloride solution. In addition, sterile, fixed oils are conventionally employed as a solvent or suspending medium. For this purpose any bland fixed oil can be employed including synthetic mono- or di-glycerides. In addition, fatty acids such as oleic acid are used in the preparation of injectables.

The injectable formulations can be sterilized, for example, by filtration through a bacterial-retaining filter, or by incorporating sterilizing agents in the form of sterile solid compositions which can be dissolved or dispersed in sterile water or other sterile injectable medium prior to use.

In order to prolong the effect of a drug, it is often desirable to slow the absorption of the drug from subcutaneous or intramuscular injection. This can be accomplished by the use of a liquid suspension of crystalline or amorphous material with poor water solubility. The rate of absorption of the drug then depends upon its rate of dissolution, which, in turn, may depend upon crystal size and crystalline form. Alternatively, delayed absorption of a parenterally administered drug form may be accomplished by dissolving or suspending the drug in an oil vehicle.

Compositions for rectal or vaginal administration are typically suppositories which can be prepared by mixing the conjugates described herein with suitable non-irritating excipients or carriers such as cocoa butter, polyethylene glycol, or a suppository wax which are solid at ambient temperature but liquid at body temperature and therefore melt in the rectum or vaginal cavity and release the active ingredient.

Solid dosage forms for oral administration include capsules, tablets, pills, powders, and granules. In such solid dosage forms, the active ingredient is mixed with at least one inert, pharmaceutically acceptable excipient or carrier such as sodium citrate or dicalcium phosphate and/or (a) fillers or extenders such as starches, lactose, sucrose, glucose, mannitol, and silicic acid, (b) binders such as, for example, carboxymethylcellulose, alginates, gelatin, polyvinylpyrrolidinone, sucrose, and acacia, (c) humectants such as glycerol, (d) disintegrating agents such as agar, calcium carbonate, potato or tapioca starch, alginic acid, certain silicates, and sodium carbonate, (e) solution retarding agents such as paraffin, (f) absorption accelerators such as quaternary ammonium compounds, (g) wetting agents such as, for example, cetyl alcohol and glycerol monostearate, (h) absorbents such as kaolin and bentonite clay, and (i) lubricants such as talc, calcium stearate, magnesium stearate, solid polyethylene glycols, sodium lauryl sulfate, and mixtures thereof. In the case of capsules, tablets, and pills, the dosage form may include a buffering agent.

Solid compositions of a similar type can be employed as fillers in soft and hard-filled gelatin capsules using such excipients as lactose or milk sugar as well as high molecular weight polyethylene glycols and the like. The solid dosage forms of tablets, dragees, capsules, pills, and granules can be prepared with coatings and shells such as enteric coatings and other coatings well known in the art of pharmacology. They may optionally comprise opacifying agents and can be of a composition that they release the active ingredient(s) only, or preferentially, in a certain part of the intestinal tract, optionally, in a delayed manner. Examples of encapsulating compositions which can be used include polymeric substances and waxes. Solid compositions of a similar type can be employed as fillers in soft and hard-filled gelatin capsules using such excipients as lactose or milk sugar as well as high molecular weight polyethylene glycols and the like.

The active ingredient can be in a micro-encapsulated form with one or more excipients as noted above. The solid dosage forms of tablets, dragees, capsules, pills, and granules can be prepared with coatings and shells such as enteric coatings, release controlling coatings, and other coatings well known in the pharmaceutical formulating art. In such solid dosage forms the active ingredient can be admixed with at least one inert diluent such as sucrose, lactose, or starch. Such dosage forms may comprise, as is normal practice, additional substances other than inert diluents, e.g., tableting lubricants and other tableting aids such a magnesium stearate and microcrystalline cellulose. In the case of capsules, tablets and pills, the dosage forms may comprise buffering agents. They may optionally comprise opacifying agents and can be of a composition that they release the active ingredient(s) only, or preferentially, in a certain part of the intestinal tract, optionally, in a delayed manner. Examples of encapsulating agents which can be used include polymeric substances and waxes.

Dosage forms for topical and/or transdermal administration of a compound described herein may include ointments, pastes, creams, lotions, gels, powders, solutions, sprays, inhalants, and/or patches. Generally, the active ingredient is admixed under sterile conditions with a pharmaceutically acceptable carrier or excipient and/or any needed preservatives and/or buffers as can be required. Additionally, the present disclosure contemplates the use of transdermal patches, which often have the added advantage of providing controlled delivery of an active ingredient to the body. Such dosage forms can be prepared, for example, by dissolving and/or dispensing the active ingredient in the proper medium. Alternatively or additionally, the rate can be controlled by either providing a rate controlling membrane and/or by dispersing the active ingredient in a polymer matrix and/or gel.

Suitable devices for use in delivering intradermal pharmaceutical compositions described herein include short needle devices. Intradermal compositions can be administered by devices which limit the effective penetration length of a needle into the skin. Alternatively or additionally, conventional syringes can be used in the classical mantoux method of intradermal administration. Jet injection devices which deliver liquid formulations to the dermis via a liquid jet injector and/or via a needle which pierces the stratum corneum and produces a jet which reaches the dermis are suitable. Ballistic powder/particle delivery devices which use compressed gas to accelerate the compound in powder form through the outer layers of the skin to the dermis are suitable.

Formulations suitable for topical administration include, but are not limited to, liquid and/or semi-liquid preparations such as liniments, lotions, oil-in-water and/or water-in-oil emulsions such as creams, ointments, and/or pastes, and/or solutions and/or suspensions. Topically administrable formulations may, for example, comprise from about 1% to about 10% (w/w) active ingredient, although the concentration of the active ingredient can be as high as the solubility limit of the active ingredient in the solvent. Formulations for topical administration may further comprise one or more of the additional ingredients described herein.

A pharmaceutical composition described herein can be prepared, packaged, and/or sold in a formulation suitable for pulmonary administration via the buccal cavity. Such a formulation may comprise dry particles which comprise the active ingredient and which have a diameter in the range from about 0.5 to about 7 nanometers, or from about 1 to about 6 nanometers. Such compositions are conveniently in the form of dry powders for administration using a device comprising a dry powder reservoir to which a stream of propellant can be directed to disperse the powder and/or using a self-propelling solvent/powder dispensing container such as a device comprising the active ingredient dissolved and/or suspended in a low-boiling propellant in a sealed container. Such powders comprise particles wherein at least 98% of the particles by weight have a diameter greater than 0.5 nanometers and at least 95% of the particles by number have a diameter less than 7 nanometers. Alternatively, at least 95% of the particles by weight have a diameter greater than 1 nanometer and at least 90% of the particles by number have a diameter less than 6 nanometers. Dry powder compositions may include a solid fine powder diluent such as sugar and are conveniently provided in a unit dose form.

Low boiling propellants generally include liquid propellants having a boiling point of below 65° F. at atmospheric pressure. Generally the propellant may constitute 50 to 99.9% (w/w) of the composition, and the active ingredient may constitute 0.1 to 20% (w/w) of the composition. The propellant may further comprise additional ingredients such as a liquid non-ionic and/or solid anionic surfactant and/or a solid diluent (which may have a particle size of the same order as particles comprising the active ingredient).

Pharmaceutical compositions described herein formulated for pulmonary delivery may provide the active ingredient in the form of droplets of a solution and/or suspension. Such formulations can be prepared, packaged, and/or sold as aqueous and/or dilute alcoholic solutions and/or suspensions, optionally sterile, comprising the active ingredient, and may conveniently be administered using any nebulization and/or atomization device. Such formulations may further comprise one or more additional ingredients including, but not limited to, a flavoring agent such as saccharin sodium, a volatile oil, a buffering agent, a surface active agent, and/or a preservative such as methylhydroxybenzoate. The droplets provided by this route of administration may have an average diameter in the range from about 0.1 to about 200 nanometers.

Formulations described herein as being useful for pulmonary delivery are useful for intranasal delivery of a pharmaceutical composition described herein. Another formulation suitable for intranasal administration is a coarse powder comprising the active ingredient and having an average particle from about 0.2 to 500 micrometers. Such a formulation is administered by rapid inhalation through the nasal passage from a container of the powder held close to the nares.

Formulations for nasal administration may, for example, comprise from about as little as 0.1% (w/w) to as much as 100% (w/w) of the active ingredient, and may comprise one or more of the additional ingredients described herein. A pharmaceutical composition described herein can be prepared, packaged, and/or sold in a formulation for buccal administration. Such formulations may, for example, be in the form of tablets and/or lozenges made using conventional methods, and may contain, for example, 0.1 to 20% (w/w) active ingredient, the balance comprising an orally dissolvable and/or degradable composition and, optionally, one or more of the additional ingredients described herein. Alternately, formulations for buccal administration may comprise a powder and/or an aerosolized and/or atomized solution and/or suspension comprising the active ingredient. Such powdered, aerosolized, and/or aerosolized formulations, when dispersed, may have an average particle and/or droplet size in the range from about 0.1 to about 200 nanometers, and may further comprise one or more of the additional ingredients described herein.

A pharmaceutical composition described herein can be prepared, packaged, and/or sold in a formulation for ophthalmic administration. Such formulations may, for example, be in the form of eye drops including, for example, a 0.1-1.0% (w/w) solution and/or suspension of the active ingredient in an aqueous or oily liquid carrier or excipient. Such drops may further comprise buffering agents, salts, and/or one or more other of the additional ingredients described herein. Other ophthalmically-administrable formulations which are useful include those which comprise the active ingredient in microcrystalline form and/or in a liposomal preparation. Ear drops and/or eye drops are also contemplated as being within the scope of this disclosure.

Although the descriptions of pharmaceutical compositions provided herein are principally directed to pharmaceutical compositions which are suitable for administration to humans, it will be understood by the skilled artisan that such compositions are generally suitable for administration to animals of all sorts. Modification of pharmaceutical compositions suitable for administration to humans in order to render the compositions suitable for administration to various animals is well understood, and the ordinarily skilled veterinary pharmacologist can design and/or perform such modification with ordinary experimentation.

Administration

Compounds provided herein are typically formulated in dosage unit form for ease of administration and uniformity of dosage. It will be understood, however, that the total daily usage of the compositions described herein will be decided by a physician within the scope of sound medical judgment. The specific therapeutically effective dose level for any particular subject or organism will depend upon a variety of factors including the disease being treated and the severity of the disorder; the activity of the specific active ingredient employed; the specific composition employed; the age, body weight, general health, sex, and diet of the subject; the time of administration, route of administration, and rate of excretion of the specific active ingredient employed; the duration of the treatment; drugs used in combination or coincidental with the specific active ingredient employed; and like factors well known in the medical arts.

The compounds and compositions provided herein can be administered by any route, including enteral (e.g., oral), parenteral, intravenous, intramuscular, intra-arterial, intramedullary, intrathecal, subcutaneous, intraventricular, transdermal, interdermal, rectal, intravaginal, intraperitoneal, topical (as by powders, ointments, creams, and/or drops), mucosal, nasal, bucal, sublingual; by intratracheal instillation, bronchial instillation, and/or inhalation; and/or as an oral spray, nasal spray, and/or aerosol. Specifically contemplated routes are oral administration, intravenous administration (e.g., systemic intravenous injection), regional administration via blood and/or lymph supply, and/or direct administration to an affected site. In general, the most appropriate route of administration will depend upon a variety of factors including the nature of the agent (e.g., its stability in the environment of the gastrointestinal tract), and/or the condition of the subject (e.g., whether the subject is able to tolerate oral administration). In certain embodiments, the compound or pharmaceutical composition described herein is suitable for topical administration to the eye of a subject.

The exact amount of a compound required to achieve an effective amount will vary from subject to subject, depending, for example, on species, age, and general condition of a subject, severity of the side effects or disorder, identity of the particular compound, mode of administration, and the like. An effective amount may be included in a single dose (e.g., single oral dose) or multiple doses (e.g., multiple oral doses). In certain embodiments, when multiple doses are administered to a subject or applied to a tissue or cell, any two doses of the multiple doses include different or substantially the same amounts of a compound described herein. In certain embodiments, when multiple doses are administered to a subject or applied to a tissue or cell, the frequency of administering the multiple doses to the subject or applying the multiple doses to the tissue or cell is three doses a day, two doses a day, one dose a day, one dose every other day, one dose every third day, one dose every week, one dose every two weeks, one dose every three weeks, or one dose every four weeks. In certain embodiments, the frequency of administering the multiple doses to the subject or applying the multiple doses to the tissue or cell is one dose per day. In certain embodiments, the frequency of administering the multiple doses to the subject or applying the multiple doses to the tissue or cell is two doses per day. In certain embodiments, the frequency of administering the multiple doses to the subject or applying the multiple doses to the tissue or cell is three doses per day. In certain embodiments, when multiple doses are administered to a subject or applied to a tissue or cell, the duration between the first dose and last dose of the multiple doses is one day, two days, four days, one week, two weeks, three weeks, one month, two months, three months, four months, six months, nine months, one year, two years, three years, four years, five years, seven years, ten years, fifteen years, twenty years, or the lifetime of the subject, tissue, or cell. In certain embodiments, the duration between the first dose and last dose of the multiple doses is three months, six months, or one year. In certain embodiments, the duration between the first dose and last dose of the multiple doses is the lifetime of the subject, tissue, or cell. In certain embodiments, a dose (e.g., a single dose, or any dose of multiple doses) described herein includes independently between 0.1 µg and 1 µg, between 0.001 mg and 0.01 mg, between 0.01 mg and 0.1 mg, between 0.1 mg and 1 mg, between 1 mg and 3 mg, between 3 mg and 10 mg, between 10 mg and 30 mg, between 30 mg and 100 mg, between 100 mg and 300 mg, between 300 mg and 1,000 mg, or between 1 g and 10 g, inclusive, of a compound described herein. In certain embodiments, a dose described herein includes independently between 1 mg and 3 mg, inclusive, of a compound described herein. In certain embodiments, a dose described herein includes independently between 3 mg and 10 mg, inclusive, of a compound described herein. In certain embodiments, a dose described herein includes independently between 10 mg and 30 mg, inclusive, of a compound described herein. In certain embodiments, a dose described herein includes independently between 30 mg and 100 mg, inclusive, of a compound described herein.

Dose ranges as described herein provide guidance for the administration of provided pharmaceutical compositions to an adult. The amount to be administered to, for example, a child or an adolescent can be determined by a medical practitioner or person skilled in the art and can be lower or the same as that administered to an adult.

A compound or composition, as described herein, can be administered in combination with one or more additional pharmaceutical agents (e.g., therapeutically and/or prophylactically active agents). The compounds or compositions can be administered in combination with additional pharmaceutical agents that improve their activity (e.g., activity (e.g., potency and/or efficacy) in treating a disease in a subject in need thereof, in preventing a disease in a subject in need thereof, in reducing the risk to develop a disease in a subject in need thereof, and/or in inhibiting the activity of a protein (e.g., transactivator of transcription (Tat)) in a subject or cell), improve bioavailability, improve safety, reduce drug resistance, reduce and/or modify metabolism, inhibit excretion, and/or modify distribution in a subject or cell. It will also be appreciated that the therapy employed may achieve a desired effect for the same disorder, and/or it may achieve different effects. In certain embodiments, a pharmaceutical composition described herein including a compound described herein and an additional pharmaceutical agent shows a synergistic effect that is absent in a pharmaceutical composition including one of the compounds and the additional pharmaceutical agent, but not both. In some embodiments, the additional pharmaceutical agent achieves a desired effect for the same disorder. In some embodiments, the additional pharmaceutical agent achieves different effects.

The compound or composition can be administered concurrently with, prior to, or subsequent to one or more additional pharmaceutical agents, which may be useful as, e.g., combination therapies. Pharmaceutical agents include therapeutically active agents. Pharmaceutical agents also include prophylactically active agents. Pharmaceutical agents include small organic molecules such as drug compounds (e.g., compounds approved for human or veterinary use by the U.S. Food and Drug Administration as provided in the Code of Federal Regulations (CFR)), peptides, proteins, carbohydrates, monosaccharides, oligosaccharides, polysaccharides, nucleoproteins, mucoproteins, lipoproteins, synthetic polypeptides or proteins, small molecules linked to proteins, glycoproteins, steroids, nucleic acids, DNAs, RNAs, nucleotides, nucleosides, oligonucleotides, antisense oligonucleotides, lipids, hormones, vitamins, and cells. In certain embodiments, the additional pharmaceutical agent is a pharmaceutical agent useful for treating and/or preventing a disease (e.g., proliferative disease, hematological disease, neurological disease, painful condition, psychiatric disorder, or metabolic disorder). Each additional pharmaceutical agent may be administered at a dose and/or on a time schedule determined for that pharmaceutical agent. The additional pharmaceutical agents may also be administered together with each other and/or with the compound or composition described herein in a single dose or composition or administered separately in different doses or compositions. The particular combination to employ in a regimen will take into account compatibility of the compound described herein with the additional pharmaceutical agent(s) and/or the desired therapeutic and/or prophylactic effect to be achieved. In general, it is expected that the additional pharmaceutical agent(s) in combination be utilized at levels that do not exceed the levels at which they are utilized individually. In some embodiments, the levels utilized in combination will be lower than those utilized individually.

The additional pharmaceutical agents include, but are not limited to, anti-proliferative agents, anti-cancer agents, anti-angiogenesis agents, steroidal or non-steroidal anti-inflammatory agents, immunosuppressants, anti-bacterial agents, anti-viral agents, cardiovascular agents, cholesterol-lowering agents, anti-diabetic agents, anti-allergic agents, contraceptive agents, pain-relieving agents, anesthetics, anti-coagulants, inhibitors of an enzyme, steroidal agents, steroidal or antihistamine, antigens, vaccines, antibodies, decongestant, sedatives, opioids, analgesics, anti-pyretics, hormones, and prostaglandins. In certain embodiments, the additional pharmaceutical agent is an anti-proliferative agent. In certain embodiments, the additional pharmaceutical agent is an anti-cancer agent. In certain embodiments, the additional pharmaceutical agent is an anti-viral agent. In certain embodiments, the additional pharmaceutical agent is a binder or inhibitor of transactivator of transcription (Tat). In certain embodiments, the additional pharmaceutical agent is selected from the group consisting of epigenetic or transcriptional modulators (e.g., DNA methyltransferase inhibitors, histone deacetylase inhibitors (HDAC inhibitors), lysine methyltransferase inhibitors), antimitotic drugs (e.g., taxanes and vinca alkaloids), hormone receptor modulators (e.g., estrogen receptor modulators and androgen receptor modulators), cell signaling pathway inhibitors (e.g., tyrosine protein kinase or transactivator of transcription (Tat) inhibitors), modulators of protein stability (e.g., proteasome inhibitors), Hsp90 inhibitors, glucocorticoids, all-trans retinoic acids, and other agents that promote differentiation). In certain embodiments, the compounds described herein or pharmaceutical compositions can be administered in combination with an anti-cancer therapy including, but not limited to, surgery, radiation therapy, transplantation (e.g., stem cell transplantation, bone marrow transplantation), immunotherapy, and chemotherapy. Additional pharmaceutical agents include small organic molecules such as drug compounds (e.g., compounds approved by the US Food and Drug Administration as provided in the Code of Federal Regulations (CFR)), peptides, proteins, carbohydrates, monosaccharides, oligosaccharides, polysaccharides, nucleoproteins, mucoproteins, lipoproteins, synthetic polypeptides or proteins, small molecules linked to proteins, glycoproteins, steroids, nucleic acids, DNAs, RNAs, nucleotides, nucleosides, oligonucleotides, antisense oligonucleotides, lipids, hormones, vitamins and cells.

Methods

Provided herein are methods and uses for treating/preventing diseases, as well as modulating various biological processes and moieties.

Thus, provided herein are methods for modulating (e.g., inhibiting) transactivator of transcription (Tat). In one aspect, provided herein are methods for modulating transactivator of transcription (Tat) protein in a subject, comprising administering to the subject a compound as disclosed herein, or salt, solvate, or hydrate thereof, or a composition as disclosed herein. In one aspect, provided herein are methods for inhibiting transactivator of transcription (Tat) protein in a subject, comprising administering to the subject a compound as disclosed herein, or salt, solvate, or hydrate thereof, or a composition as disclosed herein. In one aspect, provided herein are methods for modulating transactivator of transcription (Tat) protein in a biological sample, comprising contacting the biological sample with a compound as disclosed herein, or salt, solvate, or hydrate thereof, or a composition as disclosed herein. In one aspect, provided herein are methods for inhibiting transactivator of transcription (Tat) protein in a biological sample, comprising contacting the biological sample with a compound as disclosed herein, or salt, solvate, or hydrate thereof, or a composition as disclosed herein.

Provided herein are methods for modulating viral replication (e.g., inhibiting). In one aspect, provided herein are methods for inhibiting viral replication in a subject, comprising administering to the subject a compound as disclosed herein, or salt, solvate, or hydrate thereof, or a composition as disclosed herein. In one aspect, provided herein are methods for modulating viral replication in a subject, comprising administering to the subject a compound as disclosed herein, or salt, solvate, or hydrate thereof, or a composition as disclosed herein. In one aspect, provided herein are methods for inhibiting viral replication in a biological sample, comprising contacting the biological sample with a compound as disclosed herein, or salt, solvate, or hydrate thereof, or a composition as disclosed herein. In one aspect, provided herein are methods for modulating viral replication in a biological sample, comprising contacting the biological sample with a compound as disclosed herein, or salt, solvate, or hydrate thereof, or a composition as disclosed herein.

Also provided herein are methods for treating and preventing AIDS. In a further aspect, provided herein are methods for treating human immunodeficiency virus (HIV) infection in a subject, comprising administering to the subject a compound as disclosed herein, or salt, solvate, or hydrate thereof, or a composition as disclosed herein. In a further aspect, provided herein are methods for preventing human immunodeficiency virus (HIV) infection in a subject, comprising administering to the subject a compound as disclosed herein, or salt, solvate, or hydrate thereof, or a composition as disclosed herein. In a further aspect, provided herein are methods for treating human immunodeficiency virus (HIV) infection in a biological sample, comprising contacting the biological sample with a compound as disclosed herein, or salt, solvate, or hydrate thereof, or a composition as disclosed herein. In a further aspect, provided herein are methods for preventing human immunodeficiency virus (HIV) infection in a biological sample, comprising contacting the biological sample with a compound as disclosed herein, or salt, solvate, or hydrate thereof, or a composition as disclosed herein.

Provided herein are methods for treating and preventing HIV. In a further aspect, provided herein are methods for treating human immunodeficiency virus (HIV) effects in a subject, comprising administering to the subject a compound as disclosed herein, or salt, solvate, or hydrate thereof, or a composition as disclosed herein. In a further aspect, provided herein are methods for preventing human immunodeficiency virus (HIV) effects in a subject, comprising administering to the subject a compound as disclosed herein, or salt, solvate, or hydrate thereof, or a composition as disclosed herein. In a further aspect, provided herein are methods for treating human immunodeficiency virus (HIV) effects in a biological sample, comprising contacting the biological sample with a compound as disclosed herein, or salt, solvate, or hydrate thereof, or a composition as disclosed herein. In a further aspect, provided herein are methods for preventing human immunodeficiency virus (HIV) effects in a biological sample, comprising contacting the biological sample with a compound as disclosed herein, or salt, solvate, or hydrate thereof, or a composition as disclosed herein.

Also provided herein are methods for treating and preventing HIV neurological effects. HIV neurological effects include neurological symptoms and conditions brought on by HIV, and neurological symptoms and conditions associated with HIV. In another aspect, provided herein are methods for treating HIV neurological effects in a subject, comprising administering to the subject a compound as disclosed herein, or salt, solvate, or hydrate thereof, or a composition as disclosed herein. In another aspect, provided herein are methods for preventing HIV neurological effects in a subject, comprising administering to the subject a compound as disclosed herein, or salt, solvate, or hydrate thereof, or a composition as disclosed herein. In another aspect, provided herein are methods for treating HIV neurological effects in a biological sample, comprising contacting the biological sample with a compound as disclosed herein, or salt, solvate, or hydrate thereof, or a composition as disclosed herein. In another aspect, provided herein are methods for preventing HIV neurological effects in a biological sample, comprising contacting the biological sample with a compound as disclosed herein, or salt, solvate, or hydrate thereof, or a composition as disclosed herein.

Also provided herein are methods for treating age-related macular degeneration (AMD) in a subject, comprising administering to the subject a compound as disclosed herein, or salt, solvate, or hydrate thereof, or a composition as disclosed herein. In some embodiments, the AMD is wet AMD.

Provided herein are methods for modulating (e.g., inhibiting) angiogenesis. In one aspect, provided herein are methods for modulating angiogenesis in a subject, comprising administering to the subject a compound as disclosed herein, or salt, solvate, or hydrate thereof, or a composition as disclosed herein. In one aspect, provided herein are methods for inhibiting angiogenesis in a subject, comprising administering to the subject a compound as disclosed herein, or salt, solvate, or hydrate thereof, or a composition as disclosed herein. In one aspect, provided herein are methods for modulating angiogenesis in a biological sample, comprising contacting the biological sample with a compound as disclosed herein, or salt, solvate, or hydrate thereof, or a composition as disclosed herein. In one aspect, provided herein are methods for inhibiting angiogenesis in a biological sample, comprising contacting the biological sample with a compound as disclosed herein, or salt, solvate, or hydrate thereof, or a composition as disclosed herein.

Also provided herein are methods for modulating (e.g., inhibiting) cellular proliferation. In a further aspect, provided herein are methods for modulating cellular proliferation in a subject, comprising administering to the subject a compound as disclosed herein, or salt, solvate, or hydrate thereof, or a composition as disclosed herein. In a further aspect, provided herein are methods for inhibiting cellular proliferation in a subject, comprising administering to the subject a compound as disclosed herein, or salt, solvate, or hydrate thereof, or a composition as disclosed herein. In a further aspect, provided herein are methods for modulating cellular proliferation in a biological sample, comprising contacting the biological sample with a compound as disclosed herein, or salt, solvate, or hydrate thereof, or a composition as disclosed herein. In a further aspect, provided herein are methods for inhibiting cellular proliferation in a biological sample, comprising contacting the biological sample with a compound as disclosed herein, or salt, solvate, or hydrate thereof, or a composition as disclosed herein.

Provided herein are methods for treating and preventing a proliferative disease. In another aspect, provided herein are methods for treating a proliferative disease in a subject, comprising administering to the subject a compound as disclosed herein, or salt, solvate, or hydrate thereof, or a composition as disclosed herein. In another aspect, provided herein are methods for preventing a proliferative disease in a subject, comprising administering to the subject a compound as disclosed herein, or salt, solvate, or hydrate thereof, or a composition as disclosed herein. In another aspect, provided herein are methods for treating a proliferative disease in a biological sample, comprising contacting the biological sample with a compound as disclosed herein, or salt, solvate, or hydrate thereof, or a composition as disclosed herein. In another aspect, provided herein are methods for preventing a proliferative disease in a biological sample, comprising contacting the biological sample with a compound as disclosed herein, or salt, solvate, or hydrate thereof, or a composition as disclosed herein. In some embodiments, the proliferative disease is selected from the group consisting of cancers, benign neoplasms, angiogenesis, inflammatory diseases, and autoimmune diseases.

Provided herein are methods for treating and preventing cancer. In another aspect, provided herein are methods for treating cancer in a subject, comprising administering to the subject a compound as disclosed herein, or salt, solvate, or hydrate thereof, or a composition as disclosed herein. In another aspect, provided herein are methods for preventing cancer in a subject, comprising administering to the subject a compound as disclosed herein, or salt, solvate, or hydrate thereof, or a composition as disclosed herein. In another aspect, provided herein are methods for treating cancer in a biological sample, comprising contacting the biological sample with a compound as disclosed herein, or salt, solvate, or hydrate thereof, or a composition as disclosed herein. In another aspect, provided herein are methods for preventing cancer in a biological sample, comprising contacting the biological sample with a compound as disclosed herein, or salt, solvate, or hydrate thereof, or a composition as disclosed herein. In some embodiments, the cancer is selected from the group consisting of acoustic neuroma; adenocarcinoma; adrenal gland cancer; anal cancer; angiosarcoma (e.g., lymphangiosarcoma, lymphangioendotheliosarcoma, hemangiosarcoma); appendix cancer; benign monoclonal gammopathy; biliary cancer (e.g., cholangiocarcinoma); bladder cancer; breast cancer (e.g., adenocarcinoma of the breast, papillary carcinoma of the breast, mammary cancer, medullary carcinoma of the breast); brain cancer (e.g., meningioma, glioblastomas, glioma (e.g., astrocytoma, oligodendroglioma), medulloblastoma); bronchus cancer; carcinoid tumor; cervical cancer (e.g., cervical adenocarcinoma); choriocarcinoma; chordoma; craniopharyngioma; colorectal cancer (e.g., colon cancer, rectal cancer, colorectal adenocarcinoma); connective tissue cancer; epithelial carcinoma; ependymoma; endotheliosarcoma (e.g., Kaposi's sarcoma, multiple idiopathic hemorrhagic sarcoma); endometrial cancer (e.g., uterine cancer, uterine sarcoma); esophageal cancer (e.g., adenocarcinoma of the esophagus, Barrett's adenocarcinoma); Ewing's sarcoma; ocular cancer (e.g., intraocular melanoma, retinoblastoma); familiar hypereosinophilia; gall bladder cancer; gastric cancer (e.g., stomach adenocarcinoma); gastrointestinal stromal tumor (GIST); germ cell cancer; head and neck cancer (e.g., head and neck squamous cell carcinoma, oral cancer (e.g., oral squamous cell carcinoma), throat cancer (e.g., laryngeal cancer, pharyngeal cancer, nasopharyngeal cancer, oropharyngeal cancer)); hematopoietic cancers (e.g., leukemia such as acute lymphocytic leukemia (ALL) (e.g., B-cell ALL, T-cell ALL), acute myelocytic leukemia (AML) (e.g., B-cell AML, T-cell AML), chronic myelocytic leukemia (CML) (e.g., B-cell CML, T-cell CML), and chronic lymphocytic leukemia (CLL) (e.g., B-cell CLL, T-cell CLL)); lymphoma such as Hodgkin lymphoma (HL) (e.g., B-cell HL, T-cell HL) and non-Hodgkin lymphoma (NHL) (e.g., B-cell NHL such as diffuse large cell lymphoma (DLCL) (e.g., diffuse large B-cell lymphoma), follicular lymphoma, chronic lymphocytic leukemia/small lymphocytic lymphoma (CLL/SLL), mantle cell lymphoma (MCL), marginal zone B-cell lymphomas (e.g., mucosa-associated lymphoid tissue (MALT) lymphomas, nodal marginal zone B-cell lymphoma, splenic marginal zone B-cell lymphoma), primary mediastinal B-cell lymphoma, Burkitt lymphoma, lymphoplasmacytic lymphoma (i.e., Waldenström's macroglobulinemia), hairy cell leukemia (HCL), immunoblastic large cell lymphoma, precursor B-lymphoblastic lymphoma and primary central nervous system (CNS) lymphoma; and T-cell NHL such as precursor T-lymphoblastic lymphoma/leukemia, peripheral T-cell lymphoma (PTCL) (e.g., cutaneous T-cell lymphoma (CTCL) (e.g., mycosis fungoides, Sezary syndrome), angioimmunoblastic T-cell lymphoma, extranodal natural killer T-cell lymphoma, enteropathy type T-cell lymphoma, subcutaneous panniculitis-like T-cell lymphoma, and anaplastic large cell lymphoma); a mixture of one or more leukemia/lymphoma as described above; and multiple myeloma (MM)), heavy chain disease (e.g., alpha chain disease, gamma chain disease, mu chain disease); hemangioblastoma; hypopharynx cancer; inflammatory myofibroblastic tumors; immunocytic amyloidosis; kidney cancer (e.g., nephroblastoma a.k.a. Wilms' tumor, renal cell carcinoma); liver cancer (e.g., hepatocellular cancer (HCC), malignant hepatoma); lung cancer (e.g., bronchogenic carcinoma, small cell lung cancer (SCLC), non-small cell lung cancer (NSCLC), adenocarcinoma of the lung); leiomyosarcoma (LMS); mastocytosis (e.g., systemic mastocytosis); muscle cancer; myelodysplastic syndrome (MDS); mesothelioma; myeloproliferative disorder (MPD) (e.g., polycythemia vera (PV), essential thrombocytosis (ET), agnogenic myeloid metaplasia (AMM) a.k.a. myelofibrosis (MF), chronic idiopathic myelofibrosis, chronic myelocytic leukemia (CML), chronic neutrophilic leukemia (CNL), hypereosinophilic syndrome (HES)); neuroblastoma; neurofibroma (e.g., neurofibromatosis (NF) type 1 or type 2, schwannomatosis); neuroendocrine cancer (e.g., gastroenteropancreatic neuroendoctrine tumor (GEP-NET), carcinoid tumor); osteosarcoma (e.g., bone cancer); ovarian cancer (e.g., cystadenocarcinoma, ovarian embryonal carcinoma, ovarian adenocarcinoma); papillary adenocarcinoma; pancreatic cancer (e.g., pancreatic andenocarcinoma, intraductal papillary mucinous neoplasm (IPMN), Islet cell tumors); penile cancer (e.g., Paget's disease of the penis and scrotum); pinealoma; primitive neuroectodermal tumor (PNT); plasma cell neoplasia; paraneoplastic syndromes; intraepithelial neoplasms; prostate cancer (e.g., prostate adenocarcinoma); rectal cancer; rhabdomyosarcoma; salivary gland cancer; skin cancer (e.g., squamous cell carcinoma (SCC), keratoacanthoma (KA), melanoma, basal cell carcinoma (BCC)); small bowel cancer (e.g., appendix cancer); soft tissue sarcoma (e.g., malignant fibrous histiocytoma (MFH), liposarcoma, malignant peripheral nerve sheath tumor (MPNST), chondrosarcoma, fibrosarcoma, myxosarcoma); sebaceous gland carcinoma; small intestine cancer; sweat gland carcinoma; synovioma; testicular cancer (e.g., seminoma, testicular embryonal carcinoma); thyroid cancer (e.g., papillary carcinoma of the thyroid, papillary thyroid carcinoma (PTC), medullary thyroid cancer); urethral cancer; vaginal cancer; and vulvar cancer (e.g., Paget's disease of the vulva).

Kit

In a further aspect, provided herein are kits comprising: a compound as disclosed herein, or salt, solvate, or hydrate thereof, or a composition as disclosed herein; and instructions for administering the compound or composition.

Also encompassed by the disclosure are kits (e.g., pharmaceutical packs). The kits provided may comprise a pharmaceutical composition or compound described herein and a container (e.g., a vial, ampule, bottle, syringe, and/or dispenser package, or other suitable container). In some embodiments, provided kits may optionally further include a second container comprising a pharmaceutical excipient for dilution or suspension of a pharmaceutical composition or compound described herein. In some embodiments, the pharmaceutical composition or compound described herein provided in the first container and the second container are combined to form one unit dosage form.

Thus, in one aspect, provided are kits including a first container comprising a compound or pharmaceutical composition described herein. In certain embodiments, the kits are useful for treating a disease (e.g., proliferative disease, hematological disease, neurological disease, painful condition, psychiatric disorder, or metabolic disorder) in a subject in need thereof. In certain embodiments, the kits are useful for preventing a disease (e.g., proliferative disease, hematological disease, neurological disease, painful condition, psychiatric disorder, or metabolic disorder) in a subject in need thereof. In certain embodiments, the kits are useful for reducing the risk of developing a disease (e.g., proliferative disease, hematological disease, neurological disease, painful condition, psychiatric disorder, or metabolic disorder) in a subject in need thereof. In certain embodiments, the kits are useful for inhibiting the activity (e.g., aberrant activity, such as increased activity) of transactivator of transcription (Tat) in a subject or cell.

In certain embodiments, a kit described herein further includes instructions for using the kit. A kit described herein may also include information as required by a regulatory agency such as the U.S. Food and Drug Administration (FDA). In certain embodiments, the information included in the kits is prescribing information. In certain embodiments, the kits and instructions provide for treating a disease (e.g., proliferative disease, hematological disease, neurological disease, painful condition, psychiatric disorder, or metabolic disorder) in a subject in need thereof. In certain embodiments, the kits and instructions provide for preventing a disease (e.g., proliferative disease, hematological disease, neurological disease, painful condition, psychiatric disorder, or metabolic disorder) in a subject in need thereof. In certain embodiments, the kits and instructions provide for reducing the risk of developing a disease (e.g., proliferative disease, hematological disease, neurological disease, painful condition, psychiatric disorder, or metabolic disorder) in a subject in need thereof. In certain embodiments, the kits and instructions provide for inhibiting the activity (e.g., aberrant activity, such as increased activity) of transactivator of transcription (Tat) in a subject or cell. A kit described herein may include one or more additional pharmaceutical agents described herein as a separate composition.

EXAMPLES

Synthesis of compounds delineated herein can be performed using methods and reagents known in the chemical synthesis arts, including simplified analogs (1 (also referred to herein as Formula (I)) of didehydro-cortistatin A (dCA) as potential inhibitors of the human immunodeficiency virus (HIV) protein Tat that may reduce HIV neurological effects (Mousseau, G. et al. Cell Host & Microbe 2012, 12, 97-108). These analogs can be synthesized in approximately half as many steps as dCA, facilitating their synthesis and pharmacological evaluation. Based on similar scaffolds (Czakó, B. et al. J Am Chem Soc 2009, 131 (25), 9014-9019), these compounds are expected to be useful in various diseases due to anticancer activity and antiangiogenic activity.

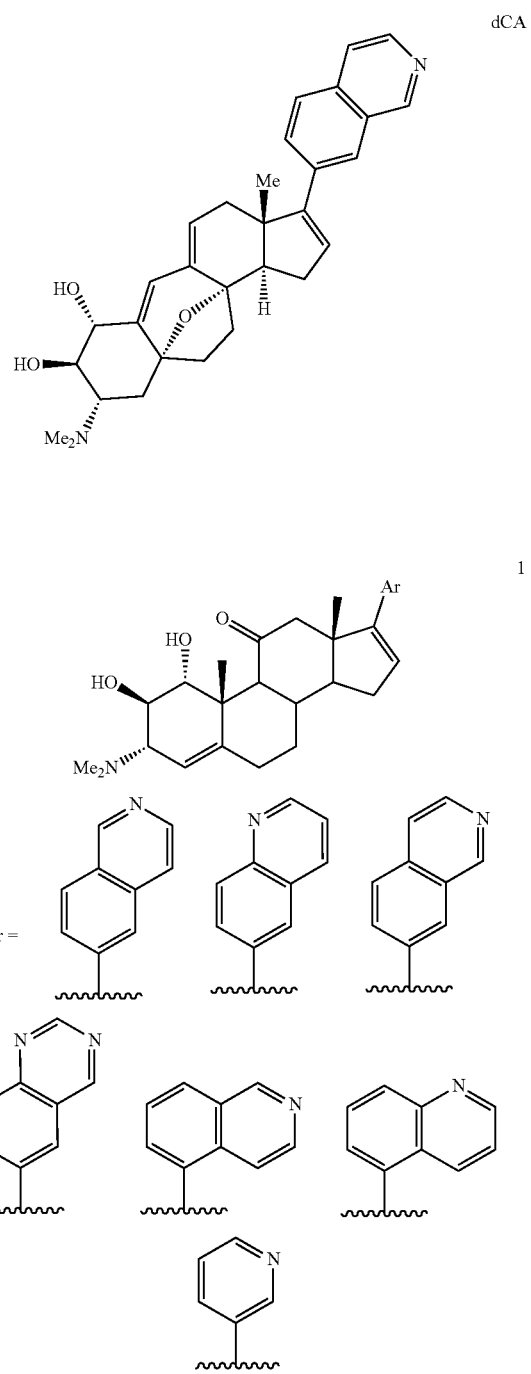

DETAILED DESCRIPTION OF THE EXAMPLES

A retrosynthetic analysis identified key intermediates for the synthesis of the initial series of simplified dCA analogs (Scheme 1). This retrosynthetic analysis involves a late-stage Stille coupling to afford analog 3-1 from dione 3-2 to install an isoquinoline, heteroaromatic, or other aromatic residues at C17. Dione 3-2 can be produced through deprotection of the C17 ketal and acetate of 3-3. A reductive amination, subsequent dimethylation of the resulting amine, and epoxide ring opening of the C1,C2 epoxide of 1-47 gives 3-3. Lastly, oxidative cleavage of the C17 side chain, ketal protection, and A-ring epoxidation of prednisone, 1-44, affords the epoxide 1-47. From this retrosynthetic analysis an 8-step linear synthesis of novel simplified dCA analogs was developed.

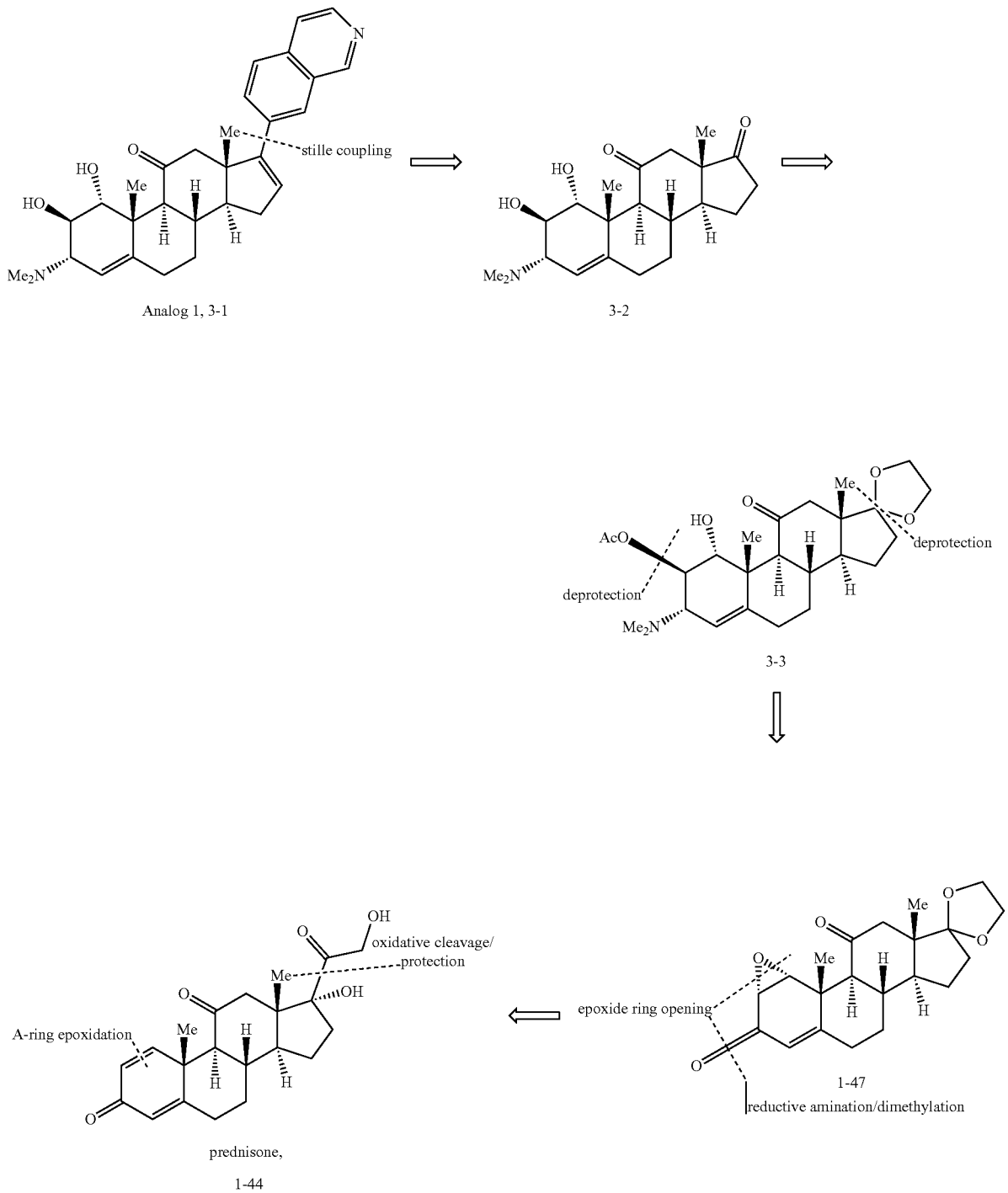

Scheme 1. Retrosynthetic analysis of novel simplified dCA analogs.

The 8-step synthesis of dCA analogs described herein initially follows Baran's 14-step total synthesis of dCA, with initial synthetic scheme of novel simplified dCA analogs beginning with the commercially available ($1.85/g) anti-inflammatory drug prednisone (1-44) (Scheme 2).

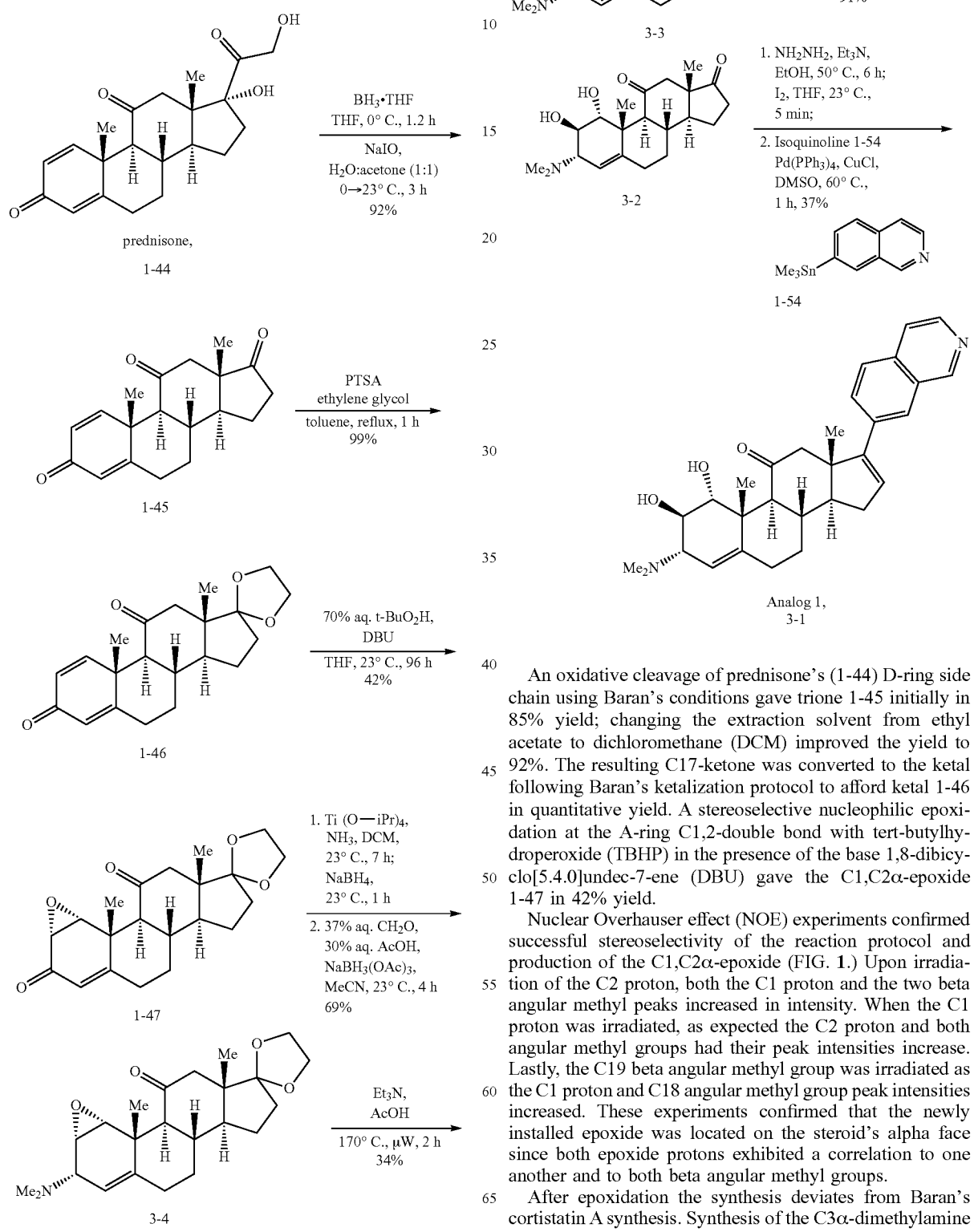

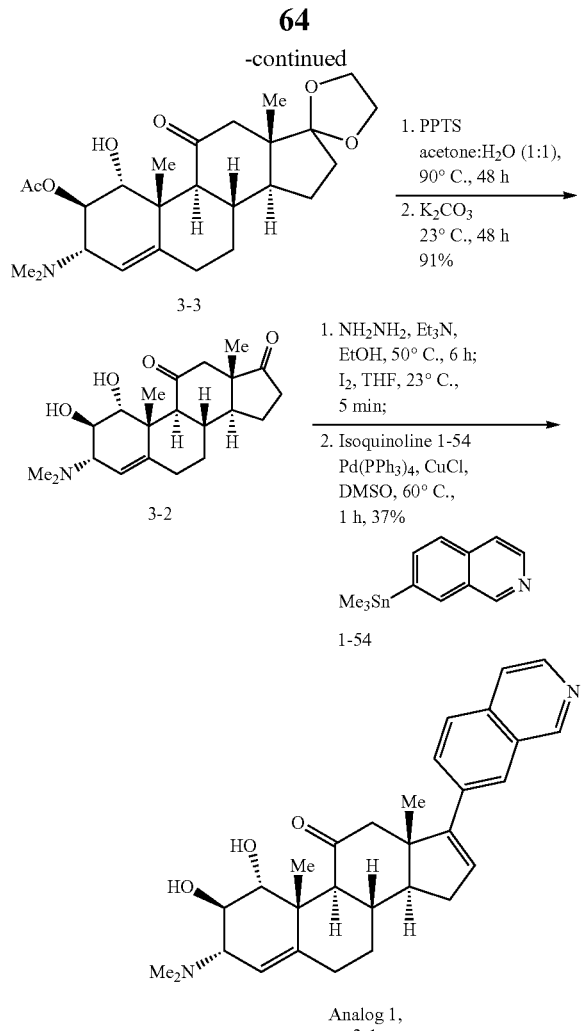

An oxidative cleavage of prednisone's (1-44) D-ring side chain using Baran's conditions gave trione 1-45 initially in 85% yield; changing the extraction solvent from ethyl acetate to dichloromethane (DCM) improved the yield to 92%. The resulting C17-ketone was converted to the ketal following Baran's ketalization protocol to afford ketal 1-46 in quantitative yield. A stereoselective nucleophilic epoxidation at the A-ring C1,2-double bond with tert-butylhydroperoxide (TBHP) in the presence of the base 1,8-dibicyclo[5.4.0]undec-7-ene (DBU) gave the C1,C2α-epoxide 1-47 in 42% yield.

Nuclear Overhauser effect (NOE) experiments confirmed successful stereoselectivity of the reaction protocol and production of the C1,C2α-epoxide (FIG. 1.) Upon irradiation of the C2 proton, both the C1 proton and the two beta angular methyl peaks increased in intensity. When the C1 proton was irradiated, as expected the C2 proton and both angular methyl groups had their peak intensities increase. Lastly, the C19 beta angular methyl group was irradiated as the C1 proton and C18 angular methyl group peak intensities increased. These experiments confirmed that the newly installed epoxide was located on the steroid's alpha face since both epoxide protons exhibited a correlation to one another and to both beta angular methyl groups.

Figure 3:
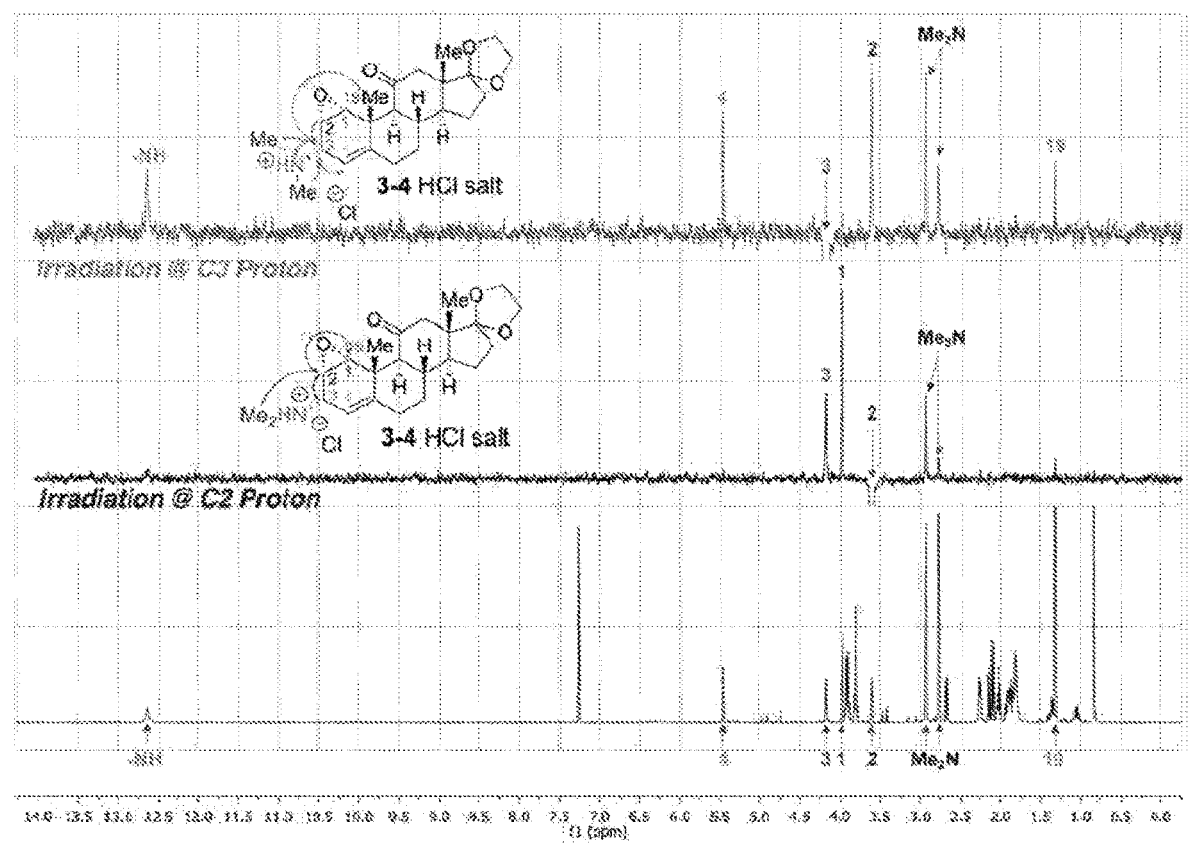
FIG. 3 depicts exemplary spectra showing a NOE analysis of the 3-4 HCl salt.

After epoxidation the synthesis deviates from Baran's cortistatin A synthesis. Synthesis of the C3α-dimethylamine intermediate 3-4 proved to be quite difficult, and necessitated the examination of multiple strategies to acquire this product. When the reductive amination with dimethylamine did not yield the desired product, it was postulated that the C3 carbonyl may need activation for reductive amination to occur. Addition of the Lewis acid Ti(Oi-Pr)$_4$ was utilized to activate the C3 carbonyl of 1-47. When reductive amination did not yield the desired product, perhaps due to the secondary amine being too bulky of a nucleophile in the presence of the C1α,C2α epoxide, a 2-step process was employed in which the ketone underwent a reductive amination was employed with ammonia, followed by a second reductive amination with formaldehyde to yield 3-4 (Scheme 3).

protons. The stereochemistry at all three of these protons was determined using an NOE experiment (FIG. 3).

Irradiation of the newly installed C3 proton resulted in increased peak intensities for the dimethylamine protons, the vinyl C4 proton, the epoxide C2 proton, and the C19 angular methyl group. The C2 proton was then irradiated, which resulted in increased peak intensities for the C1 and C3 protons indicating all three protons were on the same face of the steroid. Based on this NOE analysis the successful installation of the C3α-dimethylamine was confirmed.

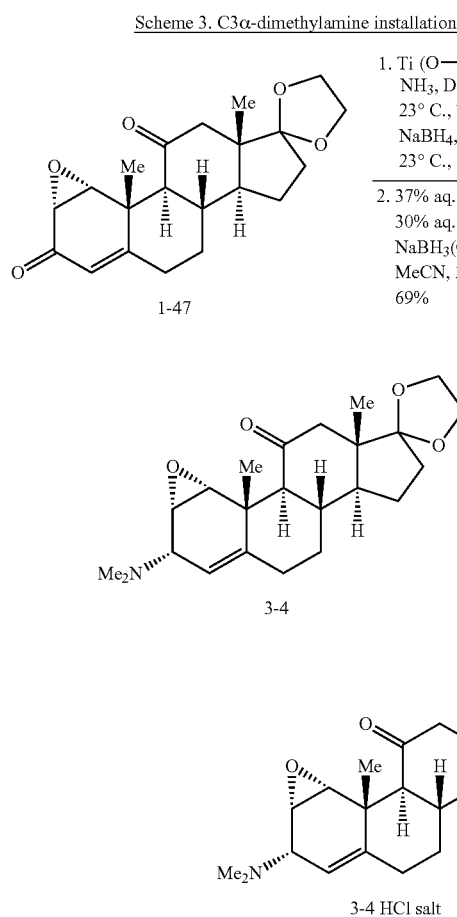

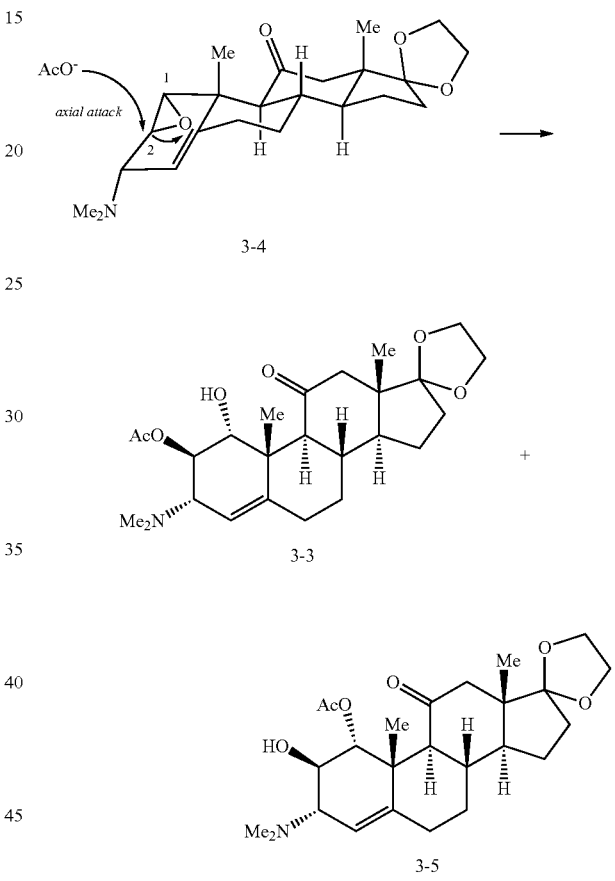

Attempts to isolate the primary amine intermediate resulted in product decomposition, and therefore the primary amine intermediate was kept in solution. A solvent exchange was performed prior to the dimethylation step, which used formaldehyde and sodium acetoxyborohydride to give the C3α-dimethyl amine 3-4. Following the workup crystals were obtained that were identified as the HCl salt of the dimethylamine product 3-4; isolation as the HCl salt dramatically improved the yield after further recrystallization.

Figure 2:
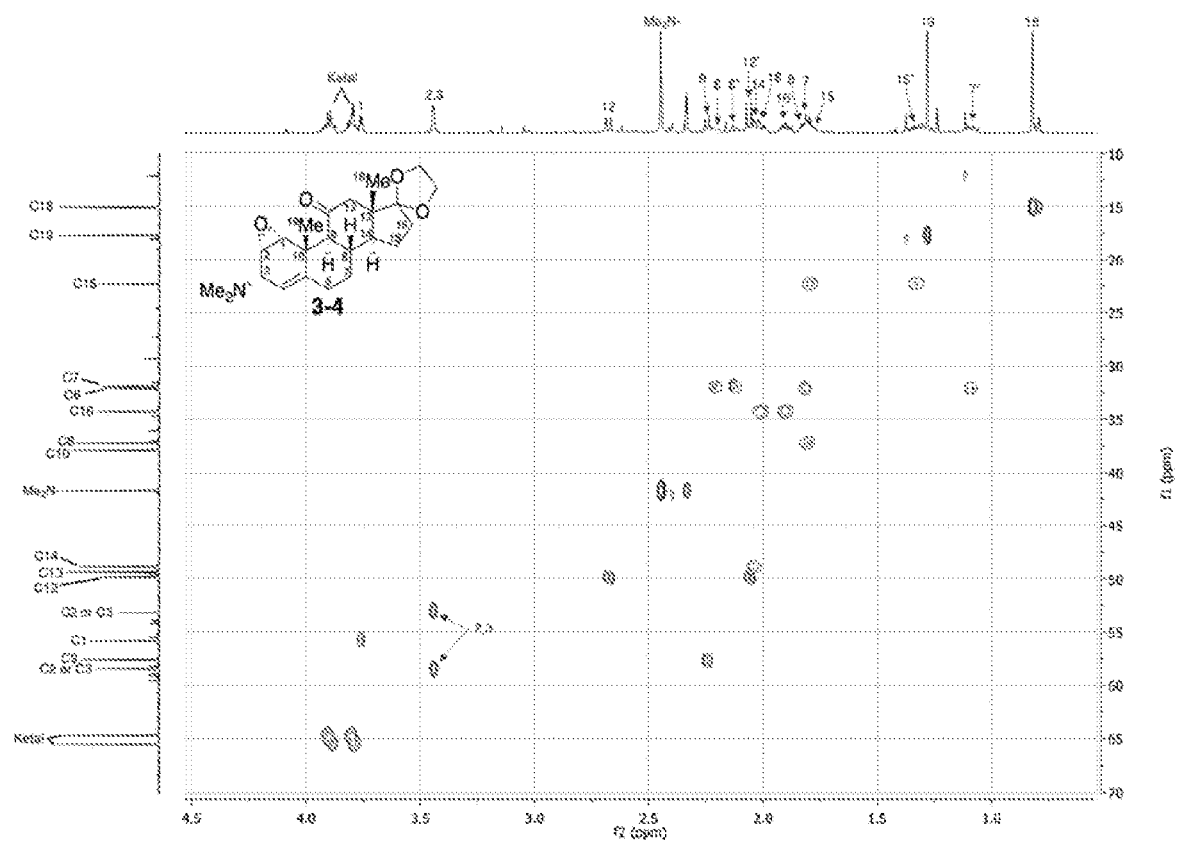
FIG. 2 depicts an exemplary HSQC spectrum of the synthetic intermediate 3-4.

The stereochemistry of the newly installed C3 proton could not be deduced from the HSQC spectrum of the neutral amine, as it overlapped with the C2 proton (FIG. 2), However, the C3 proton stereochemistry could be determined in the chloride salt 3-4, as changes in the proton chemical shifts in the salt separated all three stereogenic The C1,C2α epoxide of 3-4 was opened by acetate nucleophilic attack, which after undergoing acyl transfer with the C1 hydroxyl group yielded two inseparable regioisomers 3-3 and 3-5 (Scheme 4). Microwave-assisted epoxide ring opening was performed using optimized conditions involving heating the reaction mixture for two hours at 170° C. Since the stereochemistry at C1 and C2 is conserved in both regioisomers, the products were carried forward without separation.

In preparation for the late stage Stille coupling, the acetate and ketal protecting groups were removed. In initial attempts to remove the acetates first an unexpected dehydration side reaction of an A-ring hydroxyl group occurred when attempting the ketal deprotection step with p-toluenesulfonic acid. Attempts at an alternative neutral ketal deprotection were also unsuccessful, and therefore the order of the deprotection reactions were reversed.

Scheme 5. One-pot ketal and acetate deprotection.

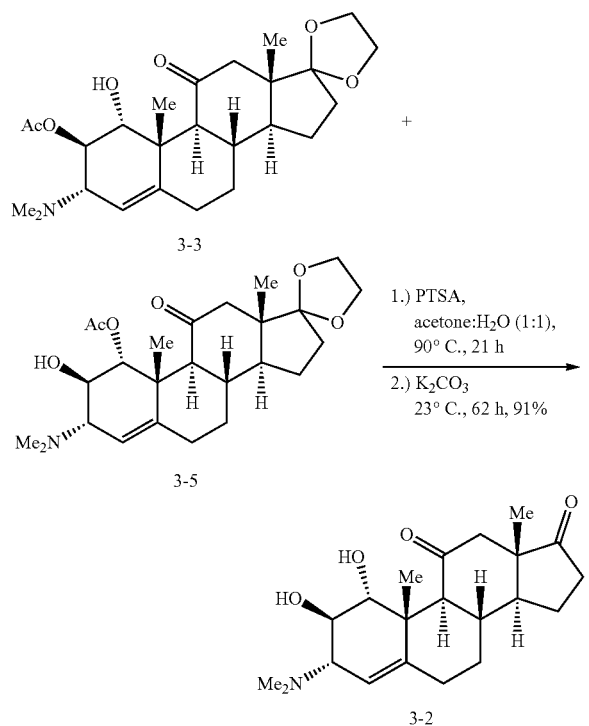

There was precedence that this transformation could occur using a one-pot deprotection of the acetate and ketal protecting groups (Scheme 3-15) (Shenvi, R. A. et al. *J. Am. Chem. Soc.* 2008, 130 (23), 7241-7243) with initial deprotection of the ketal using pyridinium p-toluenesulfonate (PPTS) followed by hydrolysis of the acetates to give the desired precursor dione 3-2 in 91% yield.

Figure 4:
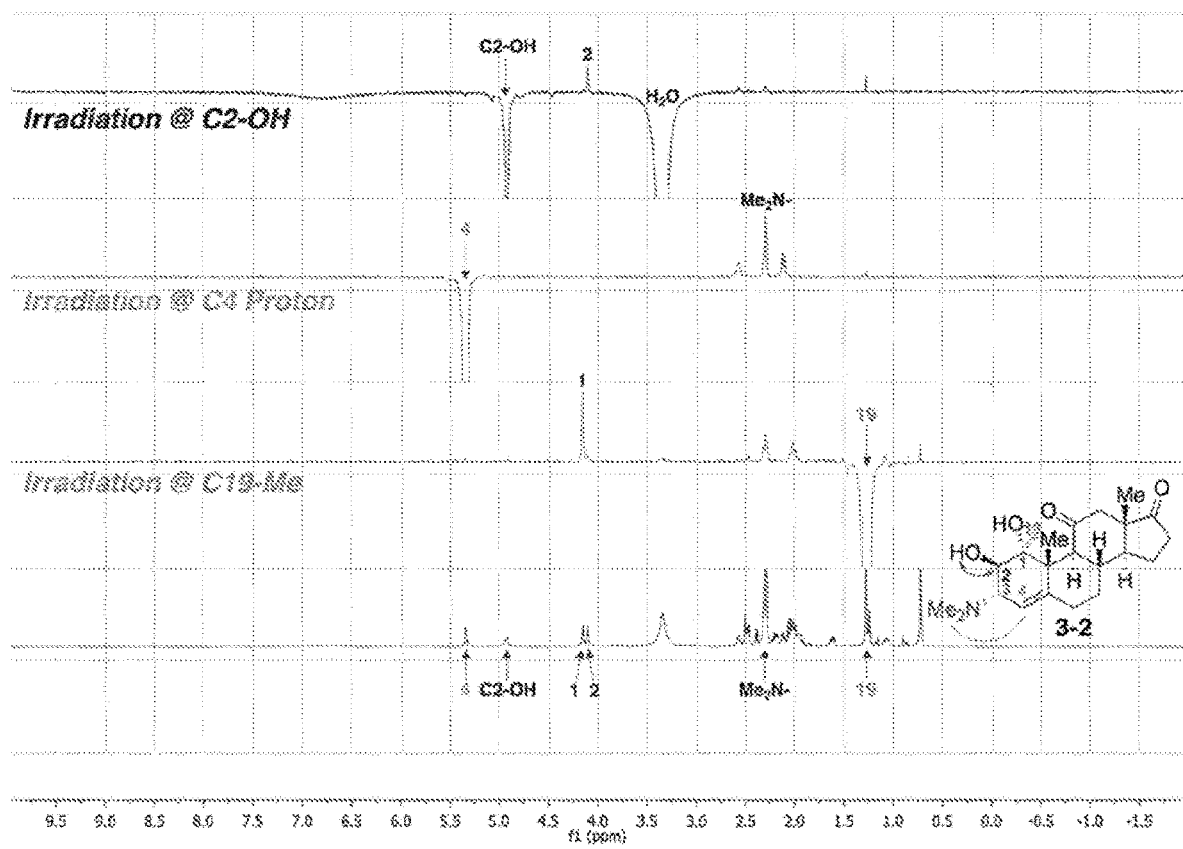
FIG. 4 depicts exemplary spectra showing a NOE analysis of synthetic intermediate 3-2.
Figure 5:
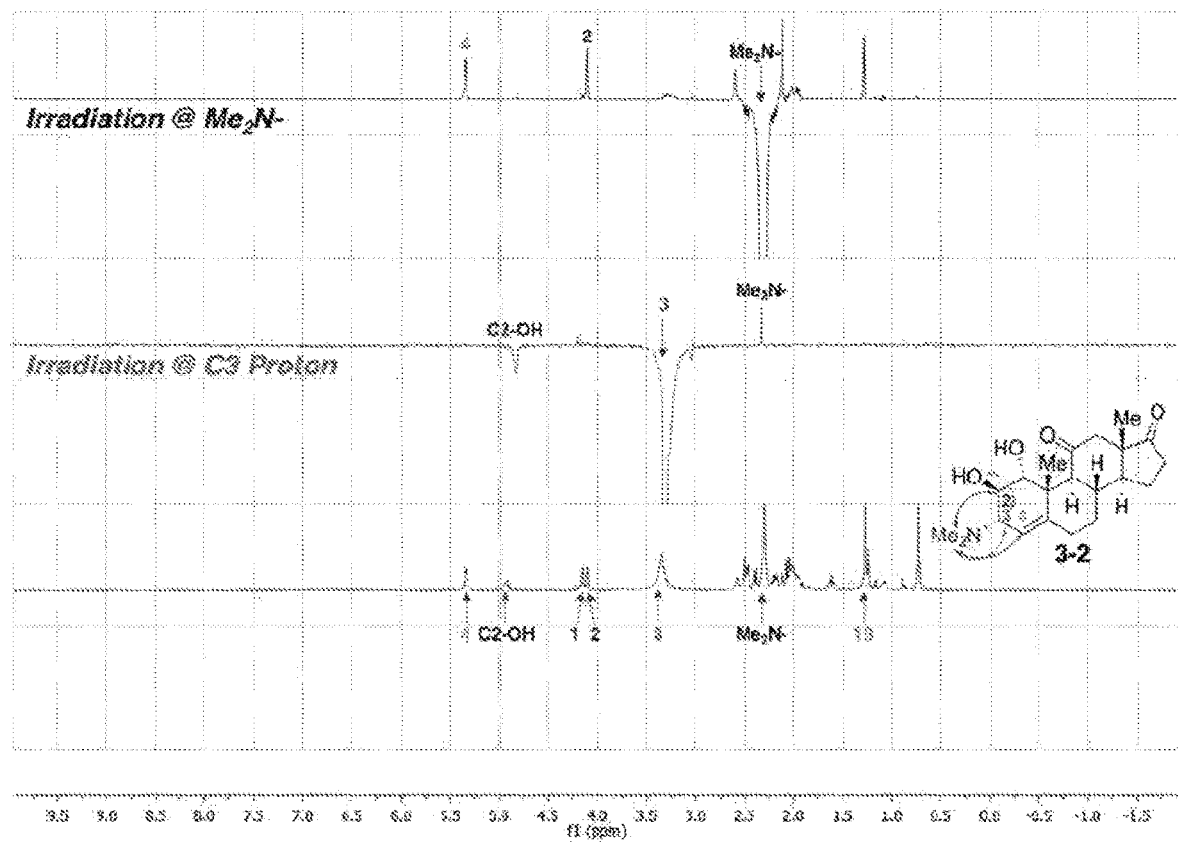
FIG. 5 depicts exemplary spectra showing an additional NOE analysis of 3-2.
Figure 6:
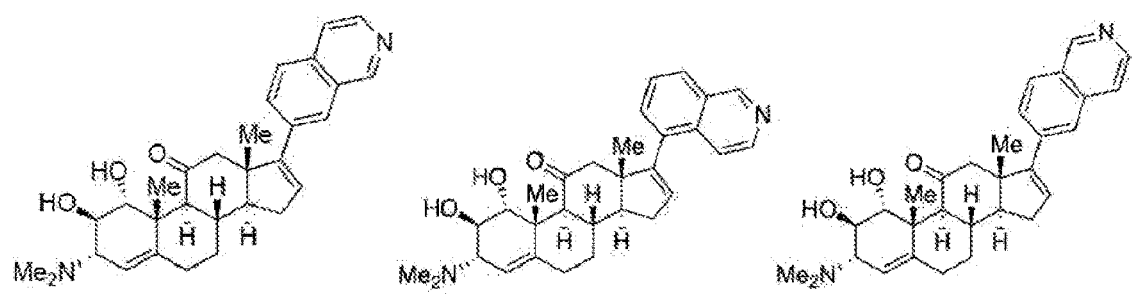
FIG. 6 depicts three exemplary compounds (3-1, 3-18, and 3-19) falling within Formula I.

The stereochemistry at all stereogenic centers were confirmed by NOE analysis. Upon irradiation of the C19 angular methyl the C1 proton peak intensity increased, confirming the correct beta stereochemistry of the C1 proton (FIG. 4). Irradiation of the C3α-dimethylamine peak resulted in increased intensities for both the C2 proton and C4 vinyl proton peaks (FIG. 5). The increased intensity of the C2 proton upon dimethylamine irradiation confirmed the correct alpha stereochemistry at this position.

In preparation for the Stille coupling at the C17 position the trimethyltin-substituted heterocycles were synthesized from the corresponding bromo derivatives by reaction with. hexamethylditin, tetrakis(triphenylphosphine) palladium(0) (Pd(PPh$_3$)$_4$), and lithium chloride give the desired trimethylstannyl derivatives (Table 1).

TABLE 1

Preparation of trimethystannyl-substituted isoquinolines.

| Entry | Bromoisoquinoline | Product | Yield (%) |
|---|---|---|---|
| 1 | 3-11 | 1-54 | 67 |

TABLE 1-continued

Preparation of trimethystannyl-substituted isoquinolines.

| Entry | Bromoisoquinoline | Product | Yield (%) |
|---|---|---|---|
| 2 | 3-12 | 3-14 | 34 |
| 3 | 3-13 | 3-15 | 66 |

Reactions were carried out in toluene at 105° C. for 1 h, with 0.5 equiv Pd(PPh$_3$)$_4$, 1.05 equiv hexamethylditin, and 6 equiv LiCl.

The Stille couplings were performed to afford novel simplified dCA analogs. Dione 3-2 was first converted to the reactive hydrazone intermediate 3-16 in the presence of hydrazine monohydrate and triethylamine which then underwent Barton vinyl iodide synthesis to give vinyl iodide precursor 3-17 in quantitative yield over the two steps (Scheme 6).

Scheme 6. Preparation of the vinyl iodide precursor 3-13.

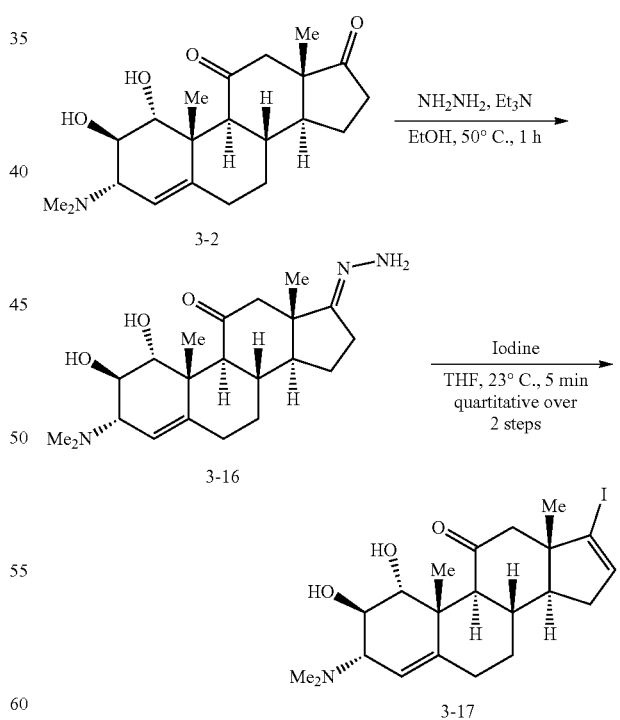

The Stille couplings to intermediate 3-17 were then performed utilizing the previously prepared trimethylstannyl isoquinoline reagents following a modified Stille coupling procedure using four equivalents of the stannyl isoquinolines with Pd(PPh$_3$)$_4$, lithium chloride, and copper(I) chloride. Successful C—C bond formation provided three novel and simplified dCA analogs 3-1, 3-18, and 3-19 (Scheme 7) in yields between 22-37%.

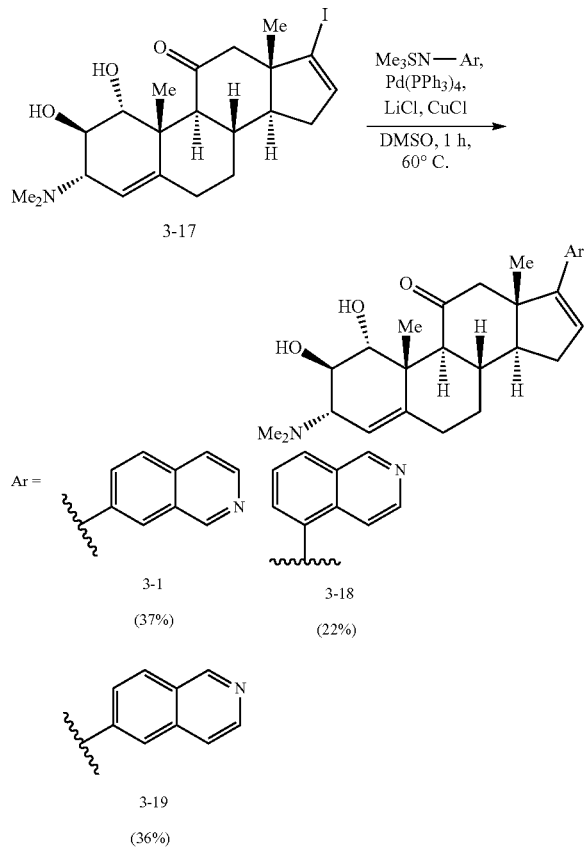

Thus this optimized 8-step synthetic route generated novel simplified dCA analogs retaining most of the functionalities of dCA.

The analogs 3-1, 3-18, and 3-19 have similar physicochemical properties to dCA that are consistent with values of known BBB permeable drugs (Table 2) (Mahar Doan, K. M. et al. J. Pharmacol. Exp. Ther. 2002, 303 (3), 1029-1037), suggesting that these analogs may possess sufficient BBB permeability to allow possible eradication of dormant HIV proviruses that contribute to neurological disorders attributed to prolonged viral infection.

TABLE 2

Physicochemical properties of dCA analogs compared to dCA and CNS active drugs.

|  | BBB permeable drugs[a] | dCA (1-55) | Analogs (3-1), (3-18), (3-19) |
| --- | --- | --- | --- |
| Molecular weight | ≤400 | 470 | 472 |
| ClogP | <5 | 3.65 | 5.03 |
| tPSA | 60-70 Å$^2$ | 65.29 Å$^2$ | 73.13 Å$^2$ |
| H-bond donors | <3 | 2 | 2 |
| H-bond acceptors | <7 | 3 | 3 |

[a]Guidelines from ref (Mahar Doan, K. M. et al. J. Pharmacol. Exp. Ther. 2002, 303 (3), 1029-1037).

Synthetic Procedures

All reactions were carried out under an argon atmosphere using anhydrous solvents unless otherwise stated. Microwave-assisted organic synthesis was performed using a Biotage® Initiator+instrument. Proton and carbon nuclear magnetic resonance were recorded on a Bruker Avance II 600 MHz spectrometer with proton chemical shifts (a) recorded in parts per million (ppm) referenced to deuterated solvents. Electrospray ionization mass spectrometry (ESI-MS) was performed using an Advion Expression MS that was connected to an Advion Plate Express plate reader. Flash chromatography was conducted using a Telodyne Combiflash RF 200 UV/Vis, and mass directed flash purification was performed using a Biotage® Isolera One equipped with a Biotage® nanolink. High-performance liquid chromatography (HPLC) was performed using a C18 Vydac 218TP reversed-phase analytical column (Grace Davison, 4.6×50 mm, 5 μm) on an Agilent Technologies 1260 Infinity II instrument. The solvent system used for HPLC analysis was 15-55% MeCN over 40 min with 0.1% trifluoroacetic acid (flow rate 1.0 mL/min).

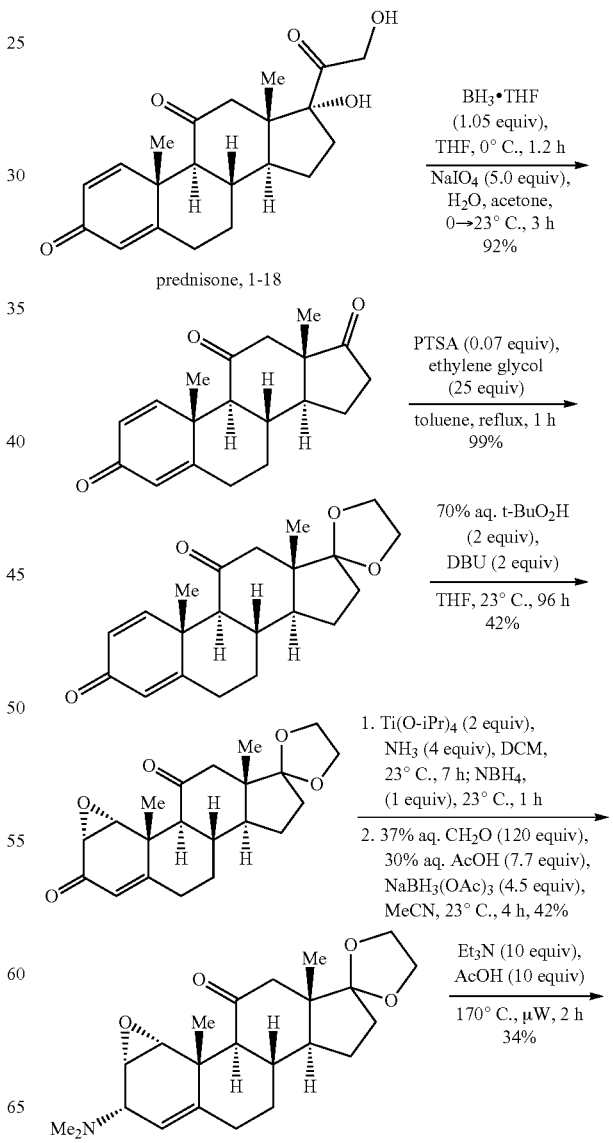

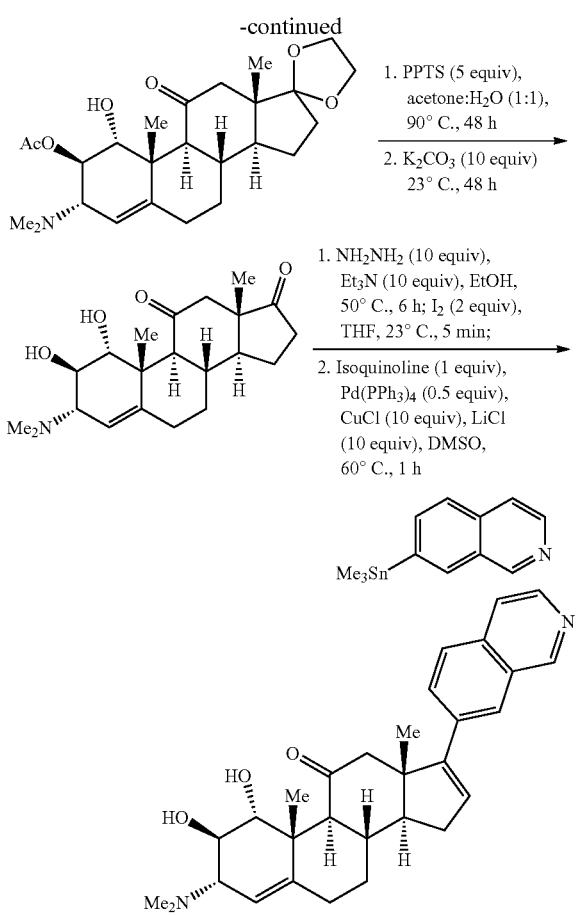

Androst-1,4-diene-3,11,17-trione (1-45)

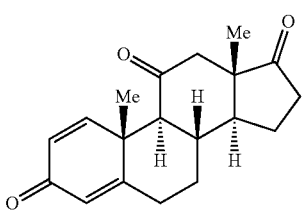

A stirring suspension of prednisone (Matrix Scientific, Columbia, SC; 20 g, 55.8 mmol) in anhydrous THF (186 mL, 0.3 M) was prepared in a capped 2 L round bottom flask. Following cooling to 0° C. in an ice bath BH₃·THF (1 M in THF, 55.8 mL, 55.8 mmol, 1 equiv) was added via syringe over 20 minutes. The reaction mixture was then stirred at ambient temperature for 15 minutes and gradually became clear and colorless. Additional BH₃·THF (1 M in THF, 2.79 mL, 2.79 mmol, 0.05 equiv) was added via syringe to ensure full consumption of the starting material. The reaction mixture was then cooled in an ice bath while a solution of acetone:water (1:1, 200 mL) was slowly added, followed by addition of NaIO₄ (59.7 g, 279 mmol, 5 equiv) over 5 minutes. The ice bath was removed, and the resulting white suspension was stirred vigorously over 3 h at ambient temperature. The reaction mixture was filtered through Celite® and concentrated in vacuo to remove the majority of the acetone and THF. This suspension was extracted with DCM (200 mL), and the resulting layers were separated. The aqueous layer was extracted with additional DCM (3×100 mL), and the combined organic solutions were washed successively with sat. aq. Na₂S₂O₃ (200 mL), water (200 mL), and sat. aq. NaCl (200 mL). The resulting clear light-yellow organic solution was dried over MgSO₄, and the solvent evaporated in vacuo to give a pale yellow crystalline solid (15.31 g, 92%) that was used without purification. NMR data was consistent with the published literature (Hanson, J. R.; Siverns, M., *J. Am. Chem. Soc.* 1975, (19), 1956-1958).

17,17-(Ethylenedioxy)-androst-1,4-diene-3,11-dione (1-46)

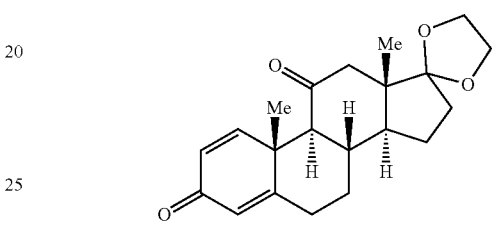

Ethylene glycol (51.6 mL, 922 mmol, 25 equiv) and p-TsOH·H₂O (509 mg, 2.67 mmol, 0.07 equiv) were added to a suspension of 1-45 (11 g, 36.9 mmol) in toluene (614 mL, 0.06 M) in a 2 L round bottom flask equipped with a Dean-Stark trap. The reaction mixture was heated to 135° C., refluxed for 1 h and then cooled to ambient temperature. The solution was diluted with EtOAc (150 mL) and washed with sat. aq. NaHCO₃ (100 mL). The aqueous layer was extracted with EtOAc (2×150 mL). and the combined organic layer was washed with sat. aq. NaCl (200 mL). After drying the solution over MgSO₄ the solvent was evaporated in vacuo to afford a light yellow crystalline solid (12.43 g, 99%). NMR data was identical to that previously reported (Shenvi, R. A.; et al., *J. Am. Chem. Soc.* 2008, 130 (23), 7241-7243).

17,17-(Ethylenedioxy)-1α,2α-epoxyandrost-4-ene-3,11-dione (1-47)

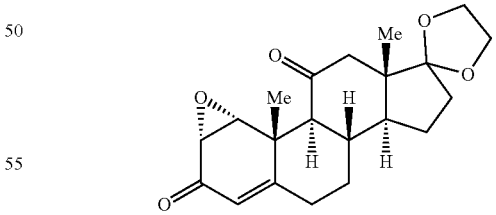

To a solution of 1-46 (14.4 g, 42 mmol) in THF (42 mL, 523 mmol) was added a 70% aq. TBHP solution (11.6 mL, 84.0 mmol, 2 equiv) and DBU (11.5 mL, 76.9 mmol, 1.83 equiv) in a 250 mL round bottom flask. The reaction mixture was stirred at ambient temperature for 96 h; the solution became a clear orange color. The reaction was quenched by the addition of sat. aq. Na₂S₂O₃ (50 mL), and the reaction stirred for an additional 2 h. The reaction mixture was extracted twice with EtOAc (2×100 mL), and the combined organic layers were washed with sat. aq. Na$_2$S$_2$O$_3$ (2×25 mL), water (25 mL) and sat. aq. NaCl (25 mL). The organic layer was then dried over MgSO$_4$ and concentrated in vacuo to afford an orange oil that after drying under vacuum gave an orange foam. The compounds was purified by flash column chromatography (silica gel, hexanes:EtOAc 20:1 to 2:1) to yield a white powder (6.34 g, 42%).

R$_f$=0.56 (silica, 1:1 hexanes:EtOAc); $^1$H NMR (600 MHz, CDCl$_3$) δ 5.69 (t, J=2.0 Hz, 1H), 4.30 (d, 3.9 Hz, 1H), 3.95-3.90 (m, 2H), 3.85-3.80 (m, 2H), 3.38 (dd, J=4.0, 2.0 Hz, 1H), 2.71 (d, J=12.6 Hz, 1H), 2.47 (tdd, J=14.2, 5.0, 2.1 Hz, 1H), 2.41 (d, J=11.4 Hz, 1H), 2.30 (ddd, J=14.3, 4.2, 2.5 Hz, 1H), 2.15 (d, J=12.6 Hz, 1H), 2.10-2.00 (m, 2H), 1.99-1.89 (m, 3H), 1.86-1.80 (m, 1H), 1.46 (s, 3H), 1.38 (qd, 12.0, 6.1 Hz, 1H), 1.28-1.18 (m, 1H), 0.87 (s, 3H); $^{13}$C NMR (600 MHz, CDCl$_3$) δ 209.9, 194.0, 164.3, 120.8, 117.5, 65.6, 64.8, 60.8, 58.5, 55.2, 49.7, 49.4, 48.6, 40.3, 36.9, 34.3, 32.5, 31.8, 22.3, 18.8, 15.1; ESIMS (m/z) calcd for C$_{23}$H$_{30}$O$_5$ [M+MeCN+H]+ 400.2, found 400.3.

3α-Dimethylamino-17,17-(ethylenedioxy)-1α,2α-epoxyandrost-4-en-11-one (3-4) and its HCl salt (3-4·HCl)

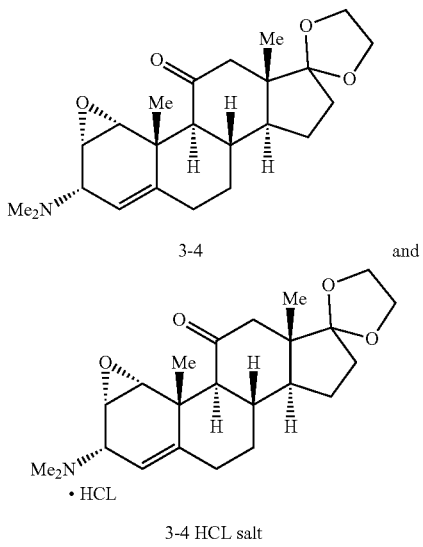

3-4 and 3-4 HCL salt
·HCL

To a solution of 1-47 (2.41 g, 6.72 mmol) in DCM (13.45 mL, 0.5 M) was added NH3 (2 M in EtOH, 13.45 mL, 26.88 mmol, 4 equiv) and Ti(Oi-Pr)4 (4.8 mL, 13.44 mmol, 2 equiv). The reaction vessel was capped and stirred for 7 h at ambient temperature. NaBH4 (254 mg, 6.72 mmol, 1 equiv) was added slowly, as and the reaction stirred for an additional hour at ambient temperature as water droplets were observed on the reaction vessel. The resulting solution was diluted with DCM (15 mL) and poured slowly into a round bottom flask containing sat. aq. potassium sodium tartrate (15 mL). The resulting biphasic mixture was stirred vigorously at ambient temperature for 16 h. Water (15 mL) was added, as and the phases were separated in a separatory funnel. The aqueous portion phase was then extracted twice with DCM (2×15 mL,) and the combined organic portions were combined. The organic extract was then washed with sat. aq. NaCl (30 mL) and dried over MgSO4. To this resulting clear yellow solution was added MeCN (40 mL), as and the DCM was evaporated in vacuo (30° C., 250 torr), leaving the crude amine intermediate in solution for the dimethylation reaction. To the reaction mixture was added 37% aq. formaldehyde (63.5 mL, 806.4 mmol, 120 equiv) and 30% aq. AcOH (9.986 mL, 51.7 mmol, 7.7 equiv). A third of NaBH(OAc)3 (6.4 g, 30.2 mmol, 4.5 equiv) was added each hour for 3 h, as and the reaction stirred at ambient temperature for 4 h. The reaction was quenched with sat. aq. NaHCO$_3$ (75 mL), and poured into a separatory funnel as the biphasic mixture was separated. The aqueous portion layer was extracted once each with diethyl ether (50 mL) and ethyl acetate (50 mL). The combined organic portions were combined and washed with sat. aq. NaCl (50 mL) as the phases were separated and collected into two Erlenmeyer flasks. After the flasks were allowed to sit and solutions separate for 25 min. as the acetate chloride salt of 3-45 (600 mg, 23%) crashed precipitated out from both solutions as a white crystalline solid and was collected by vacuum filtration. The organic layer was then dried over MgSO4 and solvent was evaporated in vacuo to furnish a light-green oil. This oil was purified by mass directed flash column chromatography (silica gel, DCM:MeOH 100:0 to 10:1) to yield a light-green solid 3-5 (500 mg, 19%).

Alternative synthesis: To a solution of 1-47 (6.41 g, 17.9 mmol) in DCM (35.8 mL, 0.5 M) was added NH$_3$ (2 M in EtOH, 35.8 mL, 71.5 mmol, 4 equiv) and Ti(Oi-Pr)$_4$ (10.8 mL, 35.8 mmol, 2 equiv). The reaction vessel was stirred for 7 h at ambient temperature. NaBH$_4$ (676 mg, 17.9 mmol, 1 equiv) was added slowly to the reaction which was stirred for an additional hour at ambient temperature. The resulting solution was diluted with DCM (40 mL) and poured slowly into a solution of sat. aq. potassium sodium tartrate (60 mL). The resulting biphasic mixture was stirred vigorously at ambient temperature for 16 h. Water (60 mL) was added, and the aqueous phase was extracted with DCM (2×40 mL). The combined organic phases were then washed with sat. aq. NaCl (40 mL) and dried over MgSO$_4$. To this resulting clear yellow solution was added MeCN (60 mL), and the DCM was evaporated in vacuo (at 30° C., 250 torr), leaving the crude amine intermediate in solution for the dimethylation procedure. To the reaction mixture was added 37% aq. formaldehyde (174 mL, 2.15 mol, 120 equiv) and 30% aq. AcOH (26.2 mL, 138 mmol, 7.7 equiv). The reaction was stirred for 4 h, and NaBH(OAc)$_3$ (5.67 g, 26.8 mmol, 1.5 equiv) was added each hour for 3 h. The reaction was quenched with sat. aq. NaHCO$_3$ (75 mL), and the aqueous layer was extracted once with diethyl ether (100 mL) and ethyl acetate (100 mL). The combined organic portions were washed with sat. aq. NaCl (100 mL). Following 30 min a white crystalline solid formed in both the organic and aqueous solutions and was collected by vacuum filtration. Additional crystalline product was obtained by adding brine (4×20 mL) to the organic mother liquor and further separation of the biphasic mixture, resulting in four additional crops of crystals (4.67 g, 67%).

Neutral dimethylamine 3-4: R$_f$=0.35 (silica, 10:1 DCM:MeOH); $^1$H NMR (600 MHz, CDCl$_3$) δ 5.10 (q, J=2.2 Hz, 1H), 3.94-3.86 (m, 2H), 3.83-3.77 (m, 2H), 3.76 (d, J=4.3 Hz, 1H), 3.44 (dt, 4.6, 2.3 Hz, 2H), 2.68 (d, J=12.4 Hz, 1H), 2.45 (s, 6H), 2.33 (d, J=2.3 Hz, 1H), 2.22-2.18 (m, 1H), 2.15-2.08 (m, 1H), 2.06 (d, J=12.4 Hz, 1H), 2.05-1.98 (m, 2H), 1.94-1.86 (m, 1H), 1.84-1.76 (m, 3H), 1.36-1.29 (m, 1H), 1.29 (s, 3H), 1.13-1.04 (m, 1H), 0.82 (s, 3H); $^{13}$C NMR (600 MHz, CDCl$_3$) δ 211.1, 142.3, 117.7, 116.0, 65.5, 64.7, 58.4, 57.6, 55.8, 53.1, 49.8, 49.4, 48.9, 41.6, 41.6, 37.8, 37.2, 34.3, 32.1, 31.9, 22.3, 17.7; ESIMS (m/z) calcd for C$_{23}$H$_{34}$NO$_4$ [M+H]+ 388.2488, found 388.3.

Dimethylamine hydrochloride salt 3-4·HCl: $R_f$=0.01 (silica, 10:1 DCM:MeOH); $^1$H NMR (600 MHz, CDCl$_3$) δ 12.64 (s, 1H), 5.65 (brs, 1H), 4.17 (brs, 1H), 3.98 (d, J=4.4 Hz, 1H), 3.94-3.88 (m, 2H), 3.82-3.78 (m, 2H), 3.61 (dt, J=4.7, 2.5 Hz, 1H), 2.94 (d, J=5.1 Hz, 3H), 2.77 (d, J=5.1 Hz, 3H), 2.68 (d, J=12.5 Hz, 0.1 H), 2.27-2.24 (m, 2H), 2.15 (d, J=12.5 Hz, 1H), 2.10 (d, J=12.5 Hz, 1H), 2.06-2.00 (m, 2H), 1.94-1.78 (m, 7H), 1.39-1.33 (m, 1H), 1.32 (s, 3H), 1.09-1.01 (m, 1H), 0.83 (s, 3H); $^{13}$C NMR (600 MHz, CDCl3) δ 210.5, 148.1, 117.6, 109.6, 65.5, 64.7, 59.9, 57.8, 56.6, 49.6, 49.4, 49.3, 48.8, 40.4, 38.8, 37.8, 36.9, 34.2, 31.9, 31.7, 22.2, 17.8, 15.1.

1α,2β-Dihydroxy-3α-dimethylamino-17,17-(ethyl-enedioxy)-androst-4-en-11-one 2-acetate (3-3) and 1α,2β-Dihydroxy-3α-dimethylamino-17,17-(ethyl-enedioxy)-androst-4-en-11-one 1-acetate (3-5)

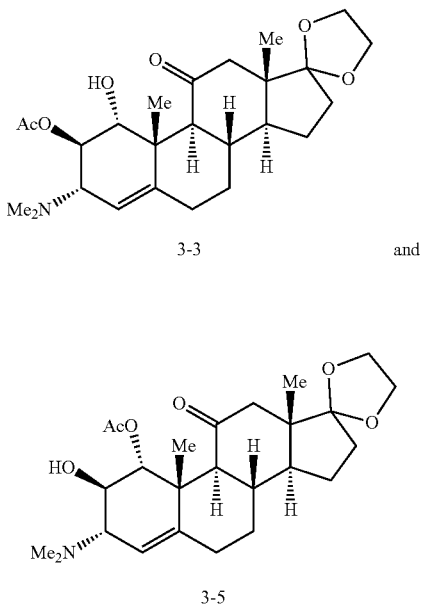

3-3 and 3-5

Triethylamine (TEA, 2.16 mL, 15.5 mmol, 10 equiv) and AcOH (0.89 mL 15.5 mmol, 10 equiv) were mixed in a 2-5 mL microwave vial that was capped and emersed in an ice bath. Following mixing 3-4 (600 mg, 1.55 mmol) was added to this mixture, and the sealed microwave vial was subjected to microwave heating at 170° C. for 2 h (Biotage Initiator+ microwave). Following cooling to ambient temperature a crystalline solid identified as the triethylamine salt was removed by vacuum filtration. The resulting solution was diluted with DCM (30 mL) and washed once successively with water, 1 M HCl, sat. aq. NaHCO$_3$, water, and sat. aq. NaCl (12 mL each). The organic layer was then dried over MgSO$_4$ and concentrated in vacuo to afford an orange foam which was purified by mass-directed flash column chromatography (silica, 4:1, DCM:acetone) to yield an orange foam consisting of inseparable regioisomers (233 mg, 34%): $R_f$=0.26 (silica, 1:1, DCM:acetone w/0.1% TEA).

Compound 3-3

$^1$H NMR (600 MHz, CDCl$_3$) δ 6.38 (brs, 1H), 5.36 (dt, J=5.8, 1.6 Hz, 1H), 5.29 (dt, J=5.8, 1.6 Hz, 1H), 4.36 (dd, J=4.0, 1.8 Hz, 1H), 3.90-3.83 (m, 2H), 3.79-3.74 (m, 2H), 2.65 (d, J=12.3 Hz, 1H), 2.58-2.52 (m, 2H), 2.32-2.27 (m, 1H) 2.30 (s, 6H), 2.08 (ddd, J=13.7, 4.4, 2.4 Hz, 1H), 2.04-1.99 (m, 3H) 1.98 (s, 3H), 1.90-1.84 (m, 3H), 1.79-1.74 (m, 1H), 1.33 (qd, J=12.1, 6.2 Hz, 1H), 1.26 (s, 3H), 1.05 (dq, J=13.0, 3.7 Hz, 1H), 0.78 (s, 3H); $^{13}$C NMR (151 MHz, CD$_3$CN) δ 210.6, 169.9, 145.6, 117.8, 115.4, 72.0, 67.9, 65.4, 64.7, 61.2, 57.8, 49.5, 49.3, 49.2, 43.7, 43.7, 41.2, 36.4, 34.3, 32.8, 32.7, 22.3, 21.3, 19.5, 14.9; ESI-MS (m/z) calcd for C$_{25}$H$_{37}$NO$_6$ [M+H]$^+$: 448.2; found 448.3.

Compound 3-5

$^1$H NMR (600 MHz, CDCl$_3$) δ 6.05 (brs, 1H), 5.42 (dt, J=5.6, 1.7 Hz, 1H), 5.27 (dt, J=3.9, 1.9 Hz, 1H), 4.27 (dd, J=3.9, 1.8 Hz, 1H), 3.90-3.82 (m, 2H), 3.82-3.73 (m, 2H), 2.63-2.52 (m, 4H), 2.31 (s, 6H), 2.06-1.96 (m, 4H), 1.96 (s, 3H), 1.91-1.83 (m, 3H), 1.77 (tdd, J=9.9, 7.3, 3.4 Hz, 1H), 1.37 (qd, J=12, 6.1 Hz, 1H), 1.27 (s, 3H), 1.17-1.07 (m, 1H), 0.79 (s, 3H). $^{13}$C NMR and mass data identical to 3-3.

1α,2β-Dihydroxy-3α-dimethylamino-17,17-(ethyl-enedioxy)-androst-4-en-11-one (3-6)

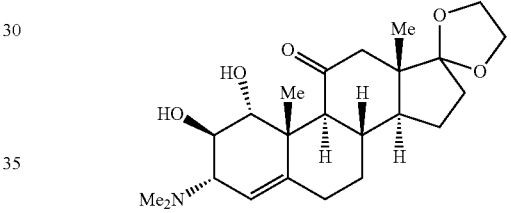

To a solution of regiomers 3-3 and 3-5 (106 mg, 0.24 mmol) in MeOH (2.12 mL, 52.7 mmol) was added K$_2$CO$_3$ (166 mg, 1.2 mmol, 5 equiv). The reaction mixture was stirred at ambient temperature for 4 h and then diluted with EtOAc (10 mL). The reaction mixture was washed with a 0.1 N aq. NaOH solution (10 mL). The aqueous layer was separated and extracted with EtOAc (3×10 mL). The combined organic layers were washed with sat. aq. NaCl (10 mL, dried over Na$_2$SO$_4$ and concentrated in vacuo to give a yellow crystalline solid. This solid was purified by mass directed flash column chromatography (neutral alumina, 16:1, DCM:MeOH) to yield a white crystalline solid (88.8 mg, 92%).

$R_f$=0.18 (silica, 19:1, DCM:MeOH); $^1$H NMR (600 MHz, CD$_3$CN) δ 6.02 (brs, 1H), 5.35 (dt, J=5.6, 1.7 Hz, 1H), 4.19 (tt, J=4.1, 1.8 Hz, 1H), 4.13 (dd, J=4.2, 1.8 Hz, 1H), 3.90-3.82 (m, 2H), 3.82-3.73 (m, 2H), 2.82 (d, J=4.6 Hz, 1H), 2.58 (dt, J=12, 1.1 Hz, 1H), 2.50-2.48 (m, 2H), 2.34-2.28 (m, 1H), 2.27 (s, 6H), 2.09 (ddd, J=13.4, 4.9, 3.0 Hz, 1H), 2.04-1.97 (m, 2H), 1.92-1.82 (m, 4H), 1.79-1.74 (m, 1H), 1.36 (qd, J=12.1, 6.2 Hz, 1H), 1.29 (s, 3H), 1.07 (dddd, J=13.8, 12.2, 11.3, 4.3 Hz, 1H), 0.76 (s, 3H); $^{13}$C NMR (600 MHz, CDCl3) δ 212.2, 146.8, 117.8, 115.4, 75.4, 67.1, 65.5, 64.9, 64.8, 58.6, 49.7, 49.6, 49.5, 43.0, 43.0, 41.7, 36.9, 34.4, 33.3, 32.5, 22.3, 20.4, 15.1; ESIMS (m/z) calcd for C$_{23}$H$_{35}$NO$_5$ [M+H]+ 406.5, found 406.3.

1α,2β-Dihydroxy-3α-dimethylaminoandrost-4-en-11,17-dione (3-2)

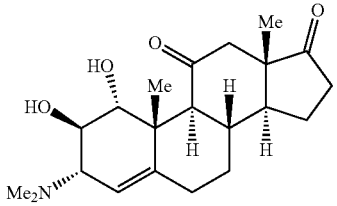

To a solution of regioisomers 3-3 and 3-5 (196 mg, 0.44 mmol) in acetone:water (1:1, 43.7 mL) was added pyridium p-toluene sulfonate (553 mg, 2.20 mmol, 5 equiv), and the reaction mixture was stirred in a 90° C. sand bath for 21 h. Additional acetone (~3 mL) was added when the reaction mixture was no longer bubbling. The reaction mixture was cooled to ambient temperature, and $K_2CO_3$ (912 mg, 6.60 mmol, 15 equiv) was added slowly. The reaction mixture was then stirred for 62 h to ensure complete conversion to the fully deprotected product. The solvent was evaporated in vacuo to give a crude yellow residue that was diluted in DCM (20 mL) and was washed with sat. aq. NaCl (10 mL). The aqueous layer was then extracted with DCM (5×20 mL). The combined organic layers were filtered through a sodium sulfate plug, resulting in a clear light-yellow solution that was evaporated in vacuo to give an orange oil. Addition of $Et_2O$ (1 mL) precipitated the desired product as a brown powder (176 mg) which was purified by flash column chromatography (silica, 9:1, DCM:MeOH) to give 3-2 as an off-white powder (144 mg, 91%).

Alternative synthesis: To a solution of the diol 3-3 (77.6 mg, 0.17 mmol) in acetone:water (1:1, 17.35 mL) was added pyridium p-toluene sulfonate (218.6 mg, 0.87 mmol, 5 equiv) as the reaction mixture stirred in a 90° C. sand bath for 30 h. Acetone was supplemented (~2-3 mL) when the reaction mixture was not observed to bubble. The reaction mixture was cooled to ambient temperature as $K_2CO_3$ (120.2 mg, 0.87 mmol, 5 equiv) was added slowly. The reaction stirred for 7 h as an additional batch of $K_2CO_3$ (120.2 mg, 0.87, 5 equiv) was added. The reaction mixture stirred for an additional 80 h to ensure complete conversion to the fully deprotected product. The solvent was evaporated in vacuo to give a crude yellow residue that was diluted in DCM (20 mL) and poured into a separatory funnel. This cloudy yellow organic solution was washed with sat. aq. NaCl (10 mL). The aqueous portion was then extracted five times with DCM (5×20 mL). The combined organic portions were then passed through a sodium sulfate plug resulting in a clear light-yellow solution that was evaporated in vacuo to give an orange oil. This orange oil was then diluted with $Et_2O$ (1 mL) to precipitate out the desired product as a crude brown powder (51.4 mg).

$R_f$=0.10 (silica, 95:5:0.1, DCM:MeOH:Et$_3$N); $^1$H NMR (600 MHz, (CD$_3$OD) δ 5.46 (dt, J=5.6, 1.7 Hz, 1H), 4.40 (dd, J=4.1, 1.7 Hz, 1H), 4.29 (dt, J=4.0, 1.9 Hz, 1H), 2.80 (m, 1H), 2.57 (d, J=12.0 Hz, 1H), 2.53 (dd, J=11.1, 8.6 Hz, 1H), 2.47 (s, 6H), 2.45-2.41 (m, 2H), 2.31-2.27 (m, 1H), 2.26 (d, J=12.6 Hz, 1H), 2.22 (ddd, J=13.7, 4.3, 2.5 Hz, 1H), 2.19-2.01 (m, 4H), 1.73 (tt, J=12.2, 9.2 Hz, 1H), 1.40 (s, 3H), 1.24-1.16 (m, 1H), 0.84 (s, 3H); $^{13}$C NMR (151 MHz, CD$_3$OD) δ 220.1, 211.1, 115.8, 75.1, 67.5, 65.7, 59.6, 51.7, 51.0, 50.8, 43.4, 42.5, 36.9, 36.8, 33.4. 33.2, 22.5, 19.9, 15.1; ESIMS (m/z) calcd for $C_{21}H_{31}NO_4$ [M+H]$^+$: 362.2; found 362.1.

1α,2β-Dihydroxy-3α-dimethylamino-17-hydrazono-androst-4-en-11-one (3-16)

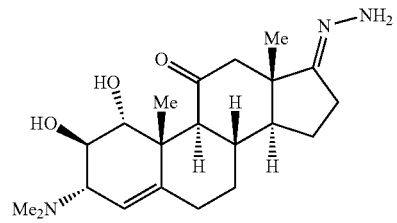

To a solution of dione 3-2 (27.4 mg, 0.08 mmol) in absolute ethanol (1.21 mL, 0.06 M) purged with argon was added hydrazine monohydrate (38 µL, 0.76 mmol, 10 equiv) and triethylamine (106 µL, 0.76 mmol, 10 equiv). The clear yellow reaction mixture was heated in a sand bath preheated to 50° C. with stirring for 1 h. The solvent was evaporated in vacuo to give a green foam that upon precipitation with ether gave hydrazone 3-16 as a fine light-yellow powder in quantitative yield which was carried forward without purification.

$R_f$=0.08 (silica, 90:9:0.1, DCM:MeOH:NH$_4$OH); $^1$H NMR (600 MHz, CDCl$_3$) δ 5.37 (dt, J=5.1, 1.8 Hz, 1H), 4.32 (dd, J=4.7, 1.6 Hz, 1H), 4.27 (ddd, J=4.5, 2.9, 1.3 Hz, 1H), 2.68 (ddt, J=4.9, 3.2, 1.8 Hz, 1H), 2.53 (d, J=11.7 Hz, 1H), 2.51 (d, J=12.7 Hz, 1H), 2.46 (d, J=12.4 Hz, 1H), 2.40 (s, 1H), 2.38-2.30 (m, 1H), 2.31 (s, 6H), 2.15 (ddd, J=13.4, 4.2, 2.2 Hz, 1H), 2.03-1.93 (m, 3H), 1.79 (ddd, J=12.7, 10.8, 6.0 Hz, 1H), 1.53 (tt, J=12.5, 9.1, 1H), 1.46 (s, 1H), 1.39 (s, 3H), 1.16-1.09 (m, 1H), 0.82 (s, 3H); $^{13}$C NMR (151 MHz, CDCl$_3$) δ 210.3, 162.4, 145.8, 116.1, 74.9, 67.0, 64.6, 59.2, 52.6, 52.4, 47.3, 43.3, 41.6, 35.8, 33.3, 32.7, 24.8, 23.9, 20.2, 18.3; ESI-MS (m/z) calcd for $C_{21}H_{33}N_3O_3$ [M+H]$^+$: 376.2; found 376.1.

1α,2β-Dihydroxy-3α-dimethylamino-17-iodo-androst-4,16-dien-11-one (3-17)

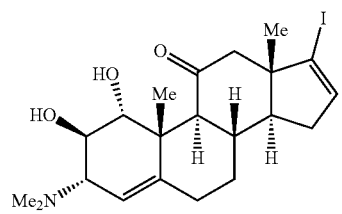

To hydrazone 3-16 (30.2 mg, 0.08 mmol) in THF (1.34 mL, 0.06 M) was added triethylamine (34 µL, 0.24 mmol, 3 equiv). A solution of iodine (40.9 mg, 0.161 mmol, 2 equiv) in THF (409 µL) was then added dropwise to the reaction mixture at ambient temperature until decolorization of iodine was not observed after ~30 seconds. The solution was then diluted with EtOAc (15 mL) and washed once with sat. aq. sodium thiosulfate (15 mL). The aqueous layer was extracted with EtOAc (4×15 mL), the combined layers dried over MgSO$_4$, and the solvent evaporated in vacuo to give the crude vinyl iodide 3-17 as a clear light-yellow oil in quantitative yield. The crude material was carried forward without further purification.

$R_f$=0.25 (silica, 90:9:0.1, DCM:MeOH:NH$_4$OH); $^1$H NMR (600 MHz, CD$_3$OD) δ 6.24 (dd, J=3.1, 1.5 Hz, 1H), 5.54 (d, J=5.1 Hz, 1H), 4.55 (d, J=3.9 Hz, 1H), 4.36 (dd, J=4.0, 2.0 Hz, 1H), 3.21 (brs, 1H), 2.80-2.75 (m, 6H), 2.56 (d, J=10.3 Hz, 1H), 2.46 (dddt, J=13.9, 9.1, 4.5, 2.5, 1H), 2.36 (d, J=11.9 Hz, 1H), 2.36-2.33 (m, 1H), 2.27-2.10 (m, 5H), 1.98 (ddt, J=12.7, 5.3, 2.8 Hz, 1H), 1.92 (s, 1H), 1.40 (s, 3H), 1.29-1.27 (m, 1H), 0.71 (s, 3H); $^{13}$C NMR (151 MHz, CD$_3$OD) δ 210.8, 139.9, 112.9, 108.8, 73.8, 67.5, 66.0, 60.3, 55.9, 54.9, 53.7, 43.0, 42.5, 36.8, 34.2, 33.6, 33.6, 19.6, 17.2; ESI-MS (m/z) calcd for C$_{21}$H$_{30}$INO$_3$ [M+H]$^+$: 472.1; found 472.0.

7-(Trimethylstannyl)isoquinoline (1-54)

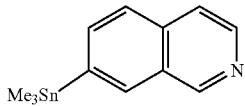

To a solution of 7-bromoisoquinoline (500 mg, 2.4 mmol) in toluene (4.8 mL, 0.5 M) was added LiCl (610 mg, 14.4 mmol, 6 equiv), Pd(PPh$_3$)$_4$ (277 mg, 0.24 mmol, 0.1 equiv), and hexamethylditin (827 mg, 2.52 mmol, 1.05 equiv). The resulting cloudy brown solution was mixed under argon in a sonicator for 10 min. The sonicated reaction mixture was then heated in a 105° C. oil bath with stirring for 1 h. The resulting yellow brown mixture was cooled, diluted with EtOAc (20 mL), and the solution filtered through Celite which was washed with additional EtOAc (2×10 mL). The combined organic solutions were washed once each with sat. aq. sodium bicarbonate (20 mL) and brine (20 mL), dried over MgSO$_4$, and concentrated in vacuo to give a yellow solid. Gradient flash column chromatography (silica, 100:0 to 2:1 hexanes:EtOAc) was performed to give 1-54 as a crystalline white powder (471 mg, 67%).

$R_f$=0.57 (silica, 1:1 hexanes:EtOAc); $^1$H NMR (600 MHz, CDCl$_3$) δ 9.26 (d, J=1.0 Hz, 1H), 8.49 (d, J=5.8 Hz, 1H), 8.13 (s, 1H), 7.86 (dd, J=8.0, 1.0 Hz, 1H), 7.81 (d, J=8.1 Hz, 1H), 7.69 (d, J=5.9 Hz, 1H), 0.39 (s, 9H); $^{13}$C NMR (151 MHz, CDCl$_3$) δ 150.9, 143.9, 140.4, 138.4, 136.3, 136.2, 128.1, 125.6, 121.5, −9.22; ESI-MS (m/z) calcd for C$_{12}$H$_{15}$NSn [M+H]$^+$: 294.0; found 294.0.

5-(Trimethylstannyl)isoquinoline (3-14)

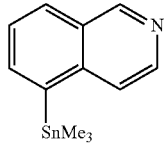

To a solution of 5-bromoisoquinoline (500 mg, 2.4 mmol) in toluene (4.81 mL, 0.5 M) was added LiCl (610 mg, 14.4 mmol, 6 equiv), Pd(PPh$_3$)$_4$ (277 mg, 0.24 mmol, 0.1 equiv), and hexamethylditin (826 mg, 2.52 mmol, 1.05 equiv) which was sonicated under argon for 10 min and reacted at 105° C. for 1 h; the product was isolated as described above for 1-54 to give a clear light yellow liquid (237.2 mg, 34%).

$R_f$=0.50 (silica, 1:1 hexanes:EtOAc); $^1$H NMR (600 MHz, CDCl$_3$) δ 9.24 (dt, J=3.0, 0.8 Hz, 1H), 8.54 (d, J=5.8 Hz, 1H), 7.92 (dt, J=8.3, 1.1 Hz, 1H), 7.83 (ddt, J=24.4, 6.5, 1.2 Hz, 1H), 7.59 (dt, 5.8, 1.0 Hz, 1H), 7.57-7.53 (m, 1H), 0.45 (s, 9H); $^{13}$C NMR (151 MHz, CDCl$_3$) δ 153.6, 143.1, 141.8, 141.1, 138.9, 128.9, 128.2, 126.8, 122.6, −8.4; ESI-MS (m/z) calcd for C$_{12}$H$_{15}$NSn [M+H]$^+$: 294.0; found 294.0.

6-(Trimethylstannyl)isoquinoline (3-15)

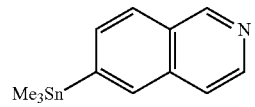

To a solution of 6-bromoisoquinoline (1 g, 4.81 mmol) in toluene (9.61 mL, 0.5 M) was added LiCl (1.22 g, 28.9 mmol, 6 equiv), Pd(PPh$_3$)$_4$ (556 mg, 0.481 mmol, 0.1 equiv), and hexamethylditin (1.65 g, 5.05 mmol, 1.05 equiv) which was sonicated under argon for 10 min and reacted at 105° C. for 1 h; the product was isolated as described above for 1-54 to give a clear yellow liquid (922 mg, 66%).

$R_f$=0.49 (silica, 1:1 hexanes:EtOAc); $^1$H NMR (600 MHz, CDCl$_3$) δ 9.18 (d, J=1.0 Hz, 1H), 8.48 (d, J=5.6 Hz, 1H), 7.90 (s, 1H), 7.84 (dd, J=8.0, 1.0 Hz, 1H), 7.68 (dd, J=8.0, 1.0 Hz, 1H), 7.56 (dt, J=5.8, 1.0 Hz, 1H), 0.36 (s, 9H); $^{13}$C NMR (151 MHz, CDCl$_3$) δ 152.4, 146.7, 142.8, 135.0, 134.3, 133.8, 128.4, 126.2, 120.0, −9.44; ESI-MS (m/z) calcd for C$_{12}$H$_{15}$NSn [M+H]$^+$: 294.0; found 294.0.

1α,2β-Dihydroxy-3α-dimethylamino-17-(isoquinolin-7-yl)-androst-4,16-dien-11-one (3-1)

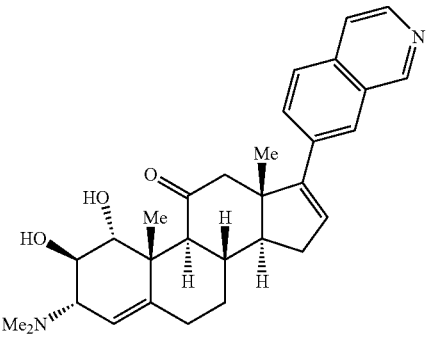

A solution of vinyl iodide 3-17 (13.2 mg, 0.028 mmol) in DMSO (0.467 mL, 0.06 M) was purged with argon, and LiCl (11.9 mg, 0.28 mmol, 10 equiv), CuCl (28 mg, 0.28 mmol, 10 equiv), Pd(PPh$_3$)$_4$ (16.2 mg, 0.014 mmol, 0.5 equiv) and 7-trimethylstannyl isoquinoline 1-54 (32.6 mg, 0.112 mmol, 4 equiv) were added to this solution. The reaction mixture was then stirred under argon for 10 min. The reaction mixture, which became cloudy and black, was heated at 60° C. in a sand bath with stirring for 1 h. The resulting black reaction mixture was diluted with EtOAc (15 mL) and washed once with 5% aq. NH$_4$OH (5 mL). The aqueous layer was then extracted with EtOAc (4×15 mL), and the combined organic layers washed with brine (15 mL), dried over sodium sulfate, and concentrated in vacuo to give a brown oil. The crude product was purified using gradient flash column chromatography (silica neutralized with NH₄OH, 100:0 to 90:10 DCM:MeOH containing 0.1% NH₄OH) to give 3-1 as a white solid (5 mg, 37%).

$R_f$=0.32 (silica, 90:9:0.1, DCM:MeOH:NH₄OH); ¹H NMR (600 MHz, CD₃OD) δ 9.22 (s, 1H), 8.39 (d, J=5.7 Hz, 1H), 8.01 (s, 1H), 7.88 (d, J=8.6 Hz, 1H), 7.83 (dd, J=8.6, 1.8 Hz, 1H), 7.78 (d, J=5.7 Hz, 1H), 6.27 (dd, J=3.4, 1.8 Hz, 1H), 5.44 (dt, J=5.7, 1.7 Hz, 1H), 4.45 (dd, J=4.0, 1.7 Hz, 1H), 4.29 (dt, J=3.9, 1.8 Hz, 1H), 2.75 (d, J=12.3 Hz, 1H), 2.67 (d, J=12.2 Hz, 1H), 2.63 (dq, J=5.8, 2.0 Hz, 1H), 2.59 (d, J=11.0 Hz, 1H), 2.48 (ddd, J=15.5, 6.2, 3.3 Hz, 1H), 2.37 (dq, J=5.4, 2.7 Hz, 1H), 2.34 (s, 6H), 2.31-2.24 (m, 1H), 2.22 (ddd, J=13.4, 4.3, 2.6 Hz, 1H), 2.05-1.99 (m, 1H), 1.42 (s, 3H), 1.29-1.22 (m, 1H), 1.10 (s, 3H); ¹³C NMR (151 MHz, CD₃OD) δ 212.3, 153.3, 152.9, 146.3, 142.7, 137.1, 136.6, 131.8, 131.2, 130.2, 127.7, 125.3, 122.0, 117.3, 75.8, 67.6, 65.6, 60.7, 57.8, 54.9, 51.4, 43.6, 42.6, 36.4, 34.4, 33.7, 32.3 (2), 19.9, 18.5; ESI-MS (m/z) calcd for $C_{30}H_{36}N_2O_3$ [M+H]⁺: 473.2; found 473.2.

Note: Overlapping carbon signals at 32.3 ppm were differentiated by HSQC.

1α, 2β-Dihydroxy-3α-dimethylamino-17-(isoquinolin-5-yl)-androst-4,16-dien-11-one (3-18)

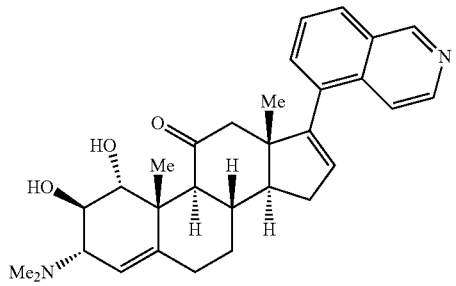

A solution of vinyl iodide 3-17 (36.1 mg, 0.08 mmol) in DMSO (1.28 mL, 0.06 M) was purged with argon, and LiCl (32.6 mg, 0.77 mmol, 10 equiv), CuCl (76.2 mg, 0.77 mmol, 10 equiv), Pd(PPh₃)₄ (44.5 mg, 0.04 mmol, 0.5 equiv) and 5-trimethylstannyl isoquinoline 3-14 (90 mg, 0.31 mmol, 4 equiv) were added to this solution. The reaction mixture was stirred under argon for 10 min and reacted at 60° C. for 1 h; the product was isolated as described for 3-1 to give 3-18 as a white foam (8 mg, 22%). $R_f$=0.23 (silica, 9:1 DCM:MeOH containing 0.1% NH₄OH); ¹H NMR (600 MHz, CDCl₃) δ 9.20 (s, 1H), 8.46 (d, J=6.0 Hz, 1H), 7.86 (d, J=8.2 Hz, 1H), 7.76 (d, J=6.0 Hz, 1H), 7.52 (t, J=7.7 Hz, 1H), 7.38 (d, J=7.0 Hz, 1H), 5.84-5.82 (m, 1H), 5.43 (d, J=4.9 Hz, 1H), 4.37-4.34 (m, 2H), 3.00 (m, 1H), 2.65 (d, J=11.2 Hz, 1H), 2.61 (d, J=12.4 Hz, 1H), 2.56-2.54 (m, 1H), 2.53 (s, 6H), 2.49-2.40 (m, 2H), 2.29 (dd, J=14.6, 11.7 Hz, 1H), 2.24-2.20 (m, 2H), 2.01-1.99 (m, 2H), 1.39 (s, 3H), 1.32-1.26 (m, 1H), 0.89 (s, 3H); ¹³C NMR (151 MHz, CDCl₃) δ 210.5, 152.8, 149.0, 147.8, 143.1, 135.3, 133.7, 131.4, 129.9, 129.0, 127.2, 126.6, 118.9, 114.1, 74.1, 67.0, 65.2, 59.6, 56.1, 53.4, 52.1, 42.9, 41.6, 35.8, 33.4, 32.8, 32.0, 19.8, 17.8; ESI-MS (m/z) calcd for $C_{30}H_{36}N_2O_3$ [M+H]⁺: 473.2; found 473.2.

1α,2β-Dihydroxy-3α-dimethylamino-17-(isoquinolin-6-yl)-androst-4,16-dien-11-one (3-19)

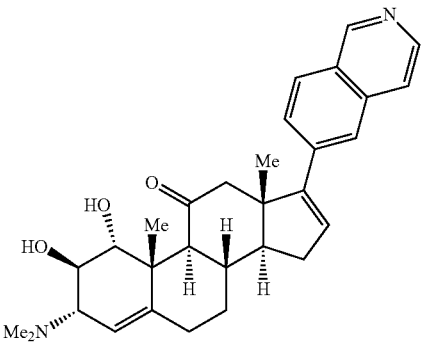

A solution of vinyl iodide 3-17 (49.5 mg, 0.105 mmol) in DMSO (1.75 mL, 0.06 M) was purged with argon, and LiCl (44.5 mg, 1.05 mmol, 10 equiv), CuCl (94.5 mg, 1.05 mmol, 10 equiv), Pd(PPh₃)₄ (60.7 mg, 0.05 mmol, 0.5 equiv) and 6-trimethylstannyl isoquinoline 3-15 (122.6 mg, 0.42 mmol, 4 equiv) were added to this solution. The reaction mixture was stirred under argon for 10 min and reacted at 60° C. for 1 h; the product was isolated as described for 3-1 to give 3-19 as a white foam (17.7 mg, 36%).

$R_f$=0.47 (silica, 9:1 DCM:MeOH containing 0.1% NH₄OH); ¹H NMR (600 MHz, CDCl₃) δ 9.17 (s, 1H), 8.49 (d, J=5.7 Hz, 1H), 7.88 (d, J=8.6 Hz, 1H), 7.70 (s, 1H), 7.63-7.57 (m, 2H), 6.22 (dd, J=3.4, 1.8 Hz, 1H), 5.42 (d, J=5.2 Hz, 1H), 4.41-4.37 (m, 1H), 4.33 (dd, J=4.8, 2.5 Hz, 1H), 2.82 (dd, J=12.3, 1.8 Hz, 1H), 2.76 (d, J=5.4 Hz, 1H), 2.63 (d, J=12.6 Hz, 1H), 2.61 (d, J=11.6 Hz, 1H), 2.49-2.39 (m, 2H), 2.39-2.34 (m, 7H), 2.32 (ddd, J=10.8, 6.8, 3.7 Hz, 1H), 2.28-2.16 (m, 3H), 2.12-1.90 (m, 2H), 1.44 (s, 3H), 1.29-1.22 (m, 1H), 1.09 (s, 3H); ¹³C NMR (151 MHz, CDCl₃) δ 210.4, 152.1, 151.8, 145.9, 143.4, 138.0, 136.0, 130.6, 127.8, 127.7, 126.8, 122.8, 120.8, 116.0, 74.8, 67.1, 64.6, 59.8, 56.6, 53.9, 50.3, 43.4, 41.7, 35.2, 33.6, 32.9, 31.5, 20.2, 18.3; ESI-MS (m/z) calcd for $C_{30}H_{36}N_2O_3$ [M+H]⁺: 473.2; found 473.2.

Note: Overlapping carbon signals at 32.9 ppm were differentiated by HSQC.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The present disclosure includes embodiments in which exactly one member of the group is present in, employed in, or otherwise relevant to a given product or process. The present disclosure includes embodiments in which more than one, or all of the group members are present in, employed in, or otherwise relevant to a given product or process.

Furthermore, the present disclosure encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the present disclosure, or aspects of the present disclosure, is/are referred to as comprising particular elements and/or features, certain embodiments of the present disclosure or aspects of the present disclosure consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the present disclosure, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present disclosure that falls within the prior art may be explicitly excluded from any one or more of the claims. Because such embodiments are deemed to be known to one of ordinary skill in the art, they may be excluded even if the exclusion is not set forth explicitly herein. Any particular embodiment of the present disclosure can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present disclosure, as defined in the following claims.

We claim:

1. A compound of Formula (I):

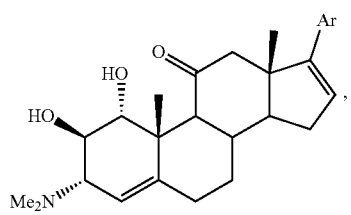

or salt, solvate, or hydrate thereof, wherein:
Ar is selected from the group consisting of pyridinyl, quinolinyl, isoquinolinyl, quinazolinyl, quinazolinyl, phthalazinyl, cinnolinyl, indazolyl, pyridinyl, pyridazinyl, pyrimidinyl, and pyrazinyl;
wherein Ar is optionally substituted with 1-4 substituents selected from $C_1$-$C_6$ alkyl, alkenyl, alkynyl, cycloalkyl, heterocycloalkyl, aralkyl, heteroaralkyl, aryl, heteroaryl, halogen (i.e., F, Cl, Br, I), haloalkyl, cyano, nitro, alkoxy, aryloxy, hydroxyl, hydroxylalkyl, oxo (i.e., carbonyl), carboxyl, formyl, mercapto, mercaptoalkyl, amino, aminoalkyl, dialkylamino, and amido.

2. The compound of claim 1, wherein the compound is of the formula:

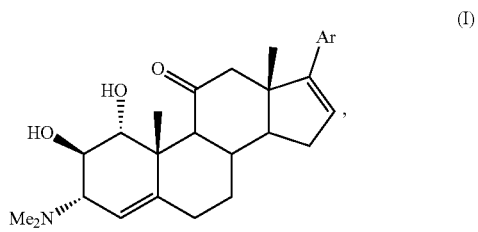

or salt, solvate, or hydrate thereof, wherein:
Ar is selected from the group consisting of:

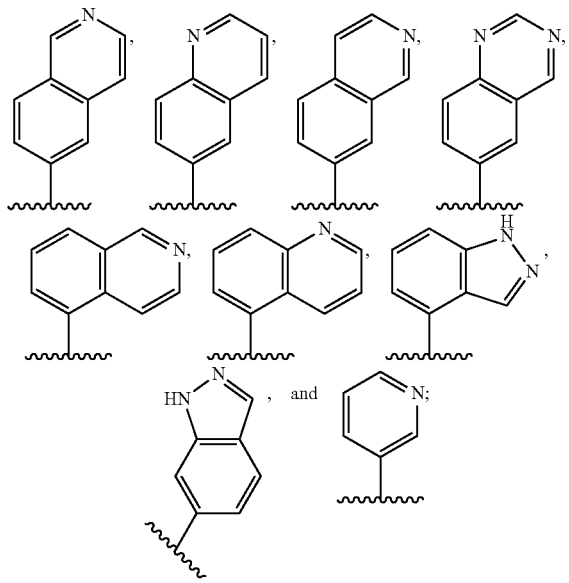

wherein Ar is optionally substituted with 1-4 substituents selected from $C_1$-$C_6$ alkyl, alkenyl, alkynyl, cycloalkyl, heterocycloalkyl, aralkyl, heteroaralkyl, aryl, heteroaryl, halogen (i.e., F, Cl, Br, I), haloalkyl, cyano, nitro, alkoxy, aryloxy, hydroxyl, hydroxylalkyl, oxo (i.e., carbonyl), carboxyl, formyl, mercapto, mercaptoalkyl, amino, aminoalkyl, dialkylamino, and amido.

3. The compound of claim 1, or salt, solvate, or hydrate thereof, wherein Ar is pyridinyl, quinolinyl, isoquinolinyl, or quinazolinyl.

4. The compound of claim 1, or salt, solvate, or hydrate thereof, wherein Ar is unsubstituted.

5. The compound of claim 1, or salt, solvate, or hydrate thereof, wherein Ar is substituted.

6. The compound of claim 1, or salt, solvate, or hydrate thereof, wherein Ar is substituted with one or more groups independently selected from $C_1$-$C_6$ alkyl, halogen, haloalkyl, alkoxy, and amino.

7. The compound of claim 1, wherein the compound of Formula (I) is of Formula (I-A):

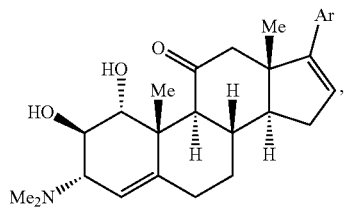

(I-A)

or salt, solvate, or hydrate thereof.

8. The compound of claim 1, or salt, solvate, or hydrate thereof, wherein the compound is of the formula:

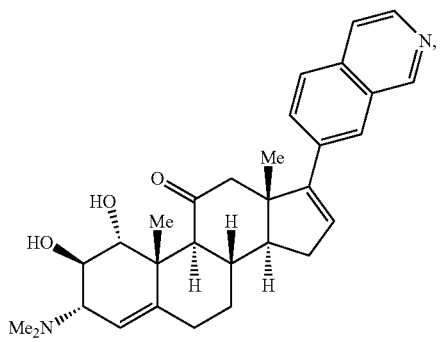

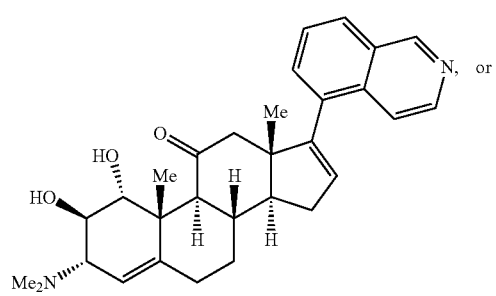

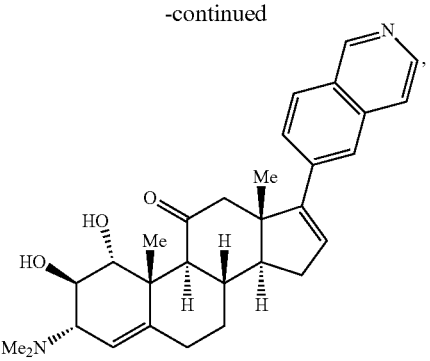

or salt, solvate, or hydrate thereof.

9. A pharmaceutical composition comprising a compound of claim 1, or salt, solvate, or hydrate thereof, and a pharmaceutically acceptable excipient.

10. A method for inhibiting viral replication in a subject, comprising administration to the subject of a compound of claim 1, solvate, or hydrate thereof.

11. A method for treating human immunodeficiency virus (HIV) effects in a subject, comprising administration to the subject of a compound of claim 1, or salt, solvate, or hydrate thereof.

12. A method for treating HIV neurological effects in a subject, comprising administration to the subject of a compound of claim 1 or salt, solvate, or hydrate thereof.

13. A method for inhibiting angiogenesis in a subject, comprising administration to the subject of a compound of claim 1, or salt, solvate, or hydrate thereof.

14. A method for inhibiting cellular proliferation in a subject, comprising administration to the subject of a compound of claim 1, or salt, solvate, or hydrate thereof.

15. A method for treating cancer in a subject, comprising administration to the subject of a compound of claim 1 or salt, solvate, or hydrate thereof.

16. A method for inhibiting transactivator of transcription (Tat) protein in a subject, comprising administration to the subject of a compound of claim 1 or salt, solvate, or hydrate thereof.

17. A method for treating a proliferative disease in a subject, comprising administration to the subject of a compound of claim 1 or salt, solvate, or hydrate thereof.

18. A method for treating age-related macular degeneration (AMD) in a subject, comprising administration to the subject of a compound of claim 1, or salt, solvate, or hydrate thereof.

19. The method of claim 18, wherein the AMD is wet AMD.

20. A kit comprising:
the compound of claim 1 or salt, solvate or hydrate thereof; and
instructions for administering the compound or composition.

* * * * *